A. RECHNITZER.
CALCULATING MACHINE.
APPLICATION FILED JULY 26, 1912.
1,409,575.
Patented Mar. 14, 1922.
44 SHEETS—SHEET 8.
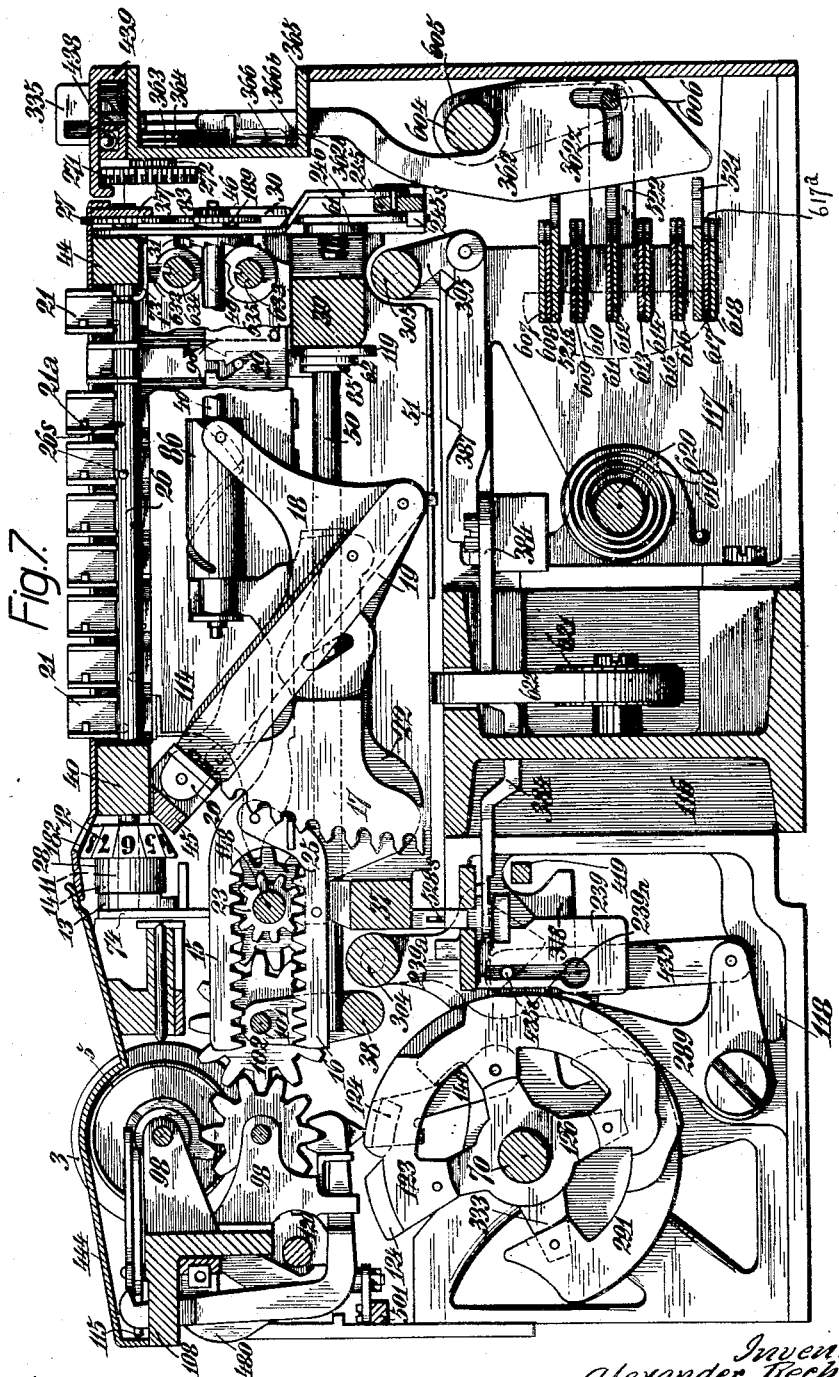

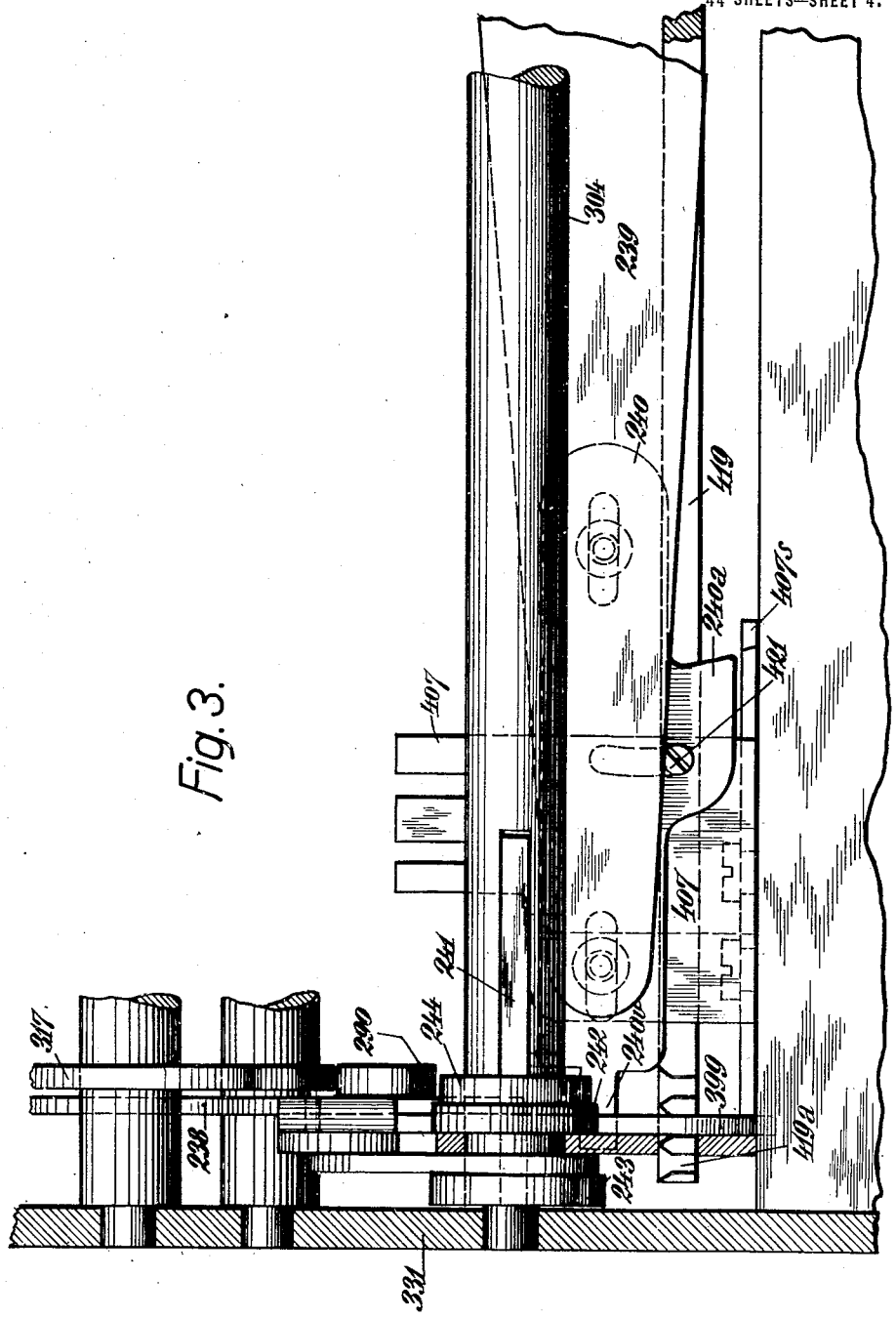

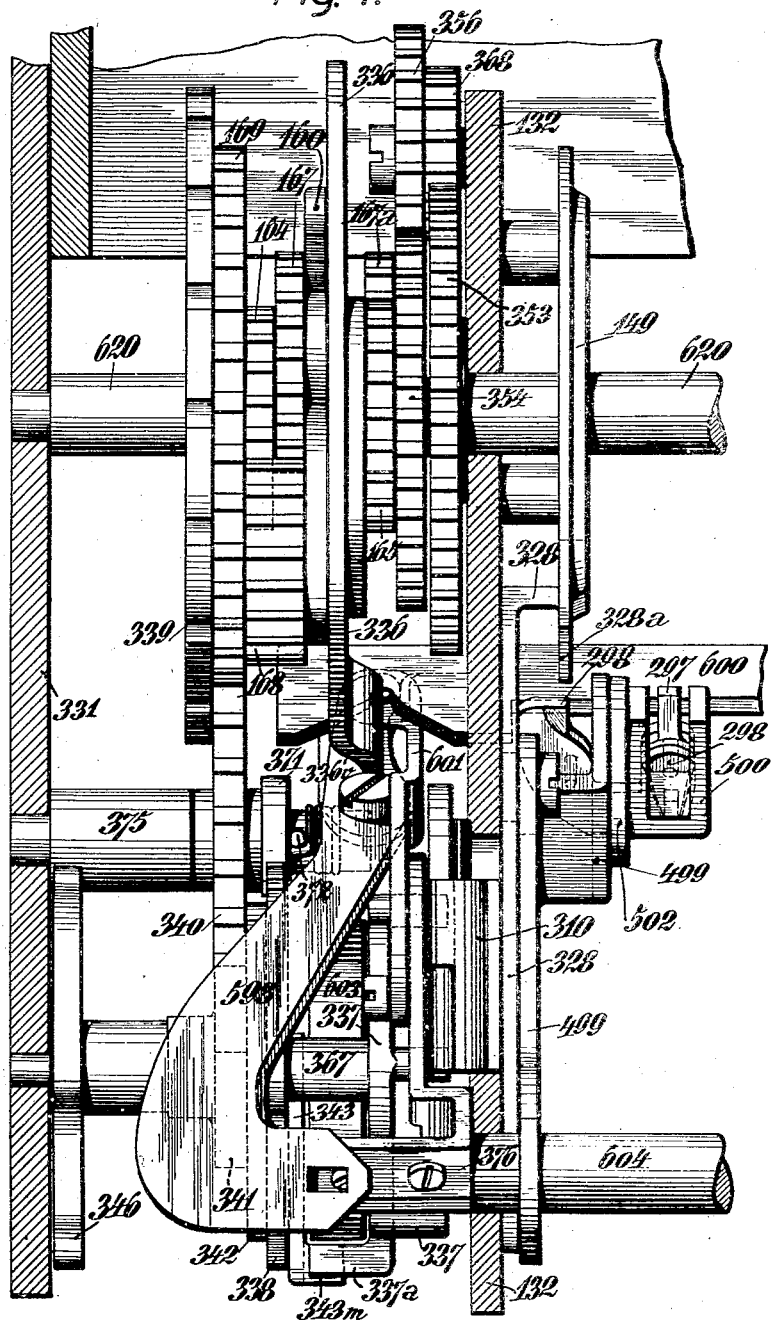

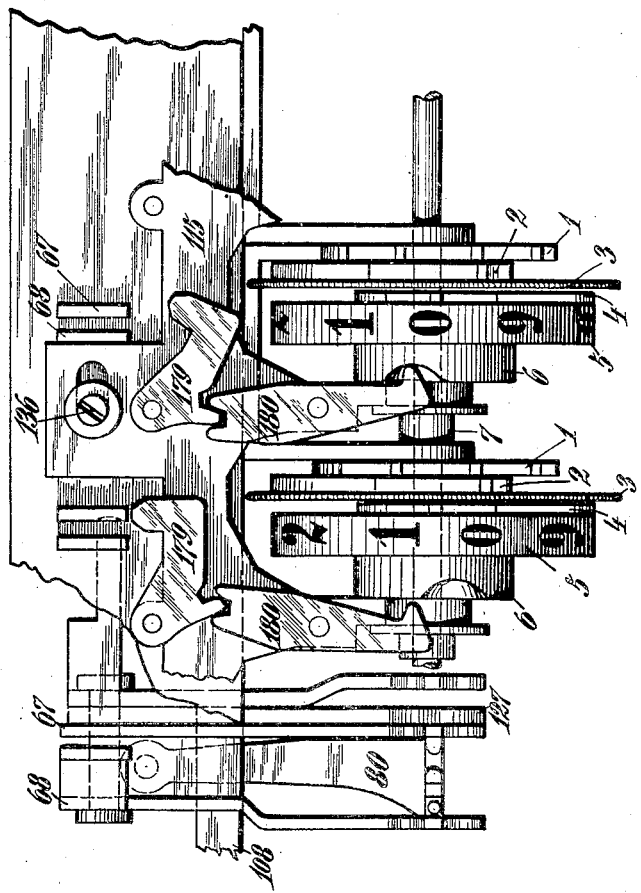

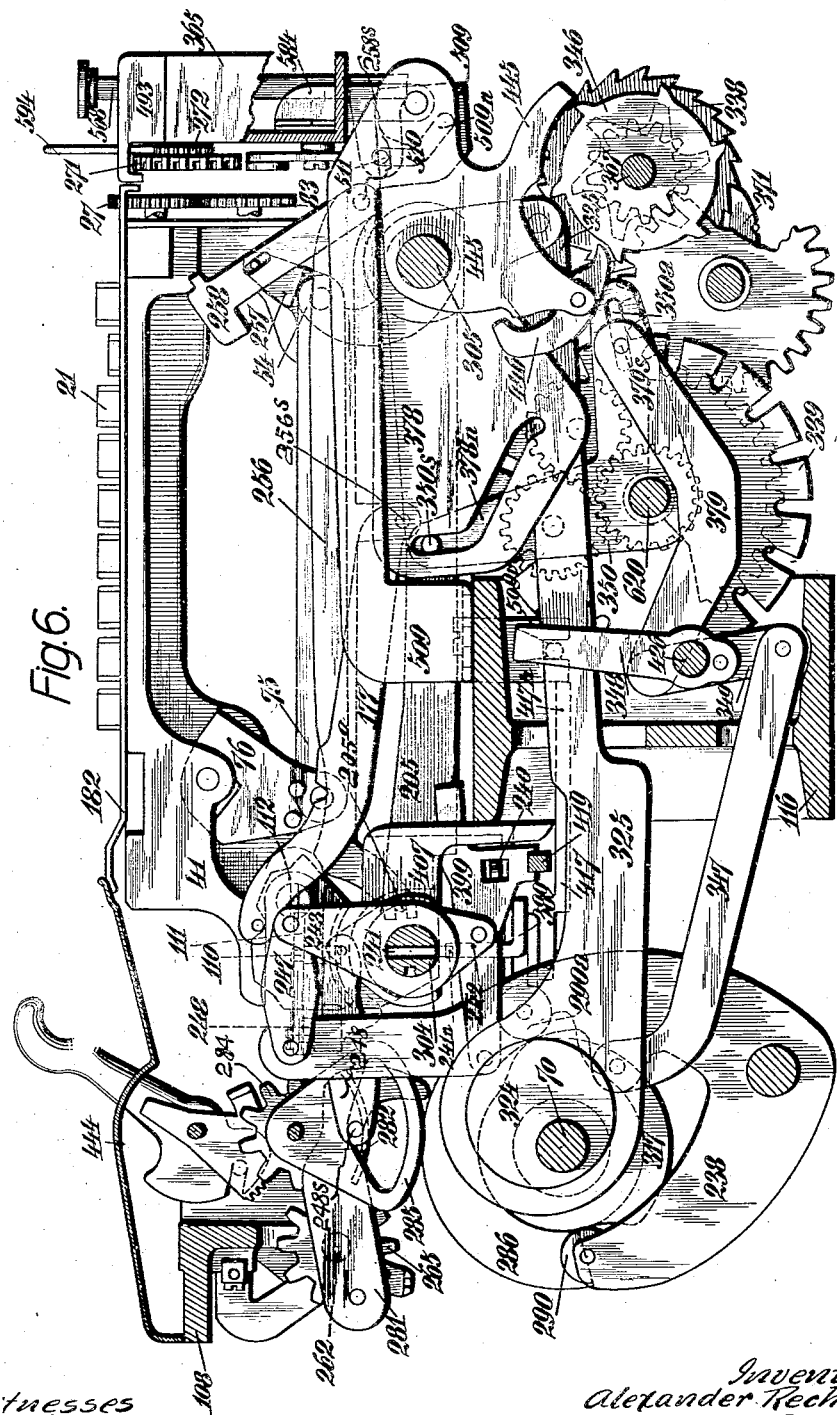

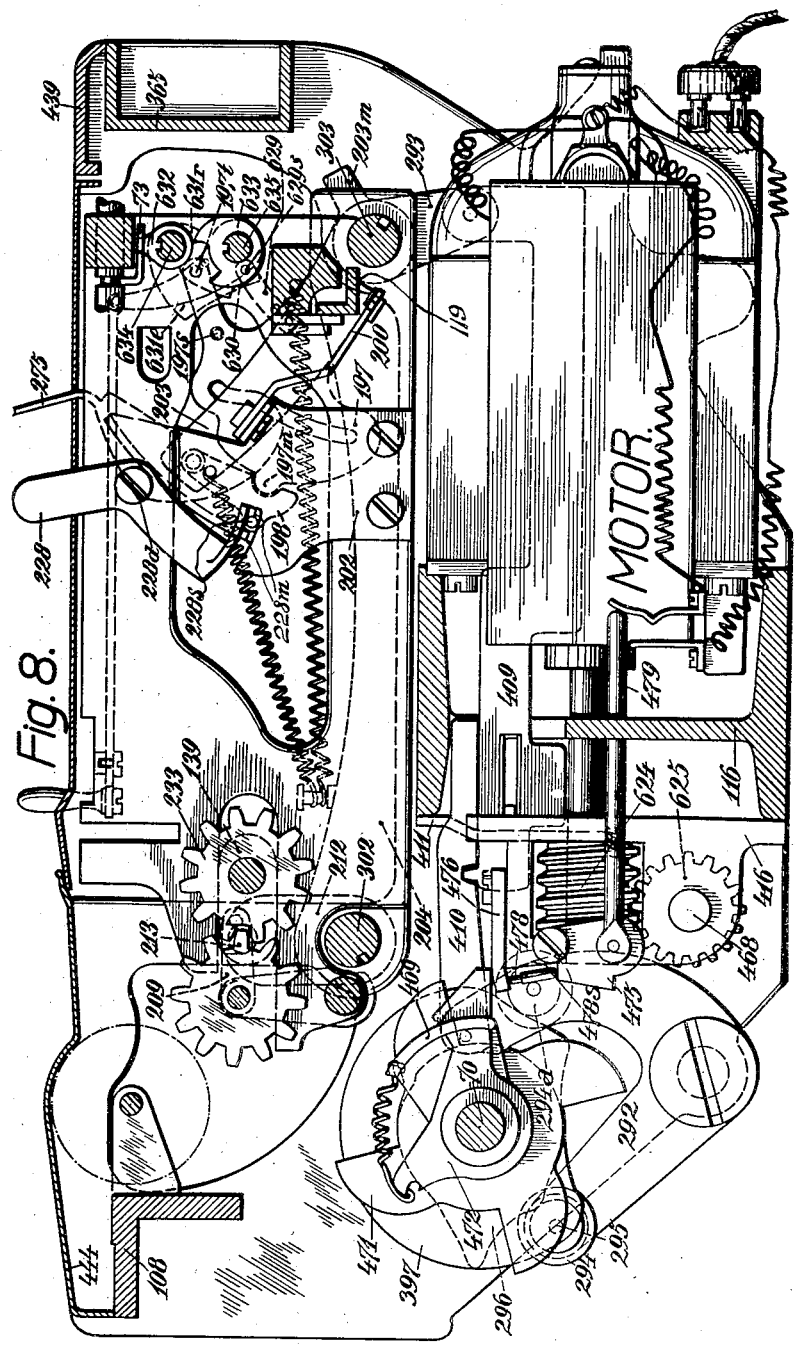

A. RECHNITZER.
CALCULATING MACHINE.
APPLICATION FILED JULY 26, 1912.

1,409,575.

Patented Mar. 14, 1922.
44 SHEETS—SHEET 10.

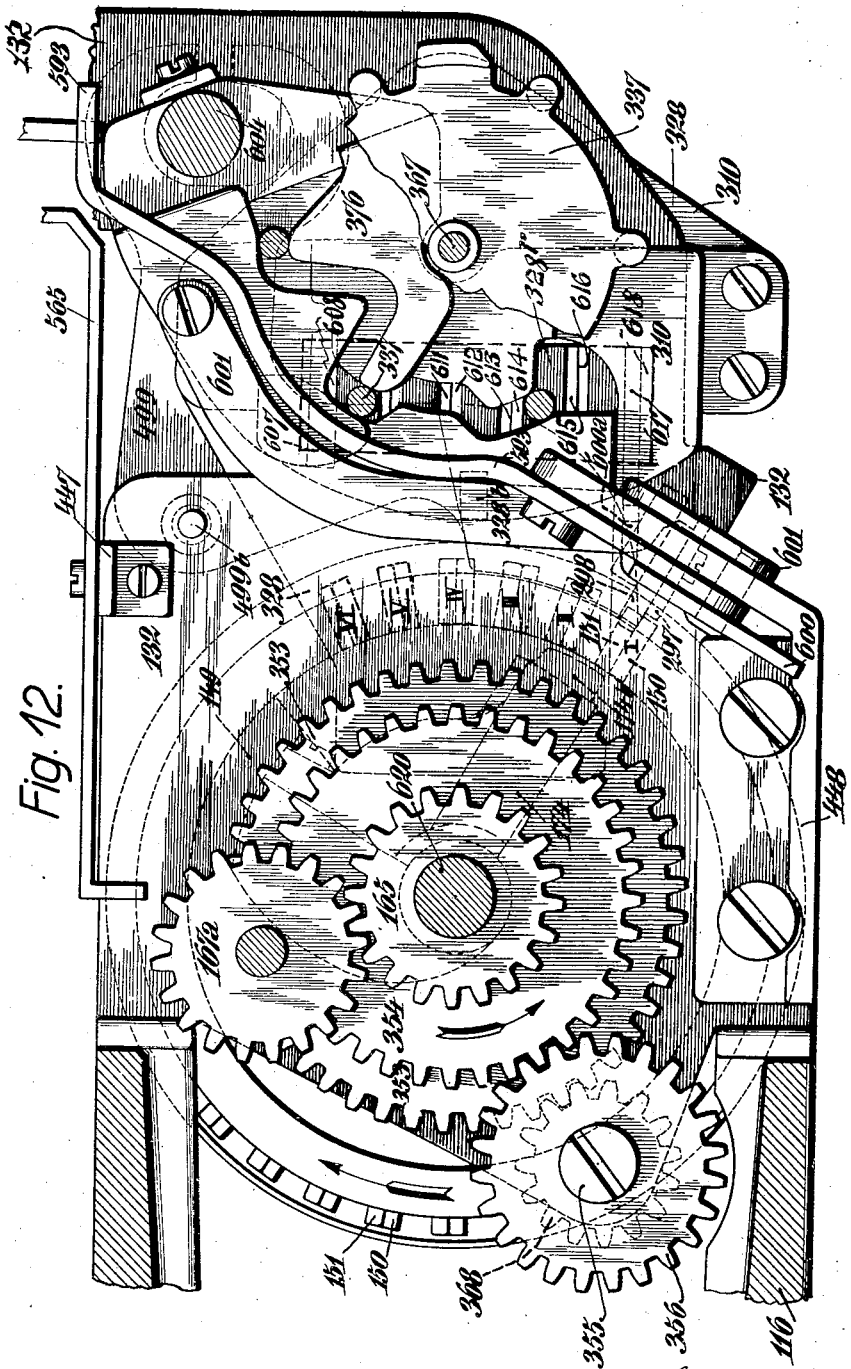

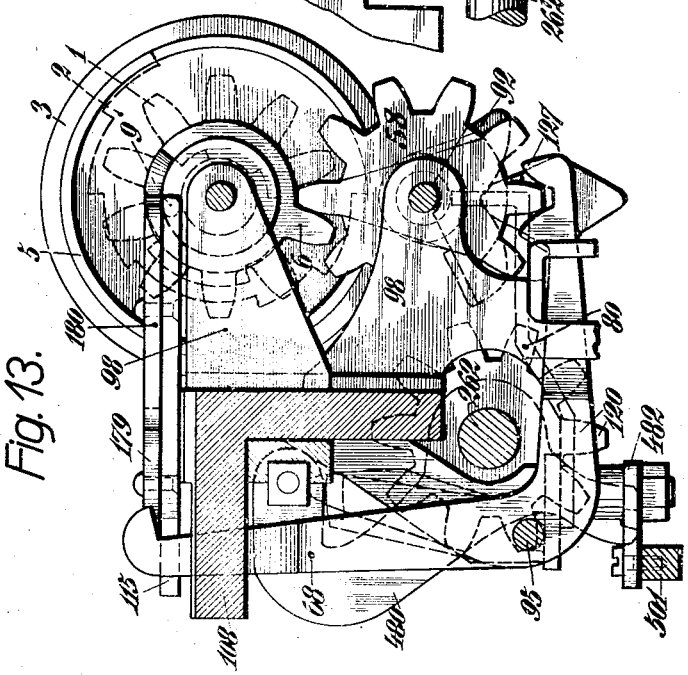

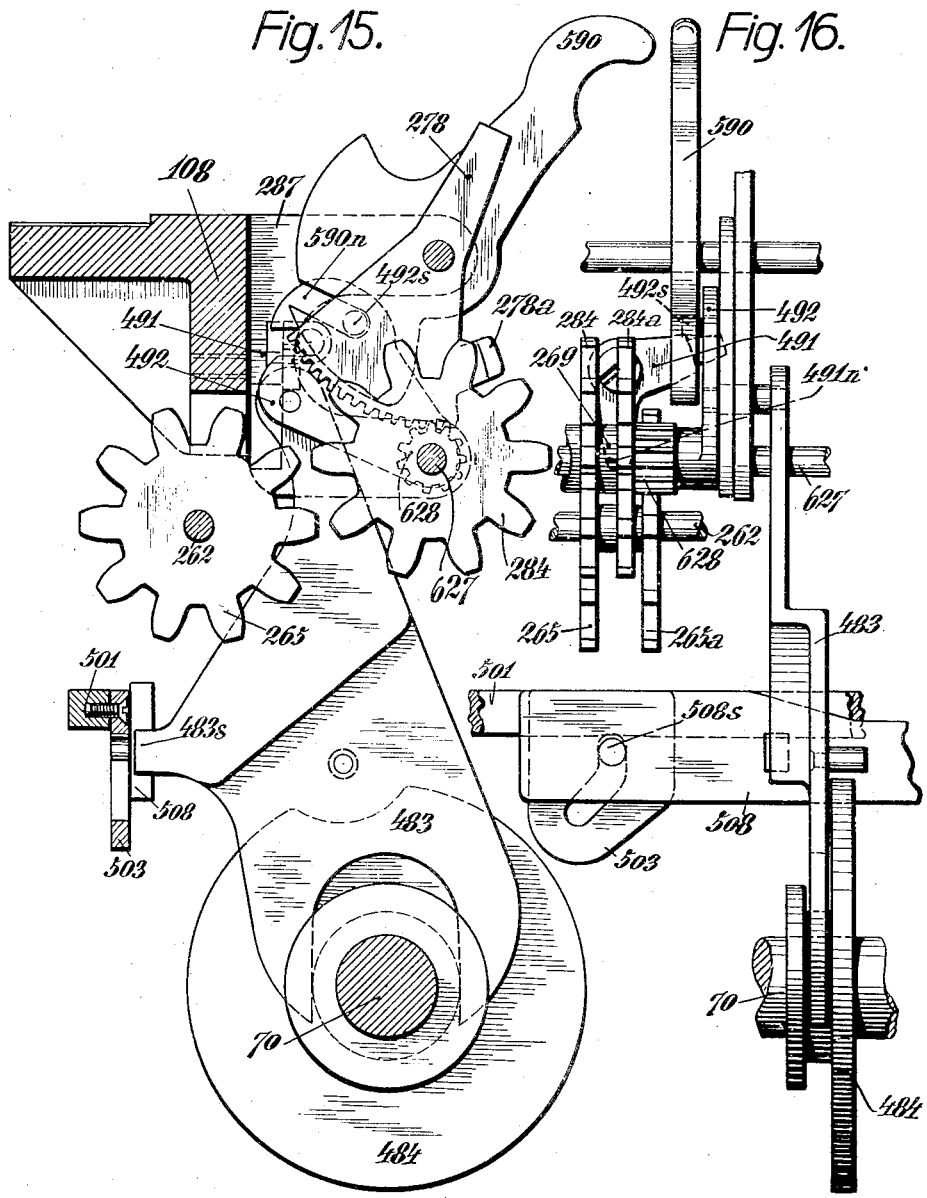

A. RECHNITZER.
CALCULATING MACHINE.
APPLICATION FILED JULY 26, 1912.

1,409,575.

Patented Mar. 14, 1922.
44 SHEETS—SHEET 14.

Witnesses
E. A. Jams
U. Binstein

Inventor
Alexander Rechnitzer
by Emerson P. Jewell
attorney

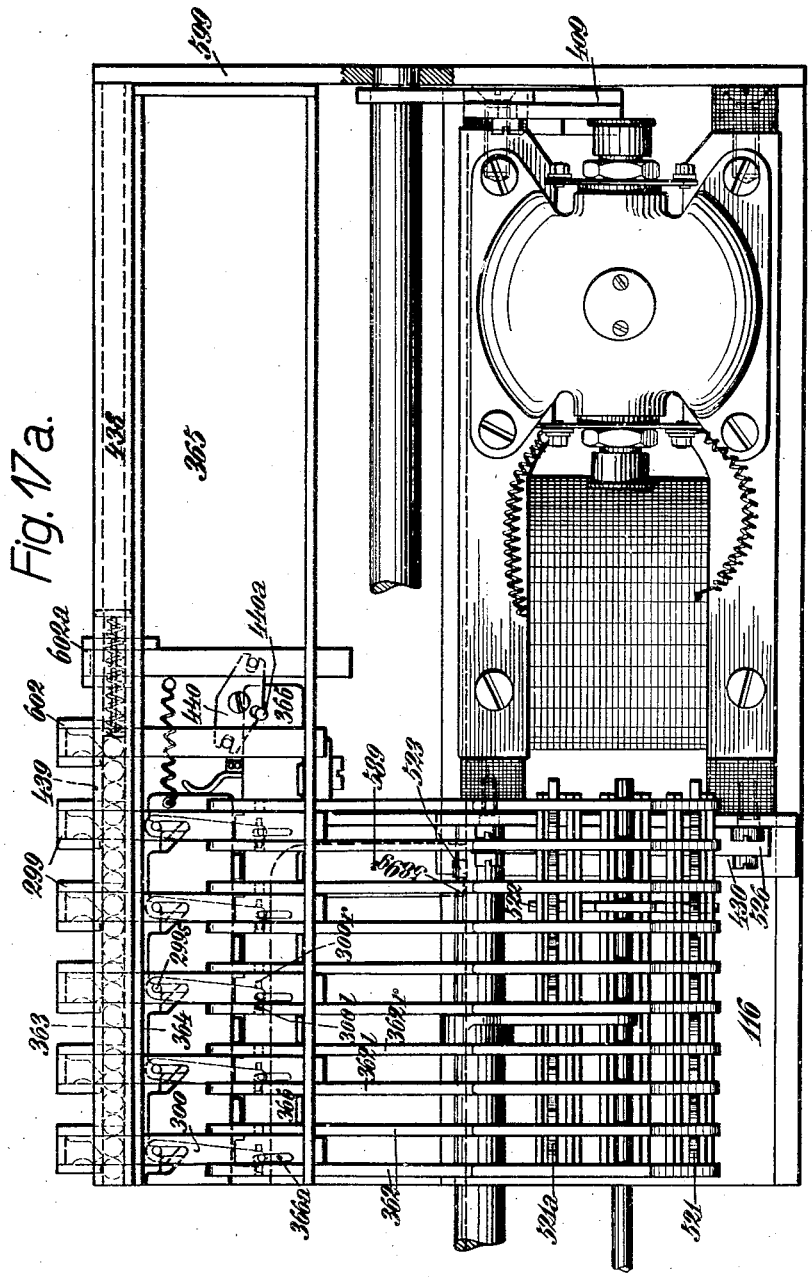

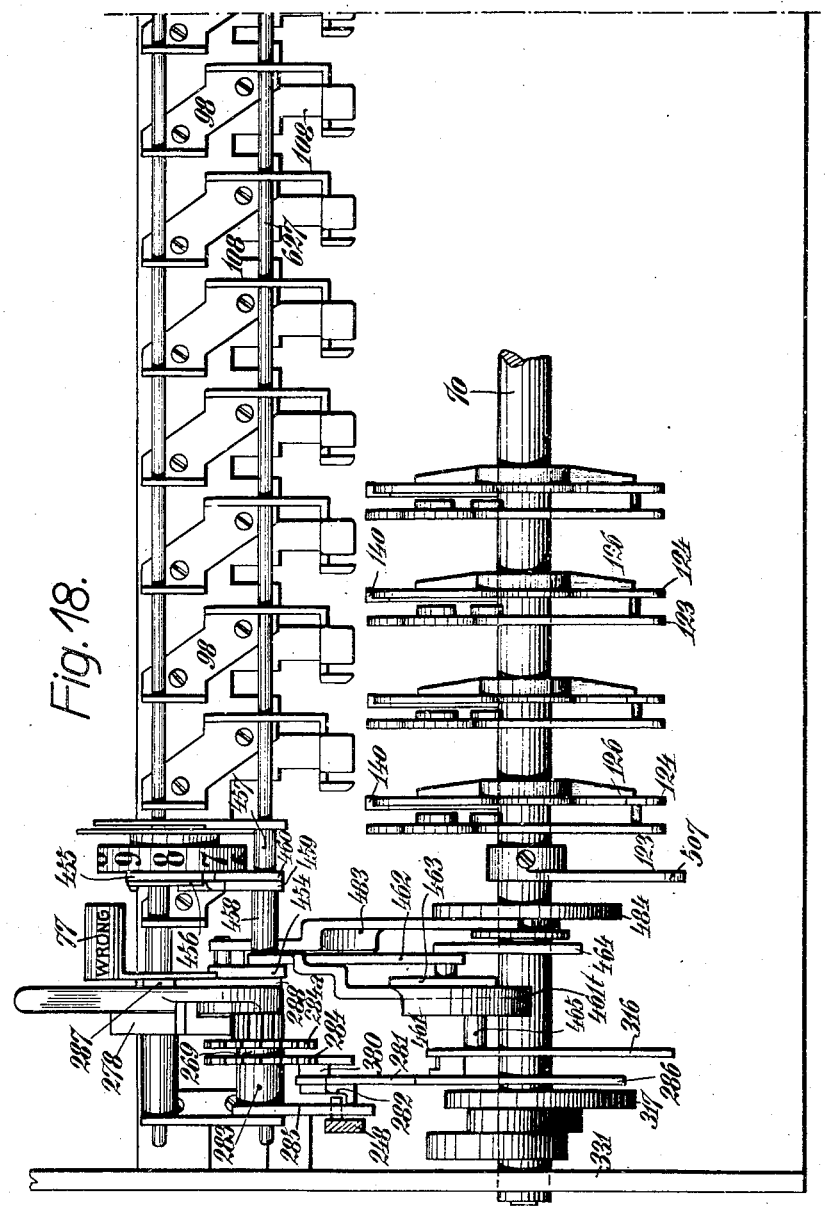

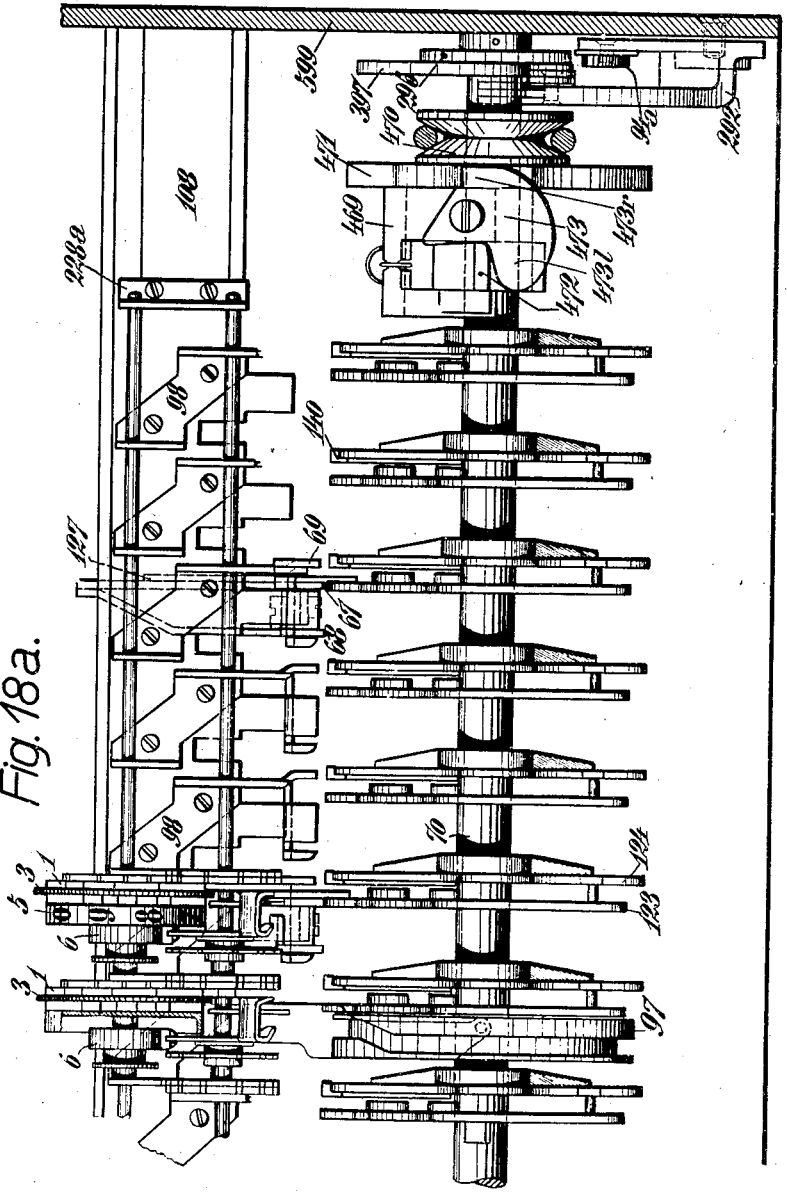

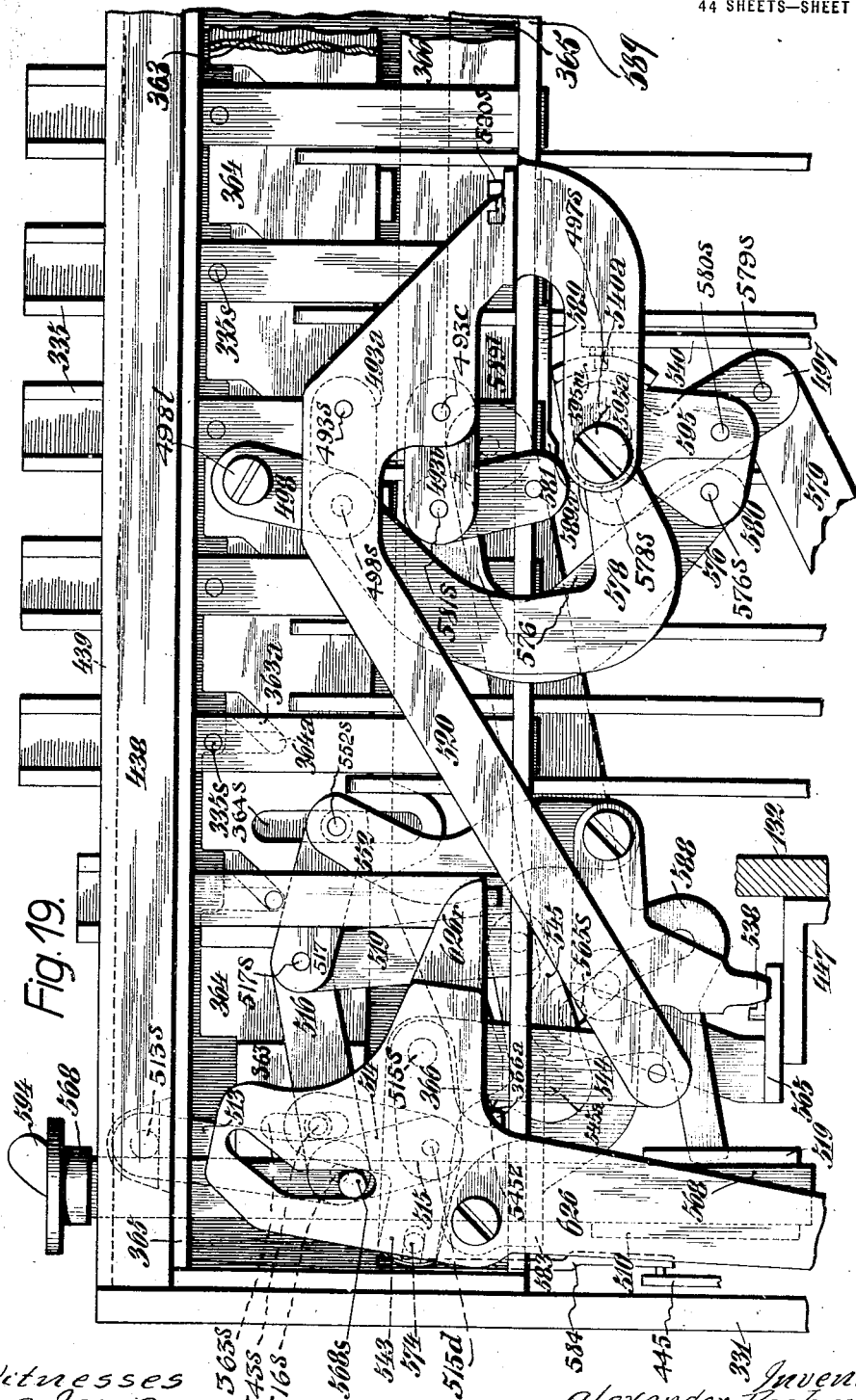

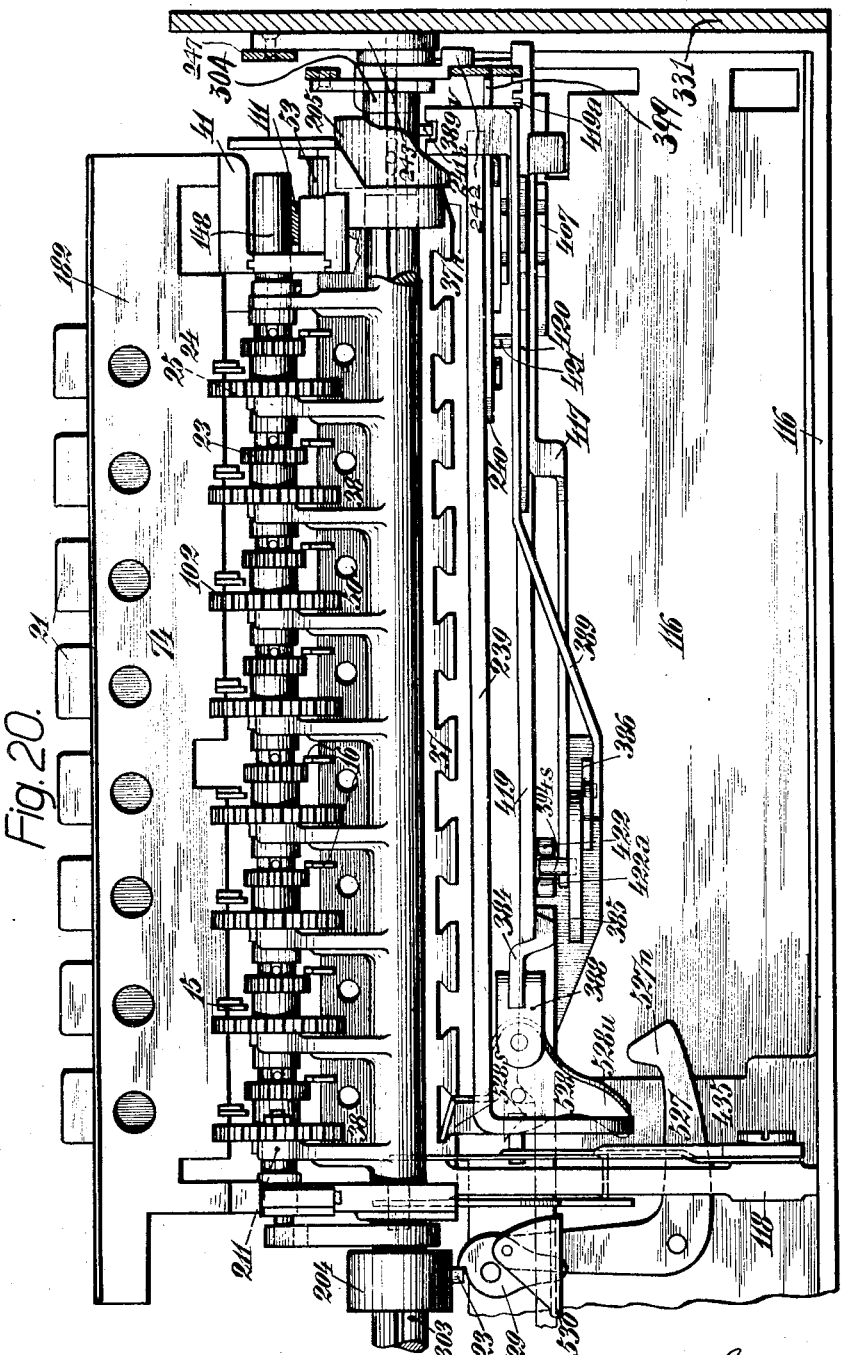

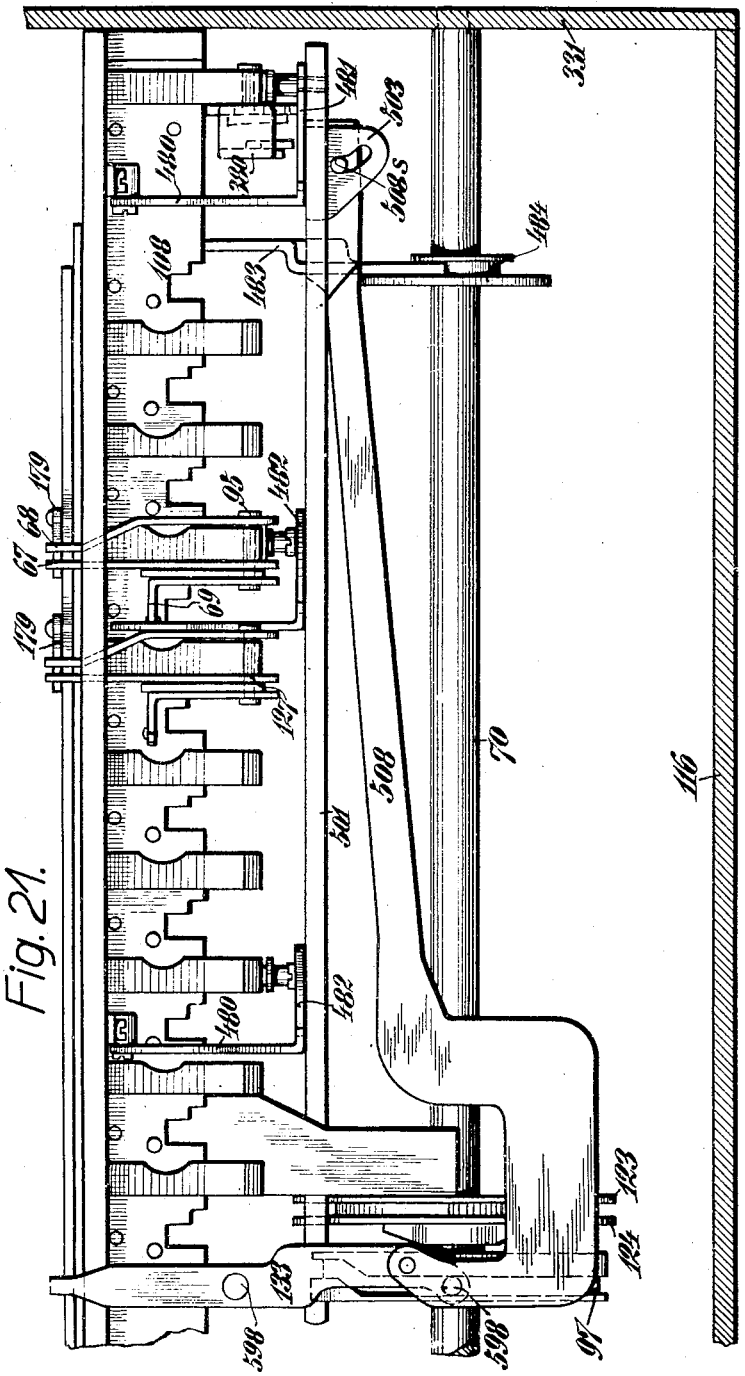

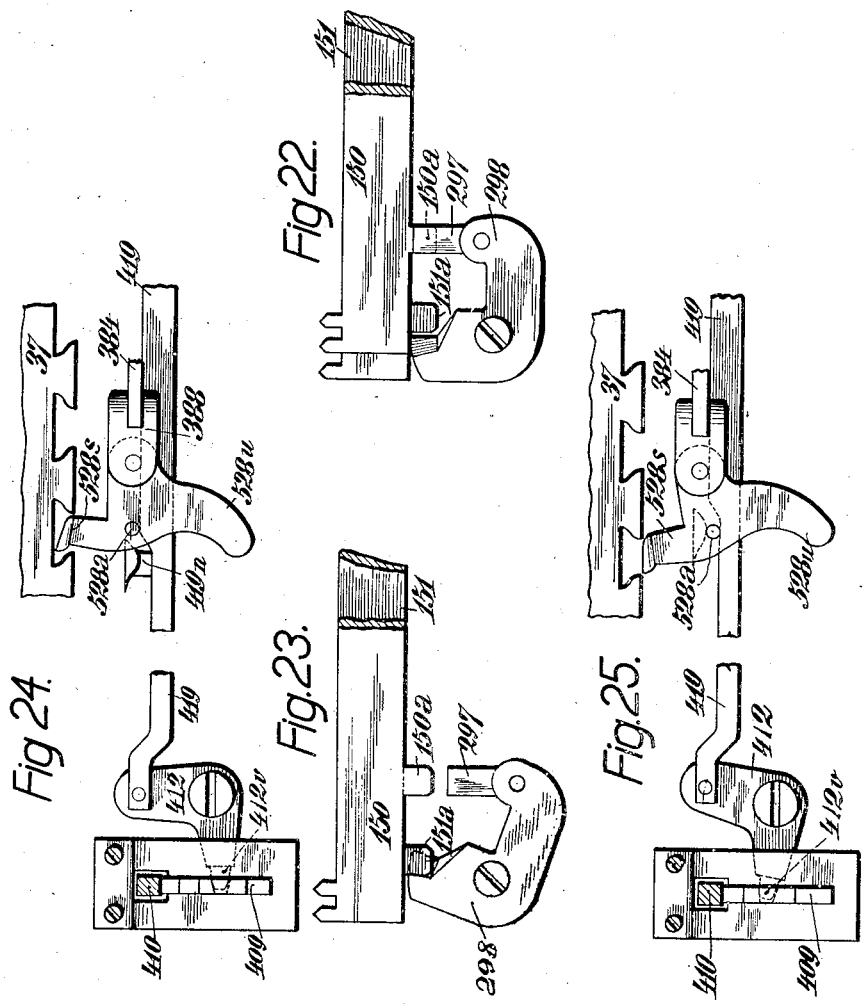

A. RECHNITZER.
CALCULATING MACHINE.
APPLICATION FILED JULY 26, 1912.

1,409,575.

Patented Mar. 14, 1922.
44 SHEETS—SHEET 22.

Witnesses:
E. A. Jarvis
T. Bernstein

Inventor:
Alexander Rechnitzer
by Emerson R. Newell
attorney

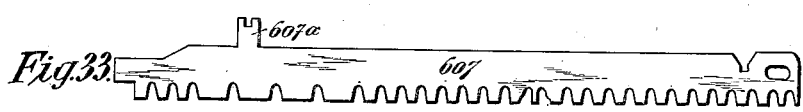
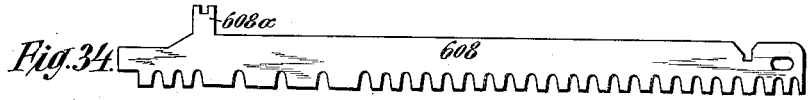
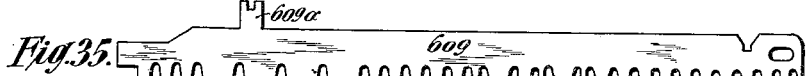
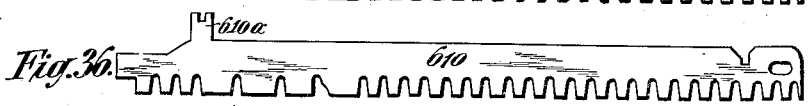
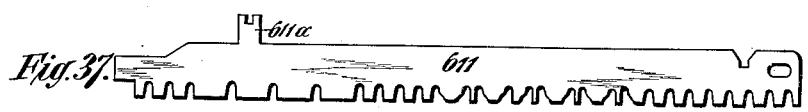
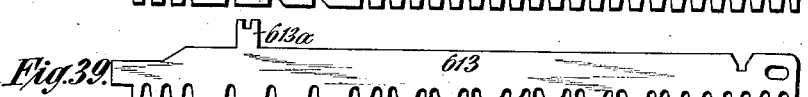
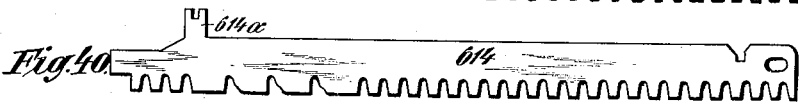
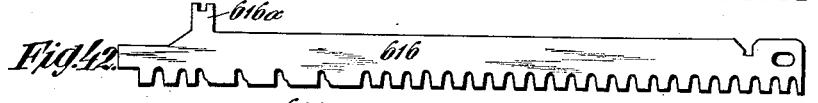
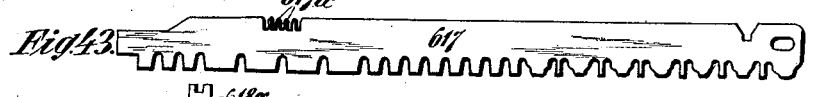

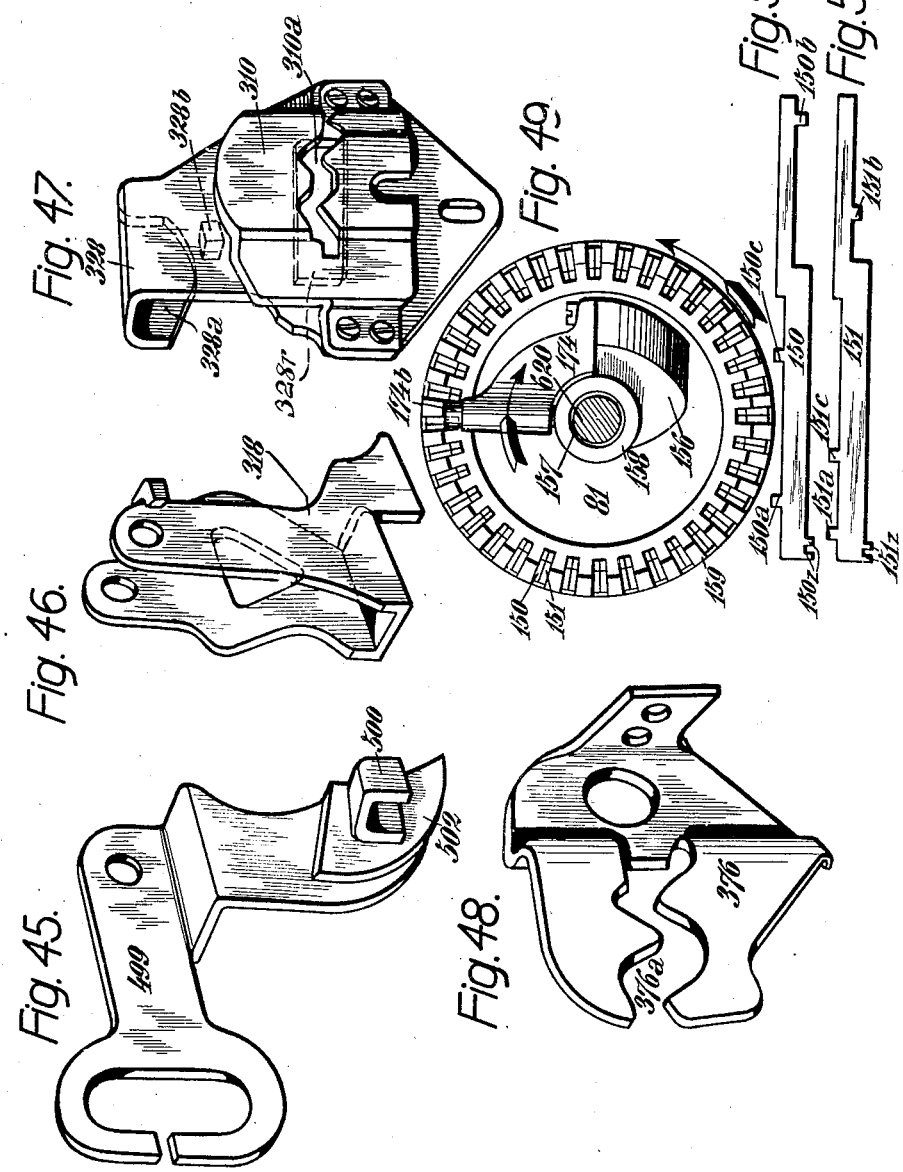

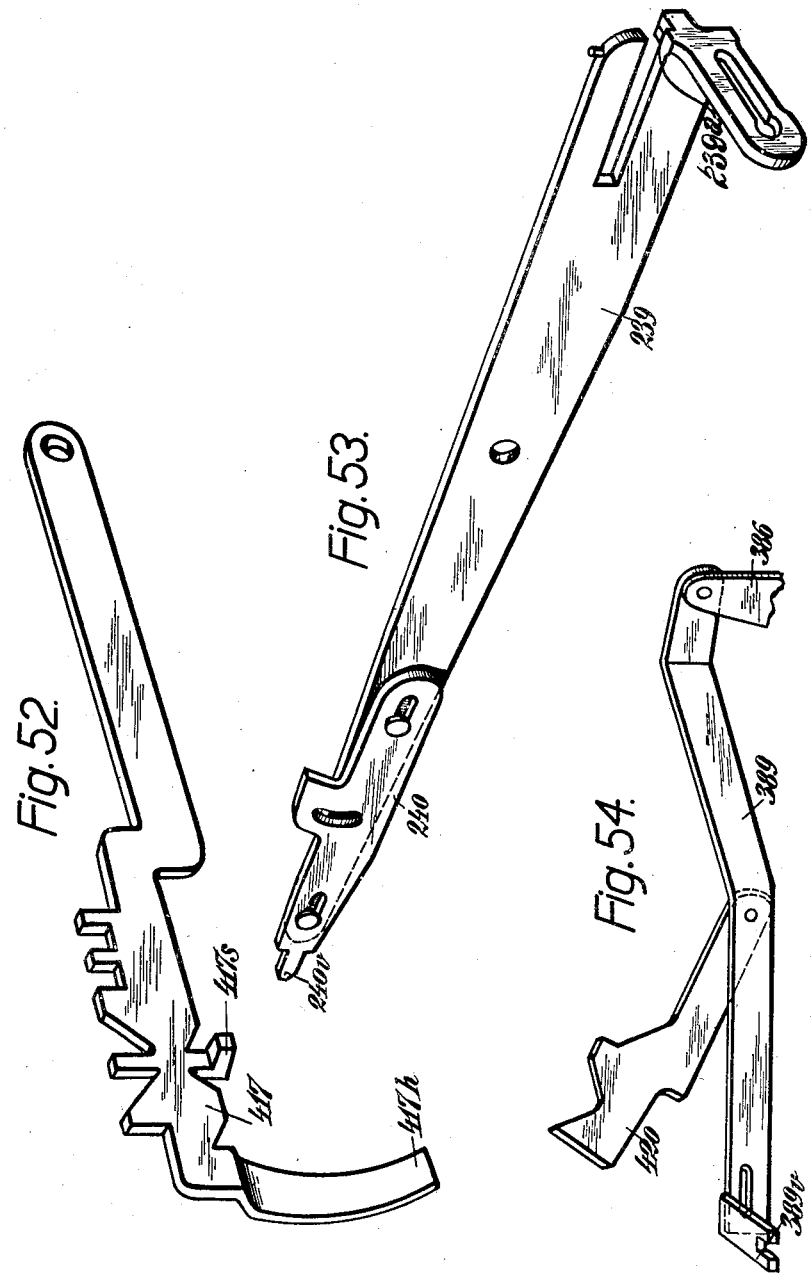

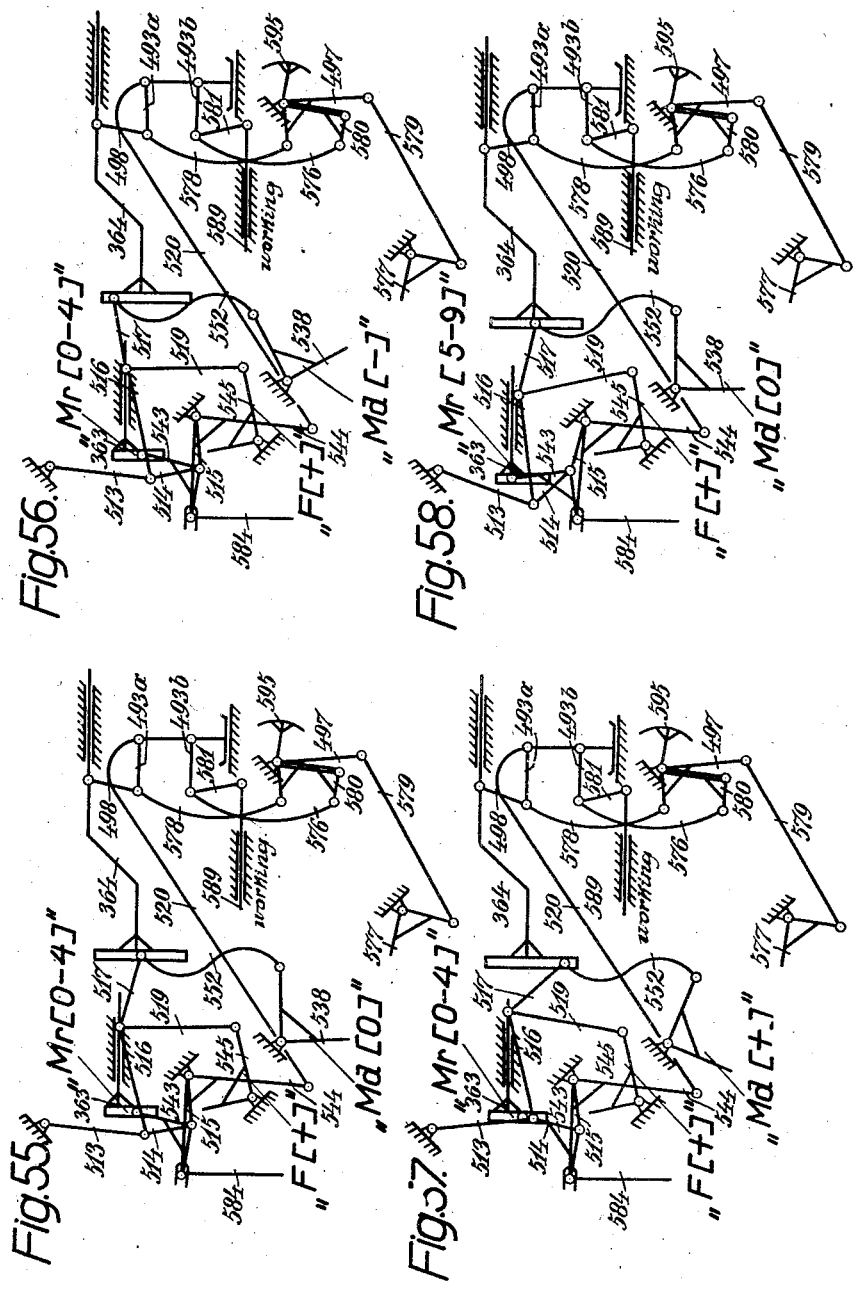

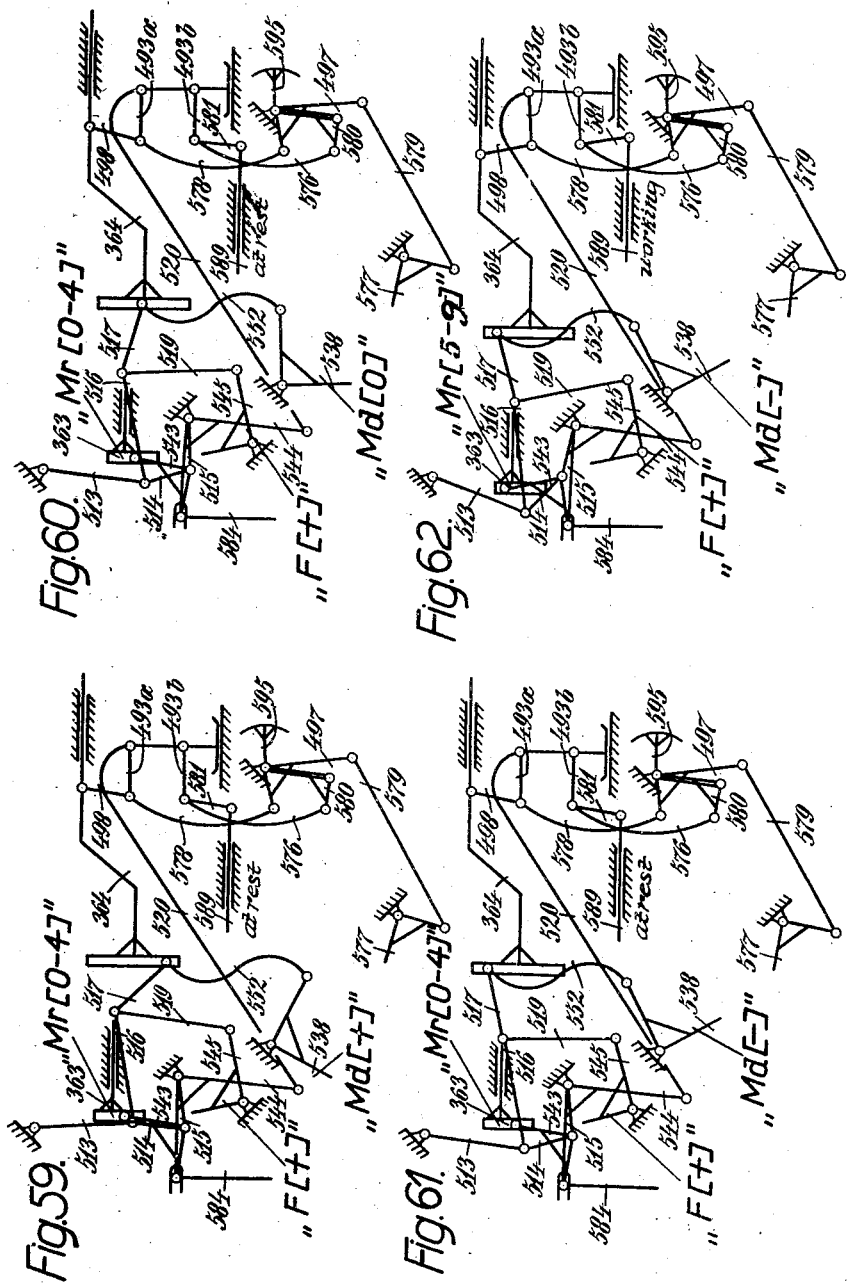

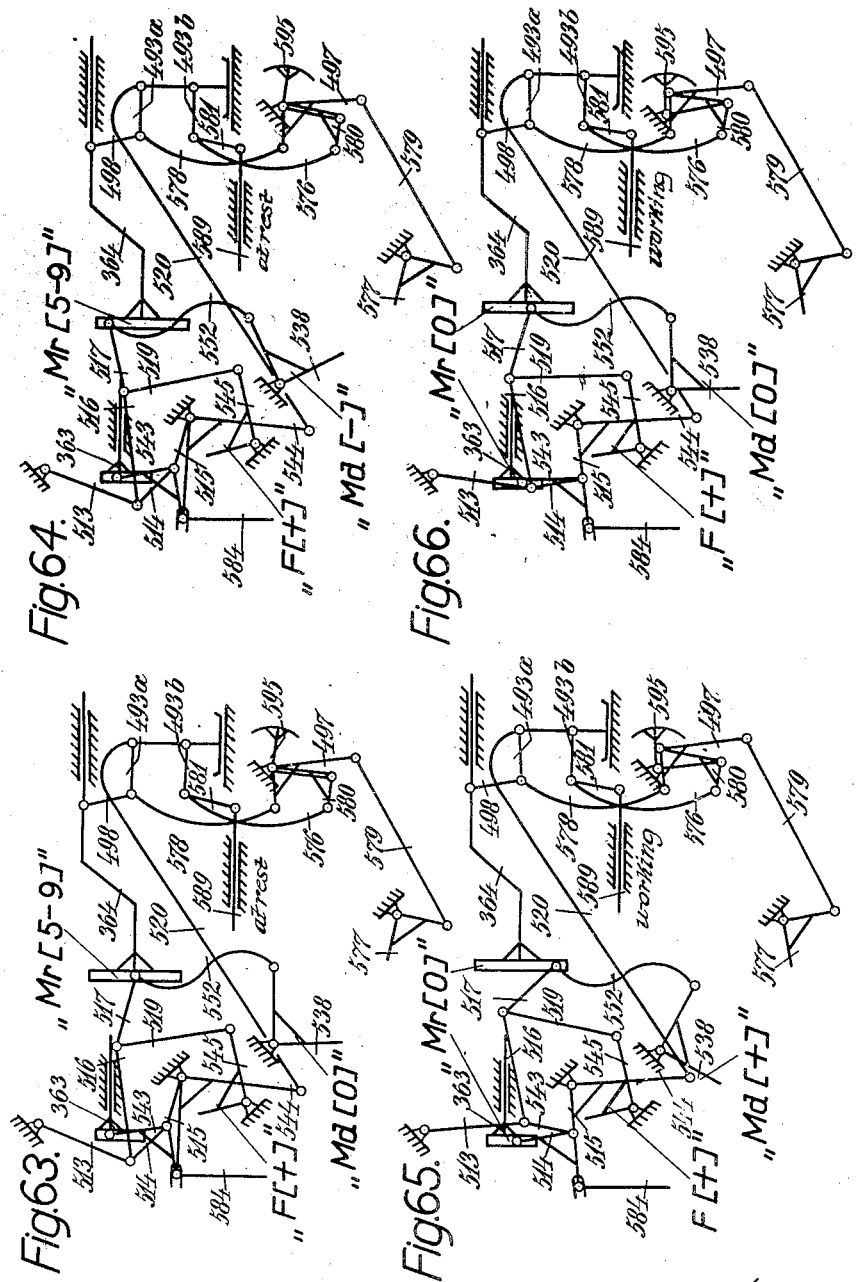

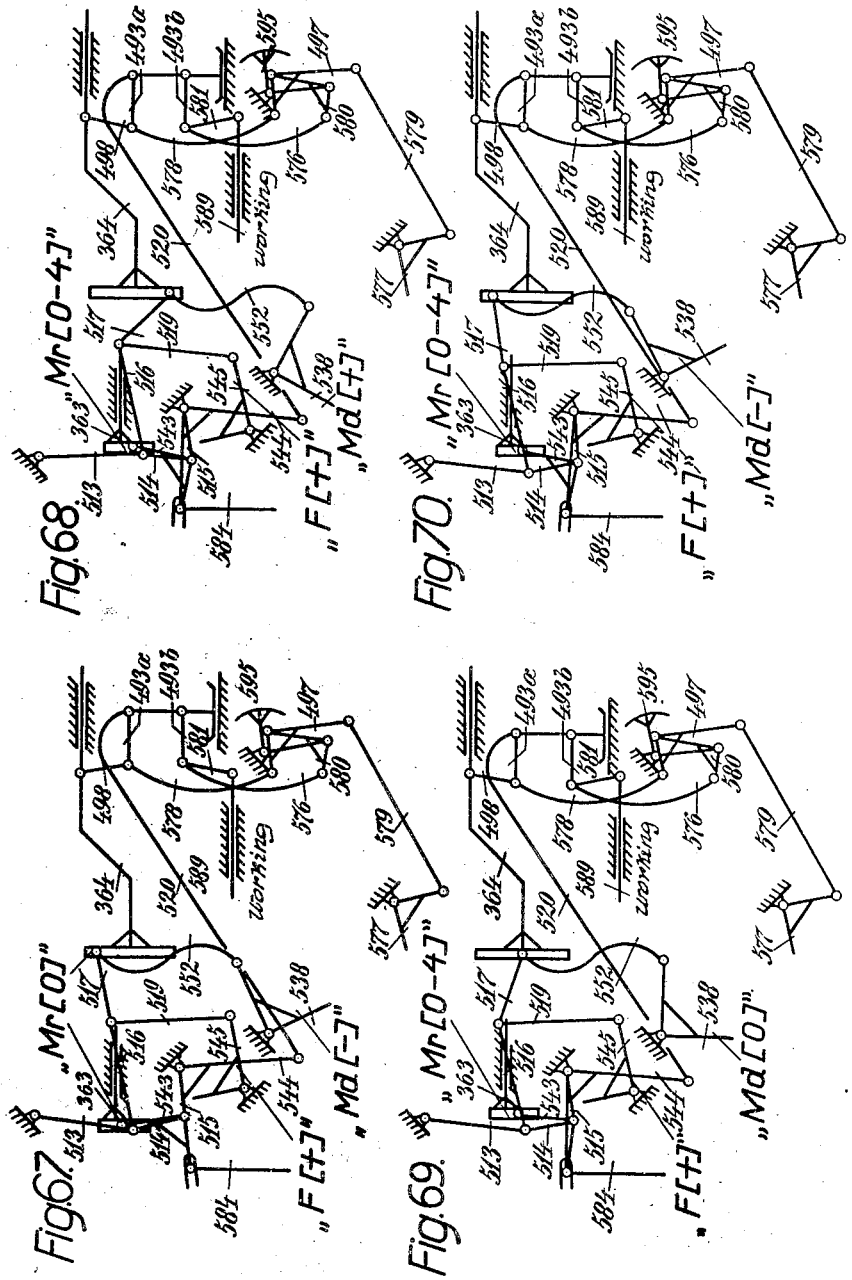

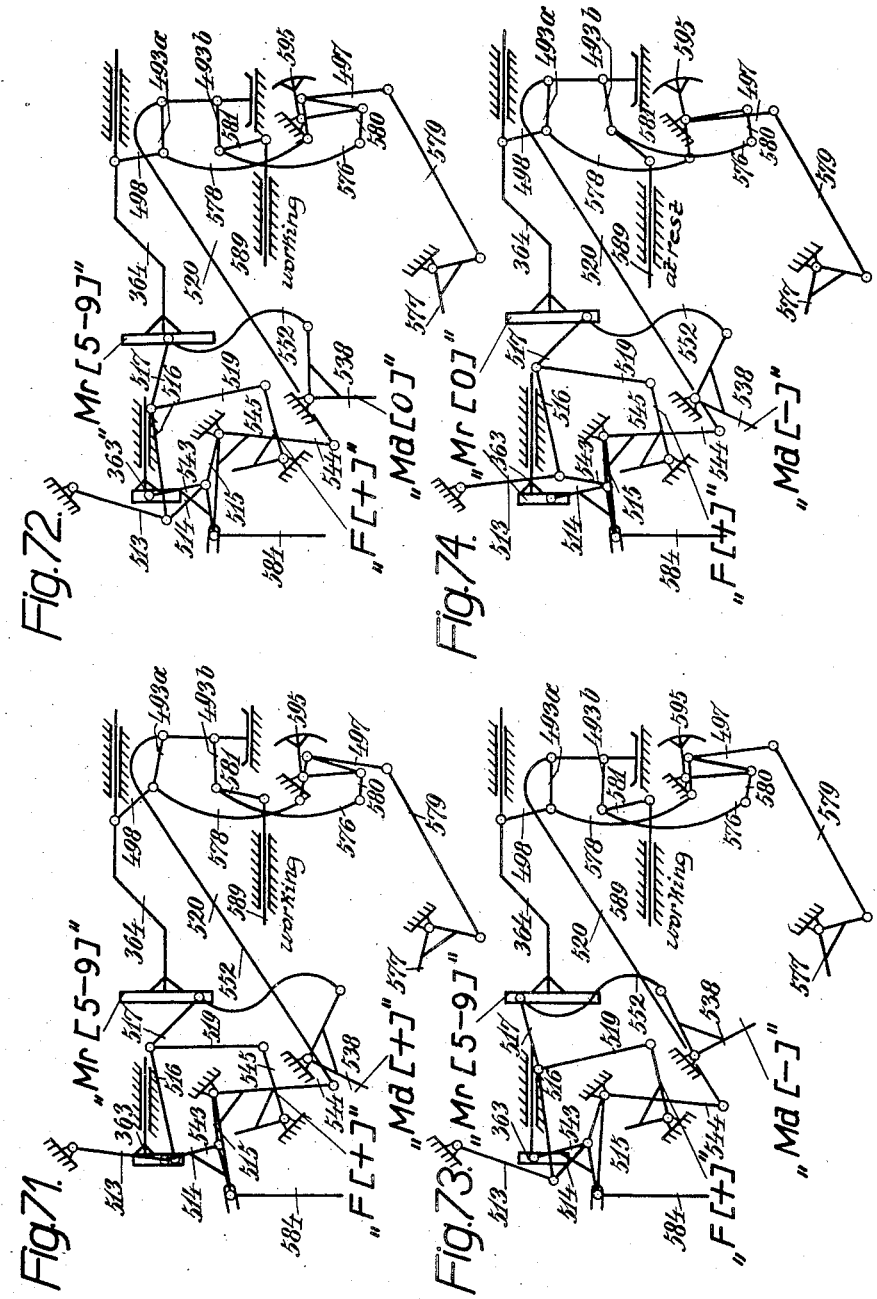

A. RECHNITZER.
CALCULATING MACHINE.
APPLICATION FILED JULY 26, 1912.
1,409,575.
Patented Mar. 14, 1922.
44 SHEETS—SHEET 31.
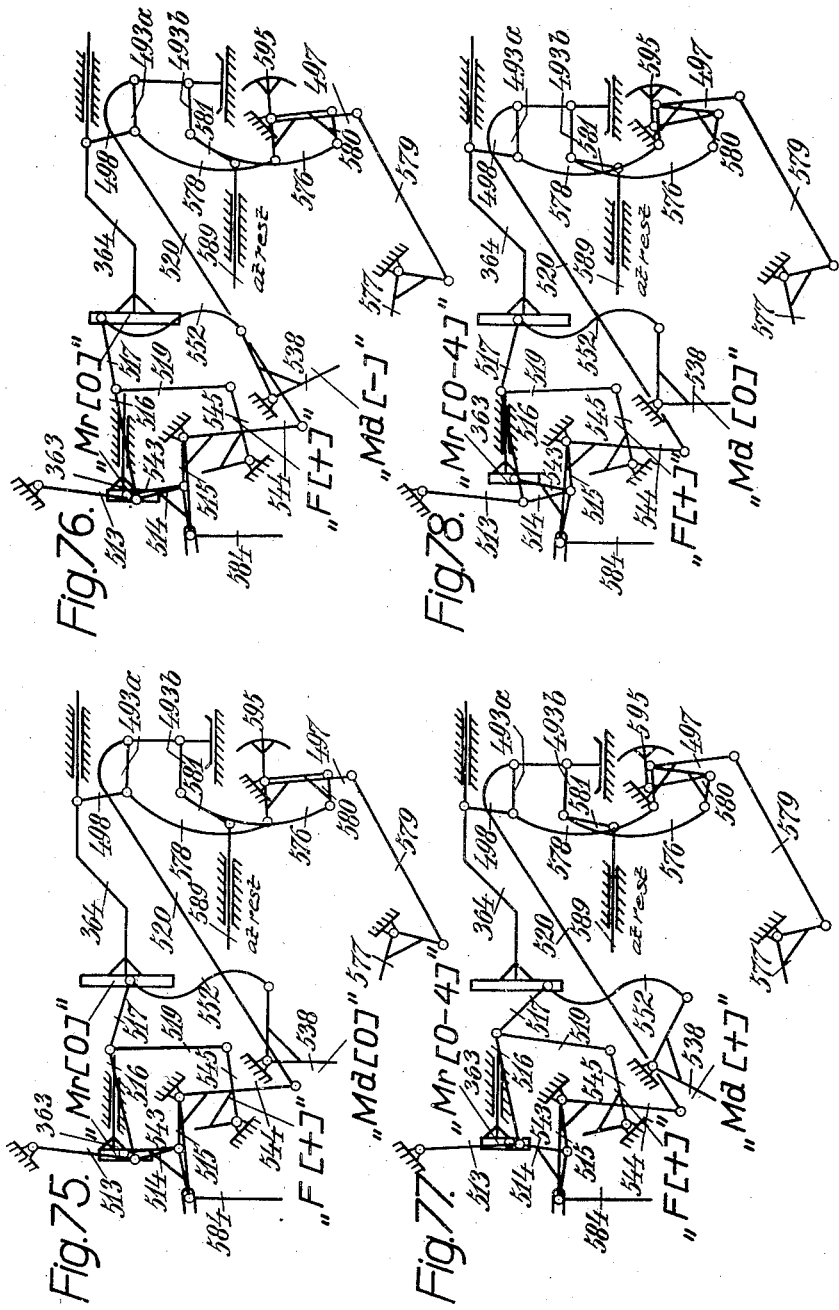

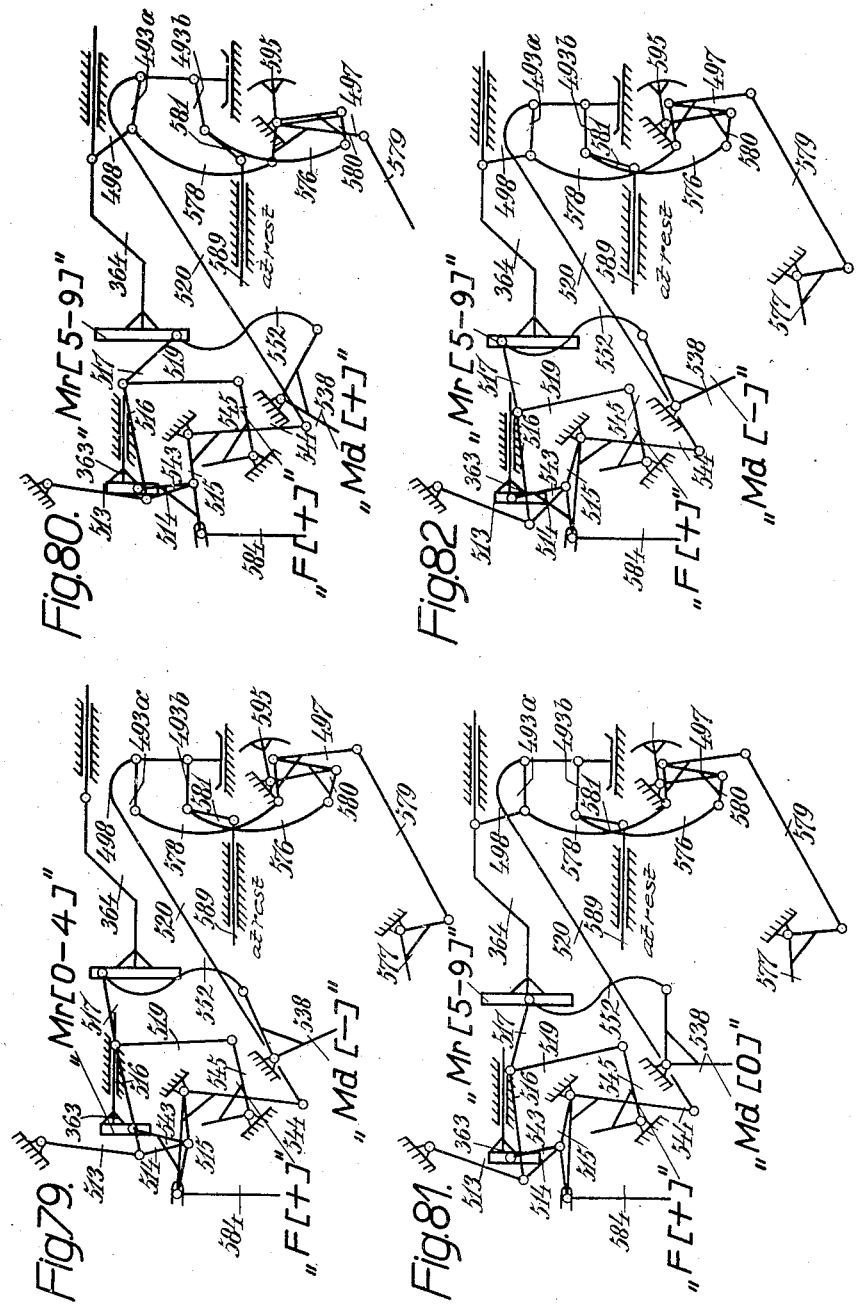

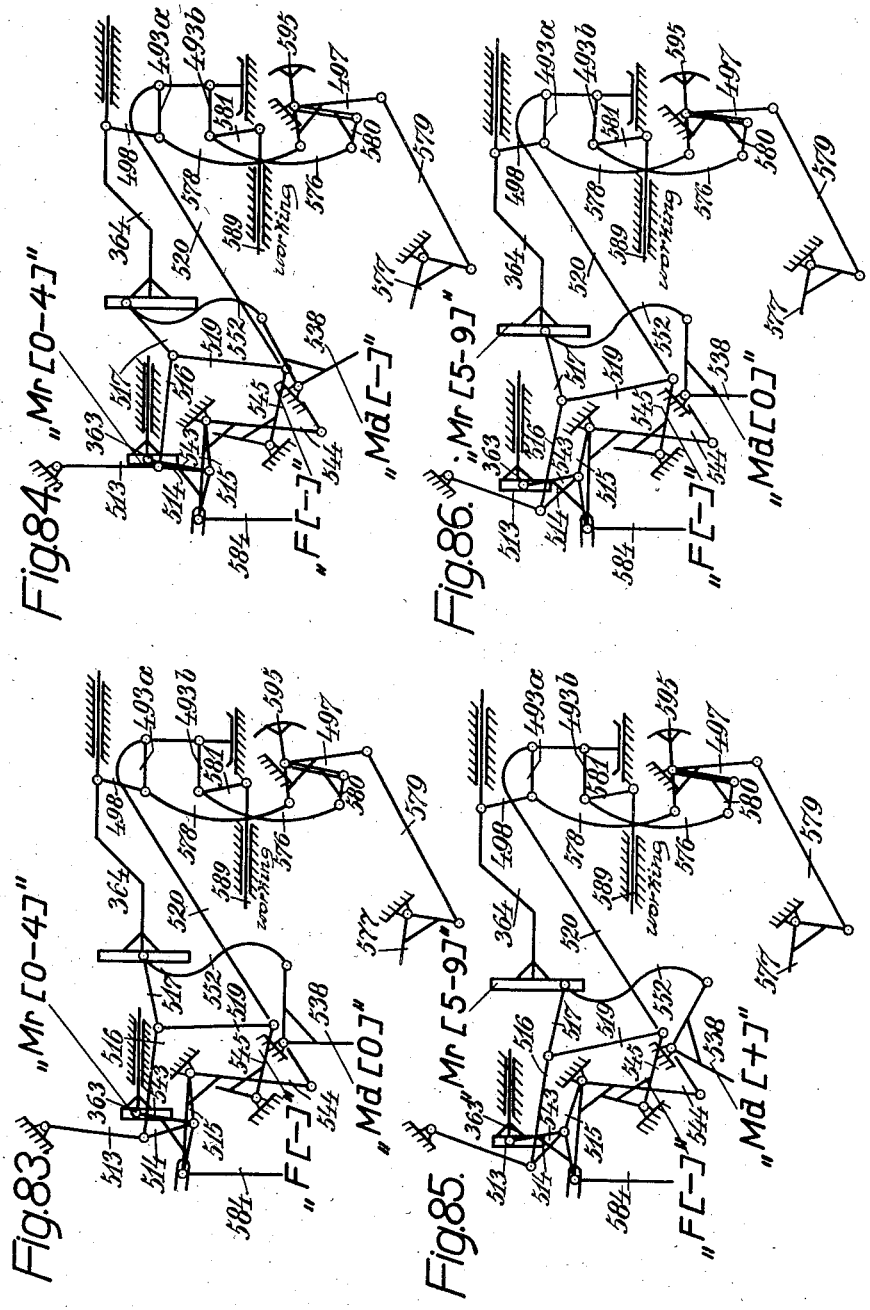

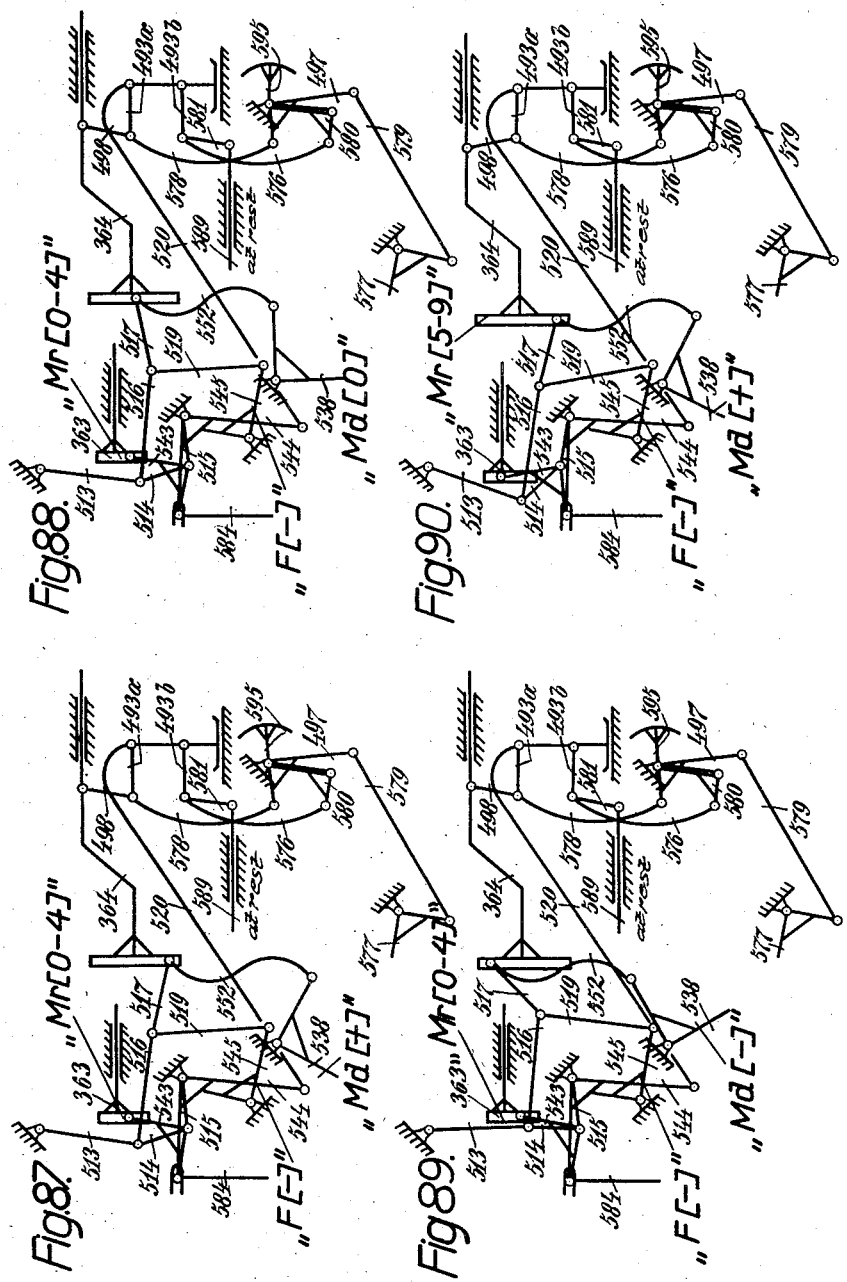

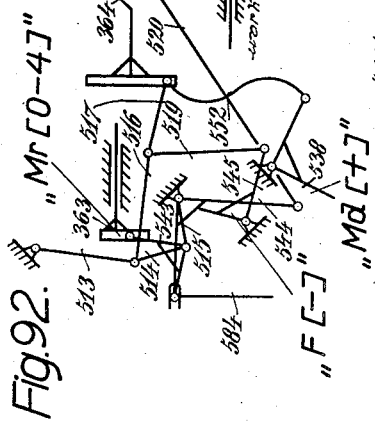
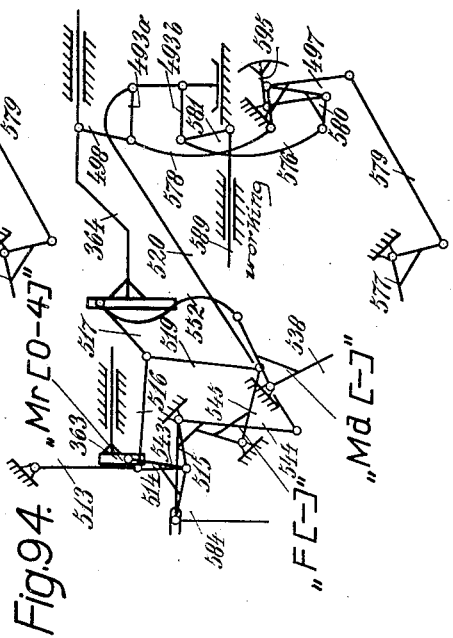
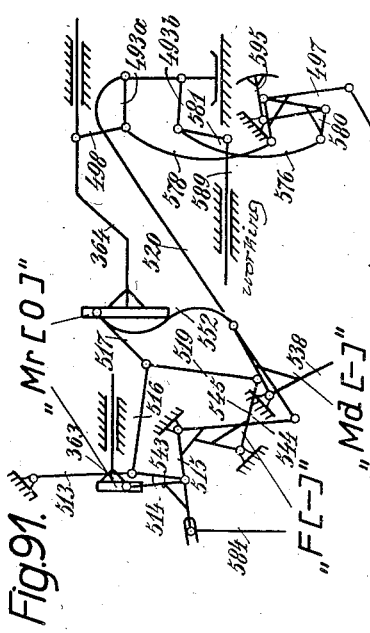
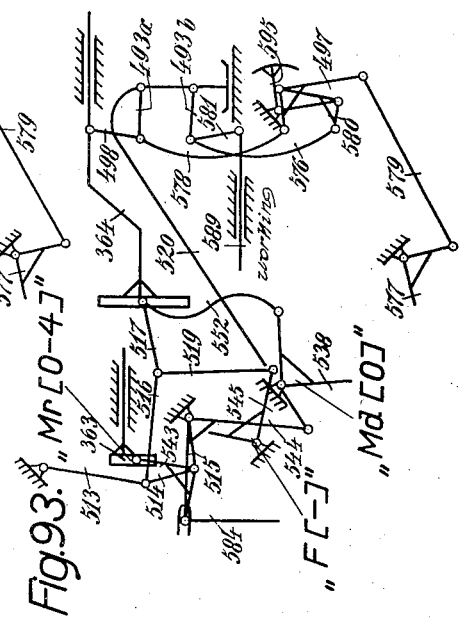

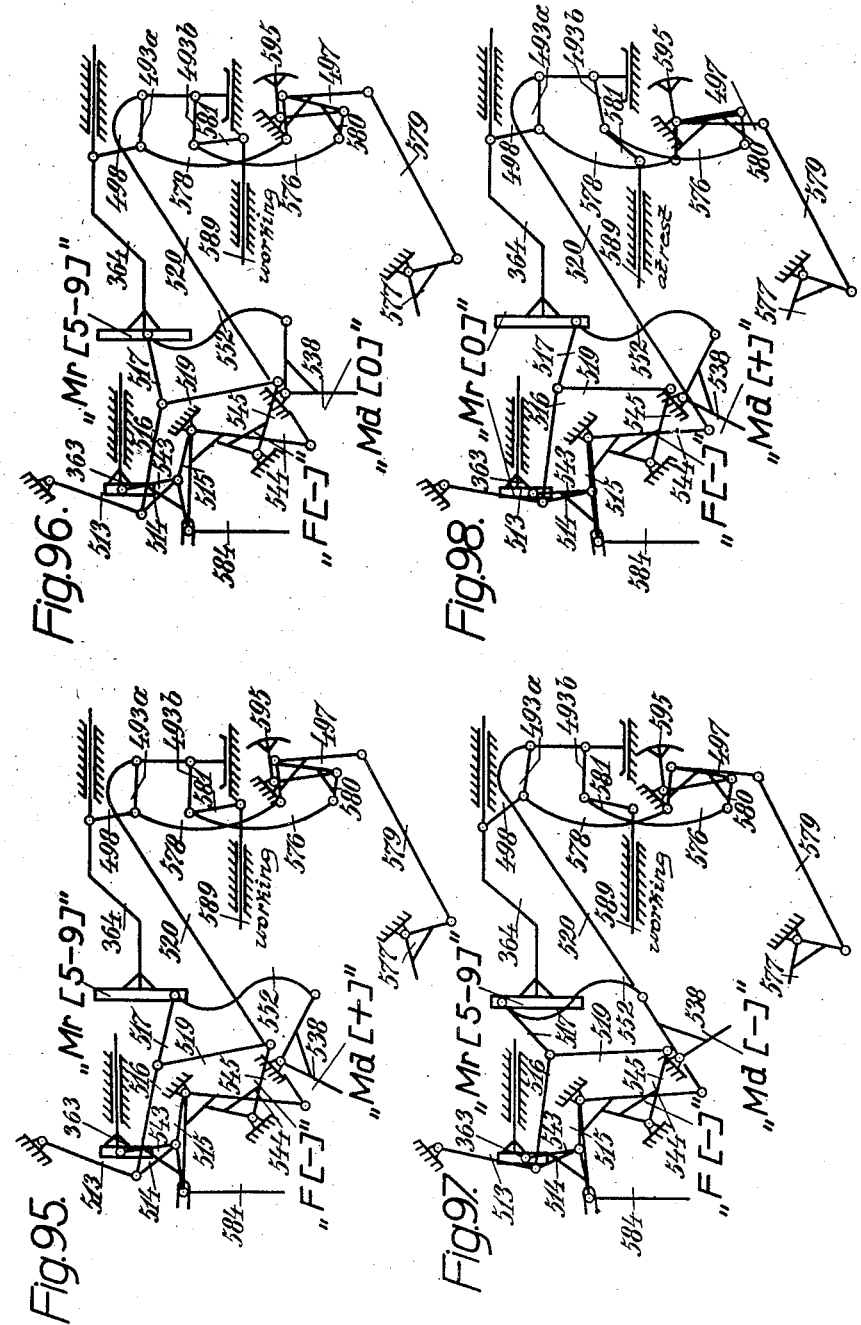

A. RECHNITZER.
CALCULATING MACHINE.
APPLICATION FILED JULY 26, 1912.
1,409,575.
Patented Mar. 14, 1922.
44 SHEETS—SHEET 37.
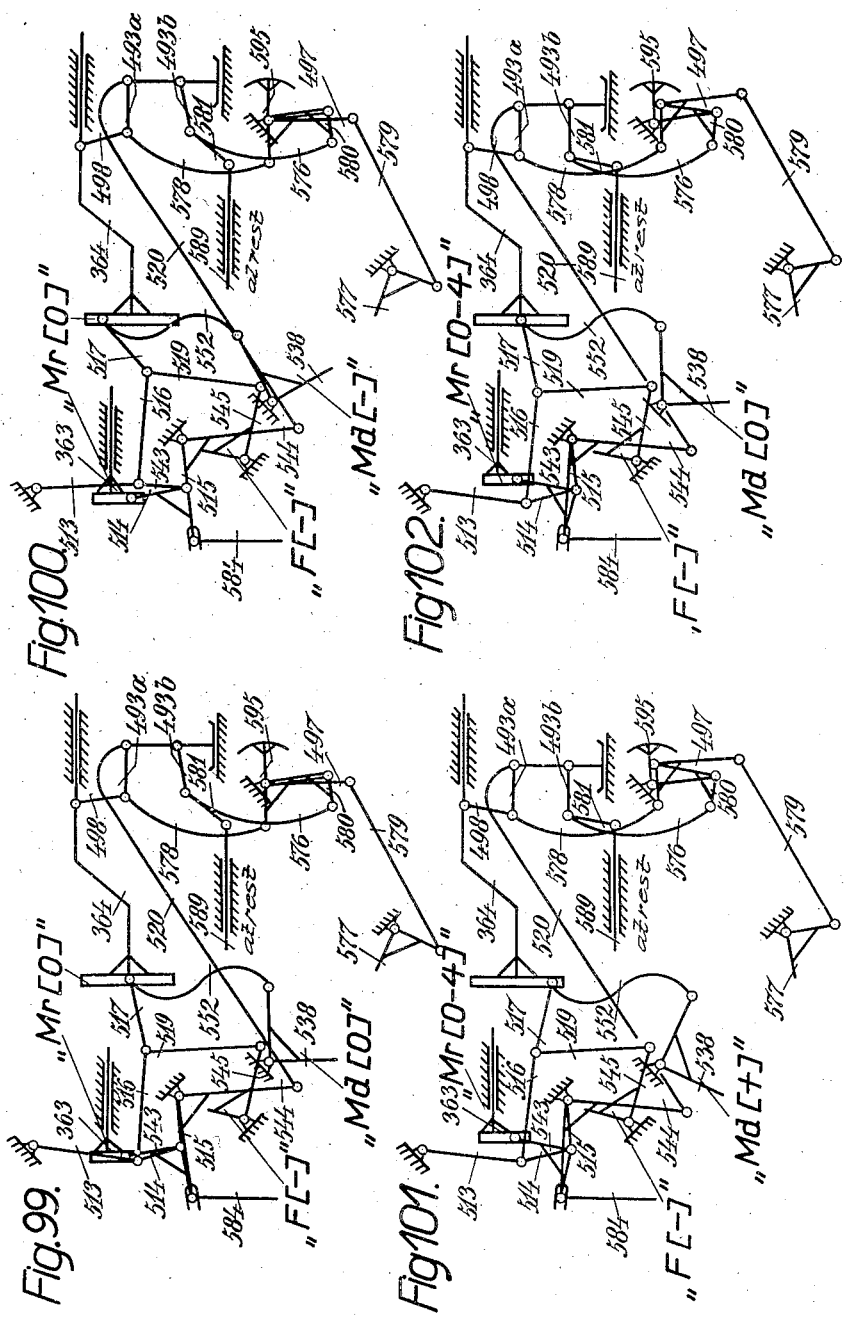
Witnesses:
E. A. Jarvis
A. Bernstein
Inventor
Alexander Rechnitzer
by Emerson R. Newell
attorney

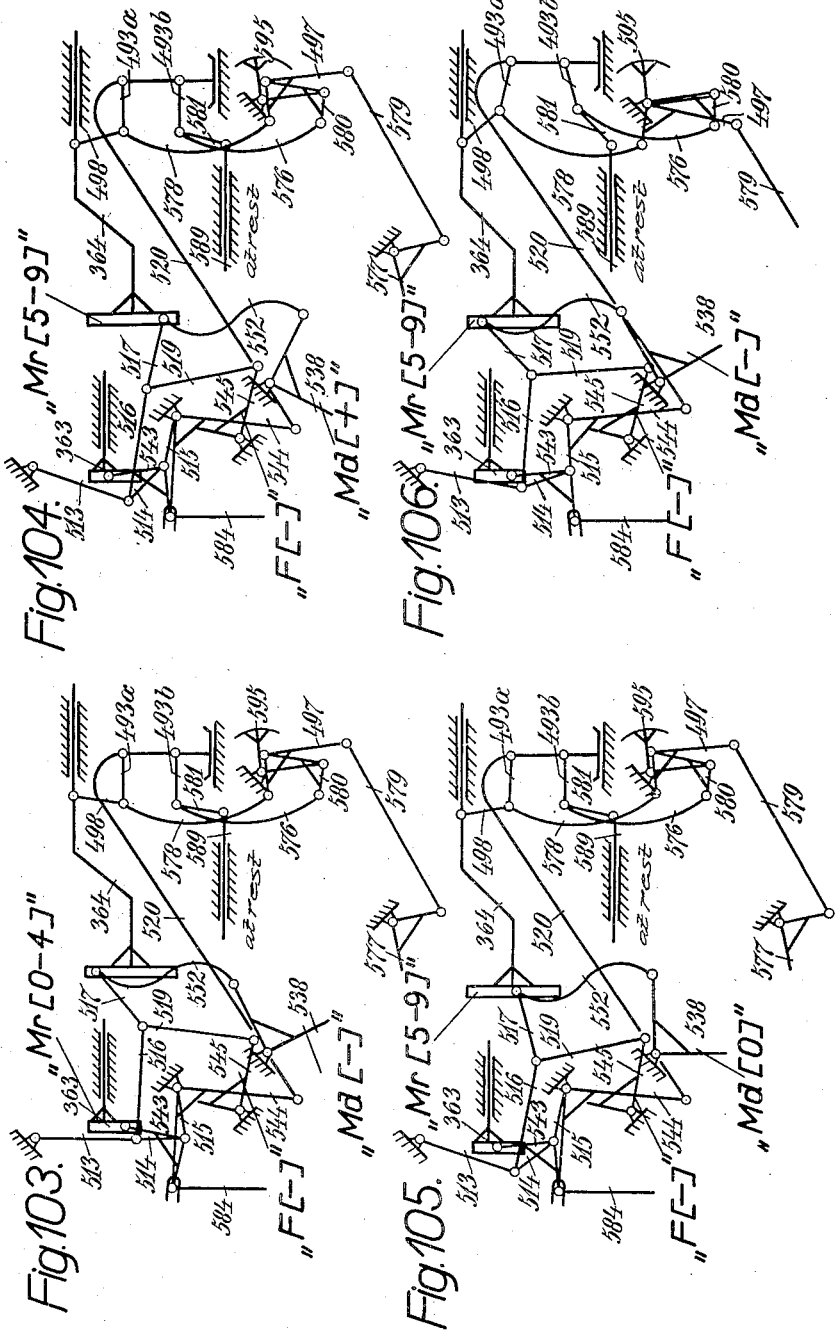

A. RECHNITZER.
CALCULATING MACHINE.
APPLICATION FILED JULY 26, 1912.
1,409,575.
Patented Mar. 14, 1922.
44 SHEETS—SHEET 39.
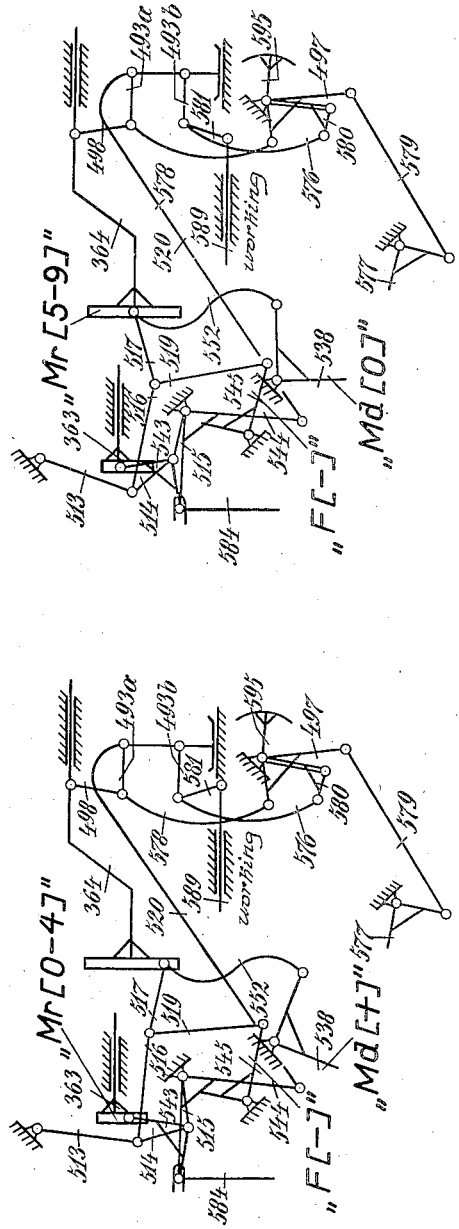
Witnesses
C. A. Jarvis
A. Bernstein
Inventor:
Alexander Rechnitzer
by Emerson R. Newell
attorney.

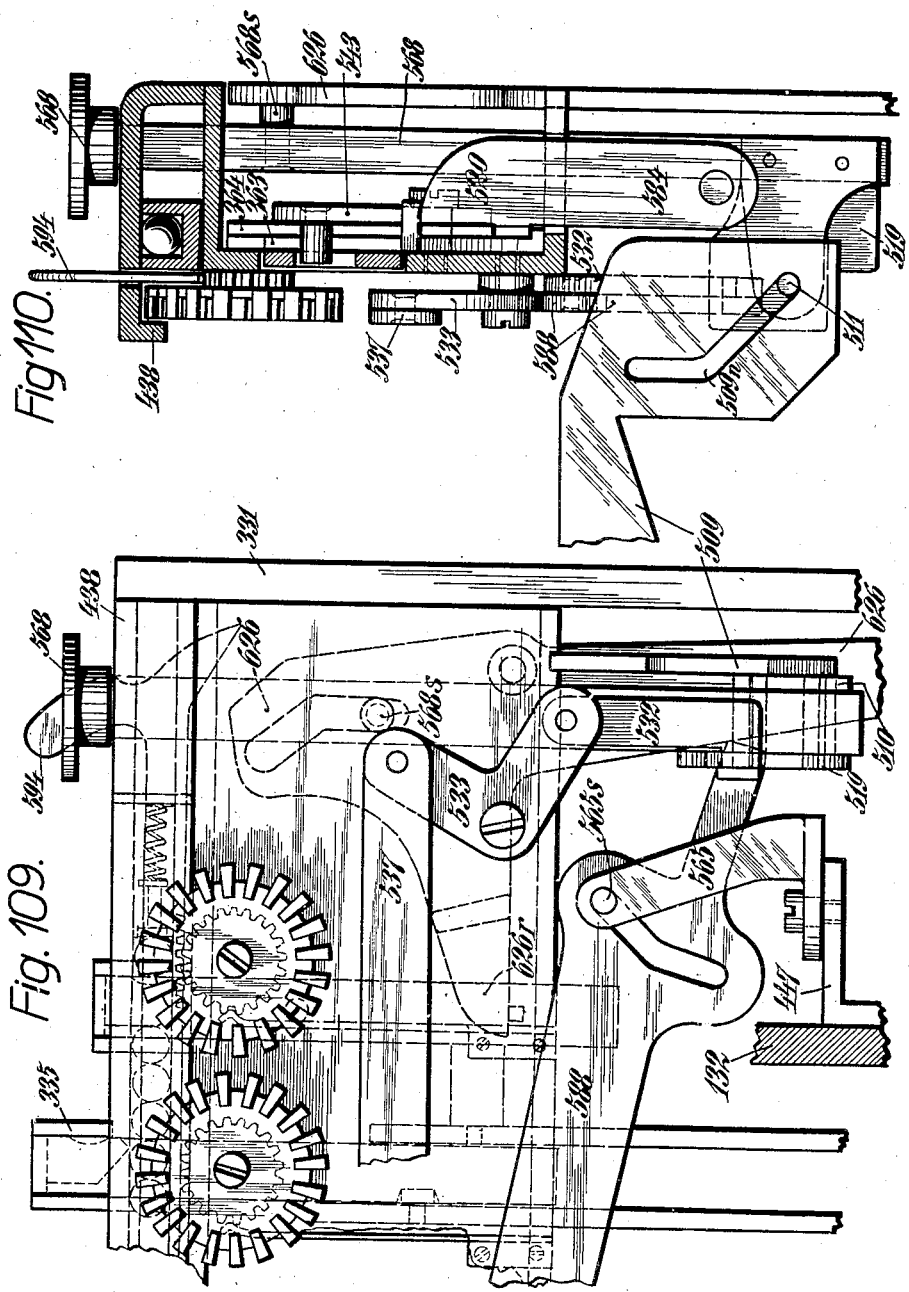

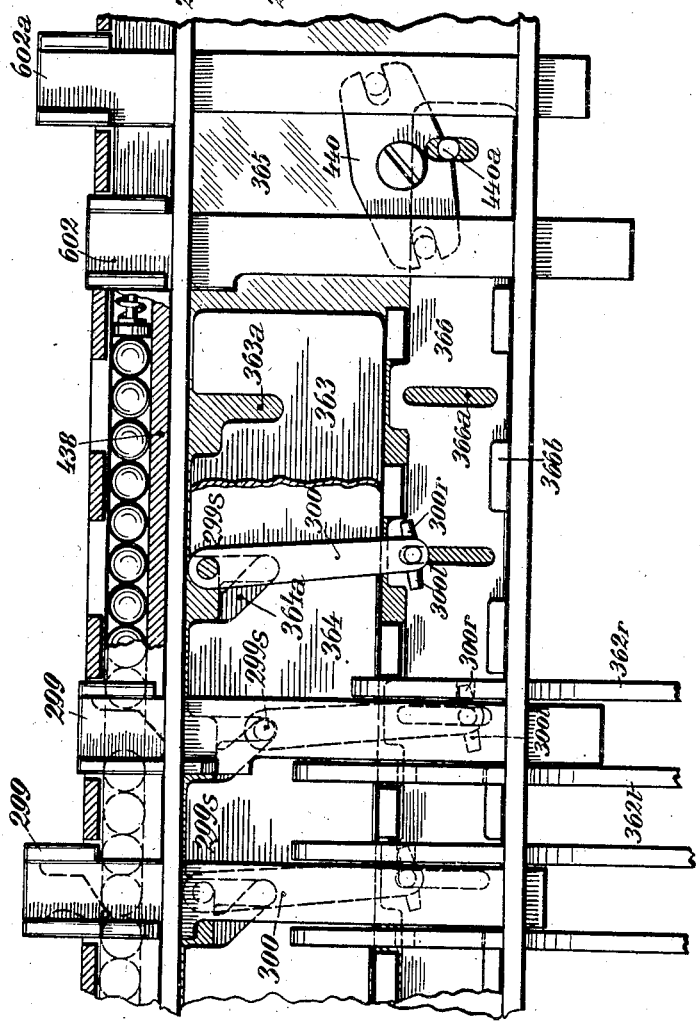

A. RECHNITZER.
CALCULATING MACHINE.
APPLICATION FILED JULY 26, 1912.

1,409,575.

Patented Mar. 14, 1922.
44 SHEETS—SHEET 42.

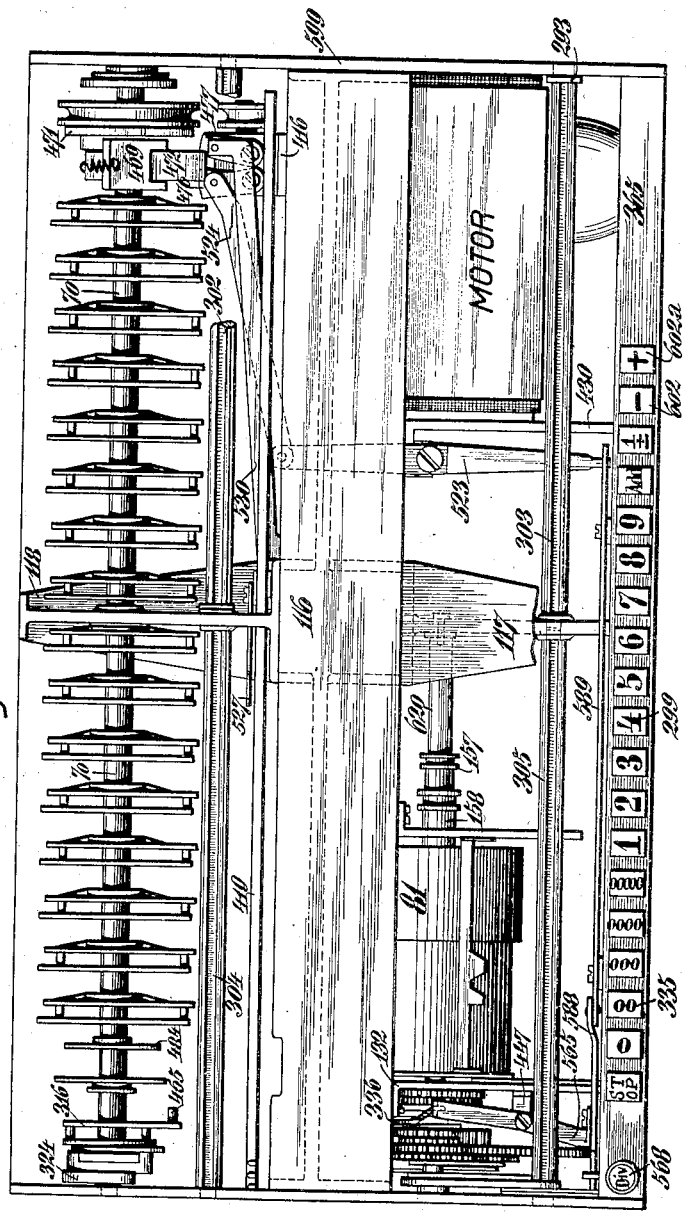

A. RECHNITZER.
CALCULATING MACHINE.
APPLICATION FILED JULY 26, 1912.
1,409,575.
Patented Mar. 14, 1922.
44 SHEETS—SHEET 44.
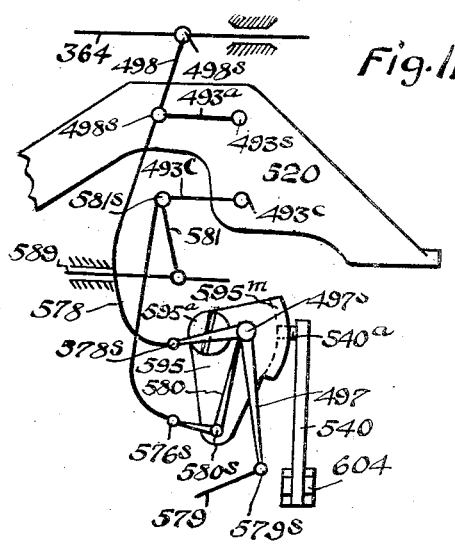
Fig. 117.
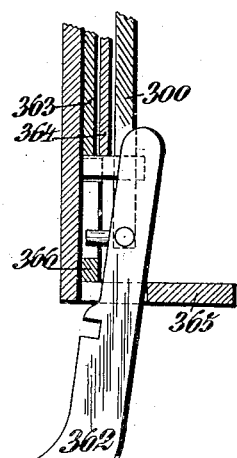
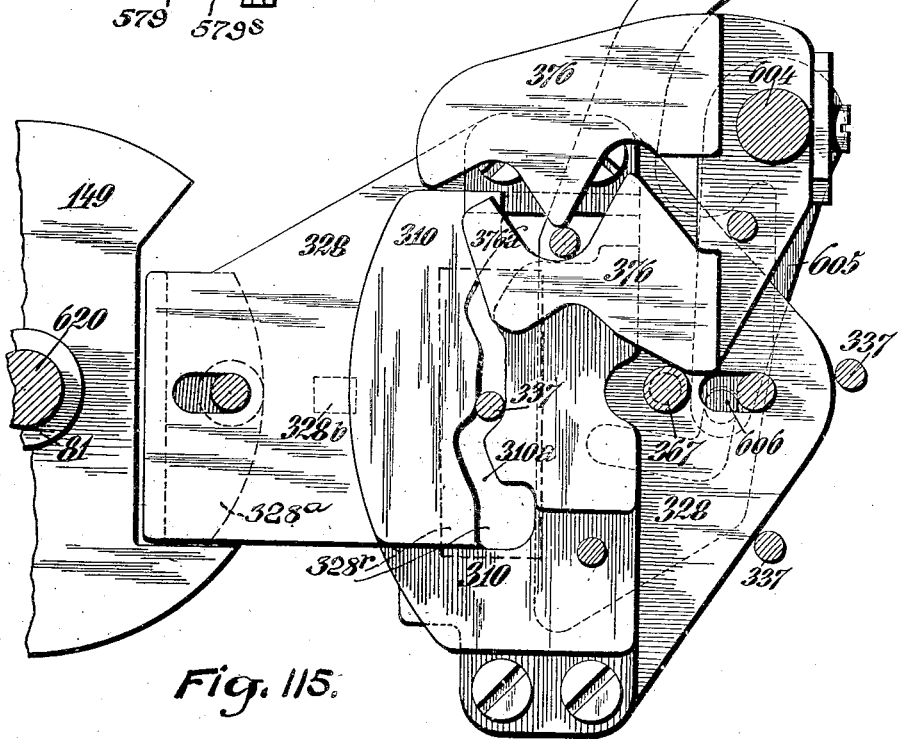
Fig. 115.
Witnesses:
E. A. Jarvis
A. Bernstein
Inventor:
Alexander Rechnitzer
by Emerson P. Newell
attorney

UNITED STATES PATENT OFFICE.

ALEXANDER RECHNITZER, OF VIENNA, AUSTRIA.

CALCULATING MACHINE.

1,409,575.  Specification of Letters Patent.  Patented Mar. 14, 1922.

Application filed July 26, 1912. Serial No. 711,622.

*To all whom it may concern:*

Be it known that I, ALEXANDER RECHNITZER, a subject of the Emperor of Austria, residing at Vienna, in the State of Austria, have invented new and useful Improvements in Calculating Machines, of which the following is a specification.

This invention relates to calculating machines, one object of which is to provide a machine, which begins to perform multiplications immediately after the setting of the first digit of the multiplier whereas the digits of the multiplier which follow the first can be set by the calculator, that is to say the operator, with any desired speed, without reference to the working of the machine. Another object resides in the fact that both the multiplicand and the multiplier of a second multiplication can be set on the keys of the machine while the machine is carrying out the first multiplication.

With this and other objects in view, the invention consists of certain features of construction and combinations of parts hereinafter described and then claimed, reference being had to the accompanying drawings illustrating a preferred embodiment of the invention, and in which—

Fig. 1 is a half-size plan of the whole machine;

Figs. 2, 2ª, when placed end to end, form a full-size plan of the machine, without the counting gear, feed gear and the multiplier key mechanism.

Figs. 3 and 4 are enlarged views of details shown in Figs. 2, 2ª.

Fig. 5 is an enlarged plan of the counting gear.

Figs. 6–8 are sections through the machine on lines A—B, C—D and E—F of Fig. 1.

Figs. 9–12 show details of Fig. 6.

Fig. 13 is a section, and

Fig. 14 an elevation of the counting gear.

Fig. 15 is a section, and

Fig. 16 an elevation of the device for setting the counting gear to zero.

Figure 1:
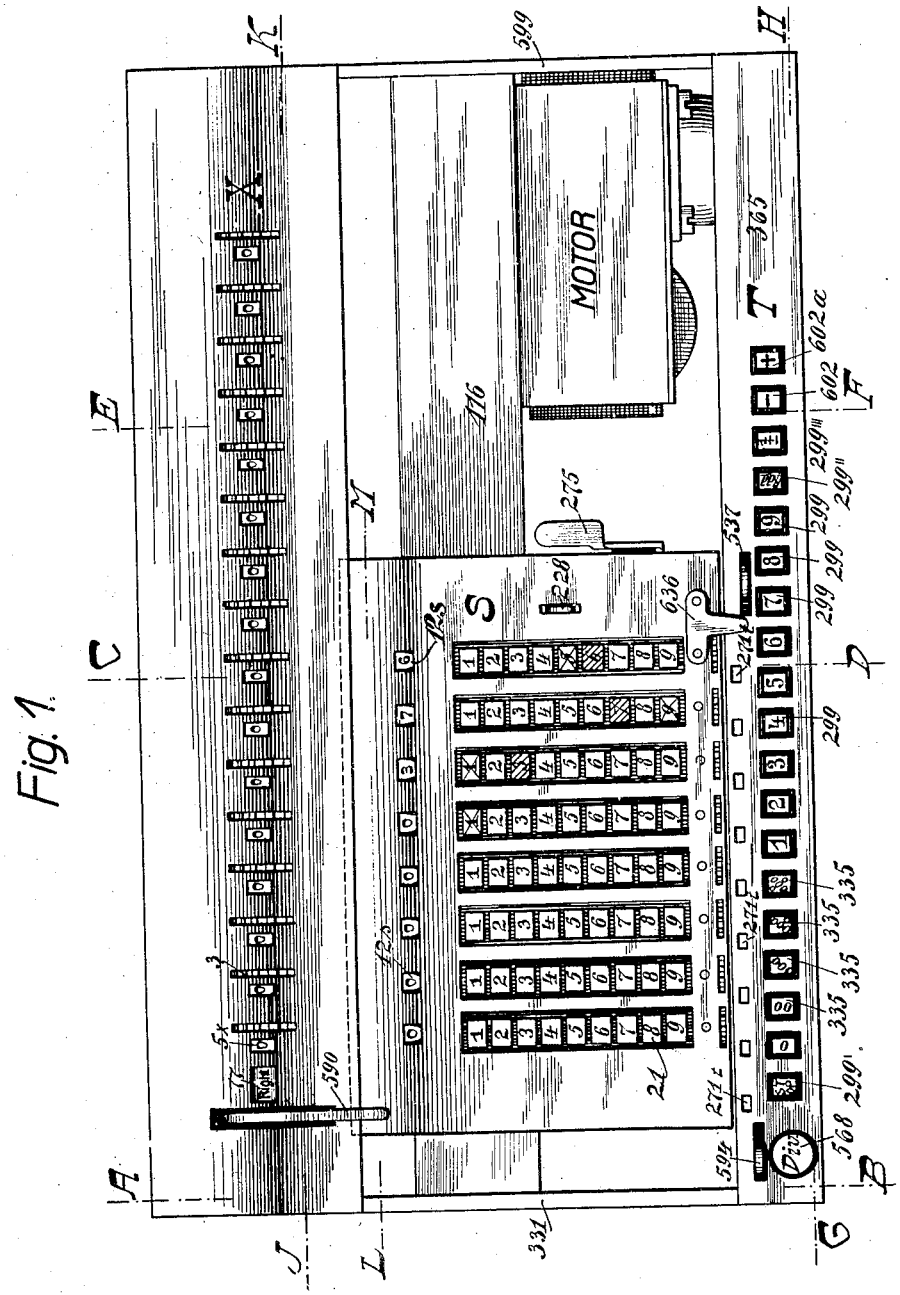
Figure 17:
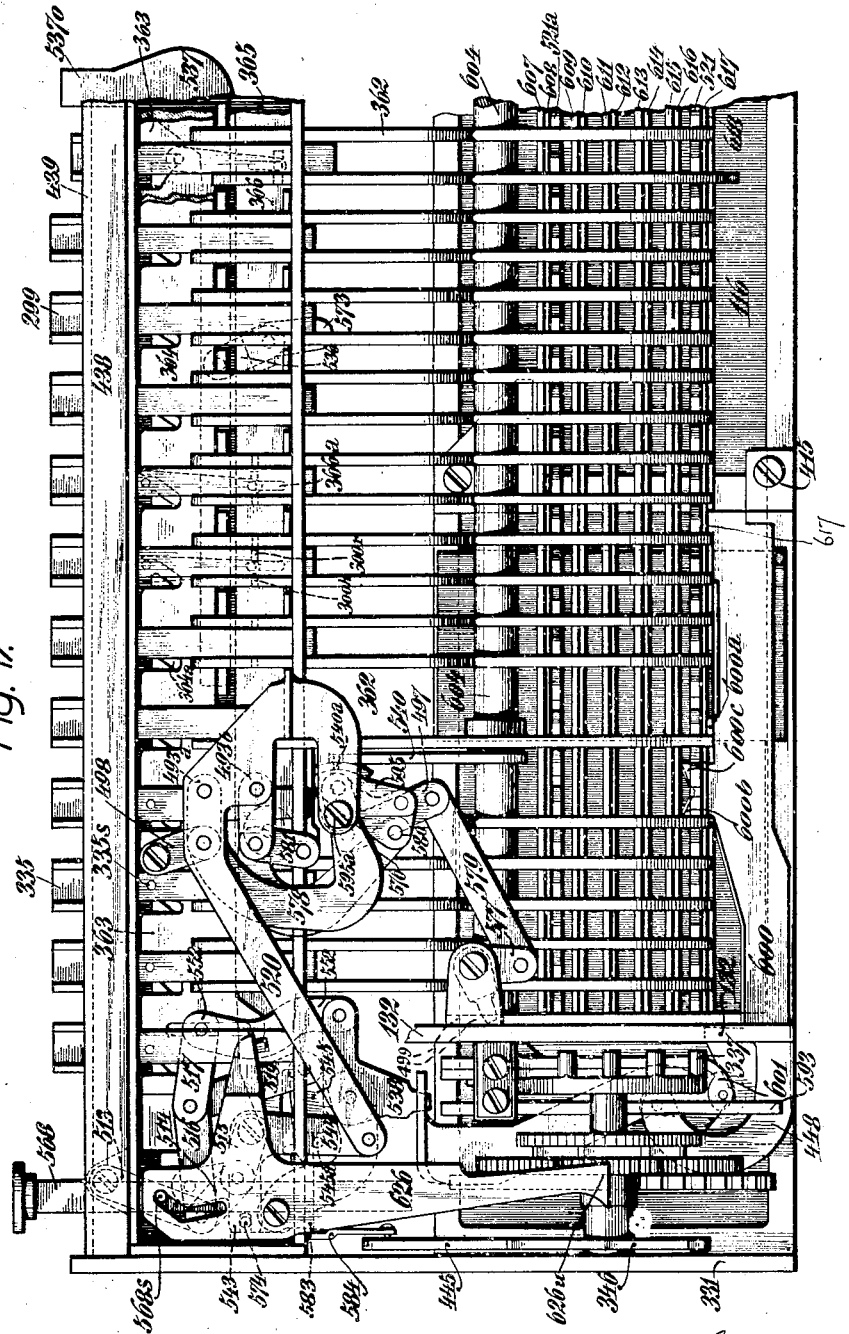
Figure 26:
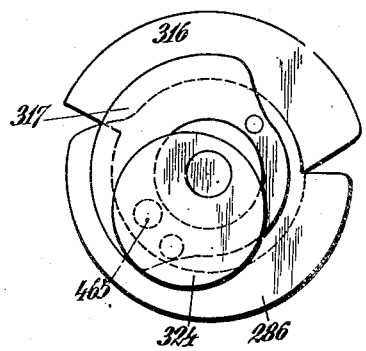
Figure 27:
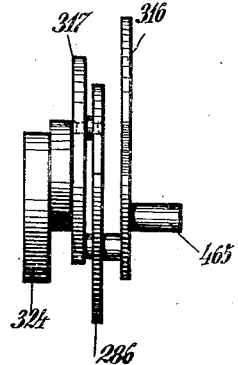

Figs. 17, 17ª, 18 and 18ª are elevations of the machine on lines G—H or J—K of Fig. 1.

Fig. 19 is an enlarged elevation of the mechanisms shown in Fig. 17.

Figs. 20 and 21 show the left hand part of the machine, seen from the back, Fig. 20 being a section on line L—M of Fig. 1, and Fig. 21 a partial elevation from the back.

Figs. 22–54 are detail views.

Figs. 55–108, 116, 117 are diagrams of a link system.

Figs. 109 and 110 show respectively in elevation and cross-section the feed device connected to the division key.

Figs. 111–113 and 115 show details.

Fig. 114 is a plan of the machine half-size, with the feed gear and counting gear removed.

*Manipulation of the machine.*

Fig. 1 shows a plan of the machine half-size. A small motor is set in the machine (in Fig. 1 it is marked "Motor"). Three series of figures can be easily distinguished, as follows:

1. The series marked "X" which is formed by the figure wheels of the accumulator, the figures of which become visible through windows $5^x$ of the covering plate. Hand wheels 3 allow any desired setting of figures in the series X.

2. The series marked "S", consisting of several series of keys (feed gear keys) 21. The keys depressed are indicated by figures which become visible through the windows $12^s$.

3. The series marked "T", consisting of a single set of keys 299 on which is successively set, as on a typewriter, a figure of several places beginning with its highest digit value. A number corresponding to the depressed keys, appears under the windows $271^t$, after a calculation has been completed.

The "S" series is mounted on a carriage, and during the multiplications and divisions, moves intermittently to the right along the stationary "X" and "T" series. Finally, the carriage with the series "S" slides back into the initial position shown. This indicates the completion of a calculation. The manipulation of the machine during the different kinds of calculation is as follows:

If a multiplicand 376 is to be multiplied by 987, the number 376 is set in the "S" series by depressing the keys 3, 7, 6, cross-hatched in Fig. 1. During this setting in the "S" series, the motor and the calculating mechanisms of the machine remain at rest. The multiplier 987 is then set in the series "T"; namely, by depressing, first the key 9, then the key 8, and then the key 7. As soon as the first key "T", in this case the key 9, is depressed, the motor of the machine starts up, and the machine performs the multiplication of the multiplicand 376, set as above, by the multiplier digit already set, namely by 9, and continues multiplication with the next multiplier digits as soon as they are set.

The result of the multiplication appears in the "X" series. The calculator need not wait until the partial result appears after a multiplier digit has been set, but without paying attention to the machine, depresses, as quickly as he can, all the multiplier digits, and finally to indicate that the multiplier is completed, after the setting of the last multiplier digit, he must depress the key "Stop" indicated by 299'. In most cases the machine will not be ready with the calculation when the calculator has completed the setting. In spite however of the continued working of the whole machine, the calculator can nevertheless after each calculation set on the keys of the machine the digits of the multiplicand and of the multiplier for a consecutively following calculation. If, for instance, the next calculation is a multiplication of 1195×317, the calculator will depress the keys of the series "S" marked by crosses in Fig. 1, in accordance with the multiplicand 1195. Then, while the machine driven by the motor continues to perform the previous calculation, he may set at will on the series "T", as in the first calculation, the new multiplier 317 by consecutively depressing the keys 3, 1, 7 and "Stop". The end of the first calculation will be indicated by the sliding back of the carriage with the "S" series into the initial position, and as soon as that is finished, there will automatically appear in the windows of the "S" series, instead of the multiplicand of the multiplication already completed, the new multiplicand which was set in the meantime, and this the machine will at once multiply with the new multiplier set in the meantime in the series "T". During this time, of course a new calculation can again be set.

By depressing one of the five keys 335 "0", "00", "000", etc.) according to the choice of the key, one to five zeros of the multiplier can be simultaneously set. If one of these keys is depressed before the beginning of the setting of a valid multiplier digit, we will bring about a corresponding number of movements or steps of the carriage before the beginning of the calculation proper, with the first highest digit value. These keys can therefore be used as a kind of tabulator.

The keys 602 or 602$^a$ are change-over keys for the "T" series, and the depression of either key 602 or 602$^a$ changes the value of the keys of the "T" series in a similar manner as in most typewriters in which with one key two different characters may be printed depending upon the position of a change-over mechanism. In the present machine, according to the position of these keys, during a setting in the "T" series, the figures set may have a positive or a negative value. The use of these keys will be made clear by the example of the calculation $d$ hereinafter given.

The depression of the key 299''' designated "Add", brings about a single addition of the number set in the "S" series to a number in the "X" series, or, as soon as the position is changed over by depressing the key 602, a subtraction instead of an addition.

The key 299''' is provided for correcting an error occurring during the depression of the keys of the "T" series. Each depression of the key 299''' will increase or reduce the value of any "T" key previously depressed by one unit (for instance from forty-five) and the value will be increased or reduced according to the position of the change-over keys 602, 602$^a$. For instance, if a multiplier key "4" had been erroneously depressed, the machine can be caused to multiply by 5 or 6, etc, instead of by 4 by pushing the key 299''' once or twice, etc. while the change-over key 602$^a$ is depressed. If the key 602 be depressed while pushing key 299''', the machine will multiply by 3 or 2 etc. instead of by 4.

For the purpose of dividing, the dividend is set in the "X" series, and the divisor in the "S" series, and thereupon the division key 568 is depressed, whereupon the division is effected in a completely automatic manner, in a way similar to that described in U. S. Letters Patent No. 809,075 of January 2, 1906. The quotient will appear in the windows 271ᵗ of the "T" series.

The lever 275 is used for zero setting of the "S" series. If the lever 228 is pushed back at the will of the operator, the cancelling of the "S" series will take place automatically at the end of each calculation, that is to say, at the end of each addition, subtraction, multiplication and division.

The lever 590 is used for zero setting of the "X" series, and the lever 594 for cancelling the figures situated under the windows 271ᵗ.

Theoretical considerations.

The machine contains a calculating apparatus which, as customary in multiplication machines, consists of two main parts movable relatively to each other, i. e. the accumulator with the figure wheels 5 ("X" series) and the setting mechanism with the keys 21 ("S" series).

The accumulator is mounted in a stationary manner, and the setting mechanism is adjustable on a carriage. The accumulator and the setting mechanism occupy only the upper part of the machine, while in the lower half of the machine is arranged the mechanism which controls the operation of the setting mechanism and of the accumulator in the manner required. The keys of the "T" series which are also situated in the upper half of the machine, project with setting parts 362 connected to them and hereinafter referred to as "bars" (Figs. 7 and 17) into the lower portion of the machine and can therefore set the controlling mechanism accordingly. The latter is constructed in such manner that it retains the different numbers depressed in the "T" series, and acts so to say, as the memory of the machine, and regulates the working of the setting mechanism and of the accumulator situated above, in accordance with the figures in question.

The calculating mechanism adopted is one which effects multiplications by repeated additions or by alternate additions and subtractions.

In the machine is mounted a main spindle 70 (Fig. 7). The number or figure set in the series "S" is either added once to the accumulator ("X" series) or subtracted once from the accumulator during each revolution of this main spindle. The digit value of the accumulator at which such additions or subtractions take place, is determined by the different positions of the carriage. In the following the words, "a step" in applying to the carriage will be used to mean a movement of the carriage to the extent of one digit value.

The controlling mechanism must determine, for the purpose of carrying out calculations, the positions or the movements of the said setting mechanism carriage, and the number of additions and subtractions in every position of the same.

It must be pointed out now that, in order to simplify the regulation and to accelerate the calculation, a device is provided owing to which the movement of the carriage takes place while an addition or a subtraction is still being carried out, i. e. during the second half of a rotation of the main spindle. During the first half of such rotation, the numbers set on the keys 21 in the "S" series, are transferred to the accumulator. During the second half of such rotation, only the carrying of tens in the accumulator will take place, and the setting mechanism which is not necessary for this performance, will now be disconnected from the accumulator and slid a step, if this be necessitated by the calculation in performance. During each single revolution of the main spindle, there may therefore take place either an addition or a subtraction, either combined with or without "a step" of the carriage.

It may also be necessary in the process of calculating by means of this machine, that during one rotation of the main spindle a movement only, of the carriage, shall take place without any previous addition or subtraction; and furthermore, at the end of each calculation the carriage must return to its normal position shown on the left hand side in Fig. 1.

This increases the number of combinations which must be possible during each rotation of the main spindle. Therefore, during each rotation of the main spindle, it must be possible to combine—

(1) an addition to the counting gear, or
(2) a subtraction from the counting gear, or
(3) an idle working of the counting gear,
(a) with a step of the carriage to the extent of one place value to the right, or
(b) with the carriage stationary, or
(c) with a return of the carriage.

Some parts of the constructive solution of this problem must be now considered for the further development of the theoretical considerations. The controlling mechanism which regulates the movements during each revolution of the main spindle was referred to above as the "memory" of the machine and is a body or drum 81 rotatable on the spindle 620 (Figs. 6, 7, 113, 114, 115), the said body being shown separately in Fig. 49 and also clearly visible in 2.

In each of the longitudinal slots of the cylindrical body 81 is mounted a pair of slides 150, 151 (Figs. 2, 49, 50, 51 and 113).

By depressing one of the multiplier keys of the "T" series, the said slides are pushed into certain positions characteristic of the keys depressed. The shifting is effected in the manner hereinafter described, by forcing one of the bars 362 into recesses of different shape in the auxiliary slides 607—618 (Figs. 7, 17, 33 to 44 and 113). These auxiliary slides seize the slides 150 or 151, which happen to be opposite them, at their pins $150^c$ or $151^c$, which project from the drum radially outwards, and set the slides in different manners. On the slides 150, 151 are also provided pins $150^b$ and $151^b$ projecting radially towards the interior of the drum, by means of which the different positions of the slides can be "felt" by means of two feeling levers 174 and $174^a$ (Figs. 2 and 113), which in their turn act on the calculating mechanism, in order to regulate the kind and sequence of the processes in accordance with the positions of the slides 150, 151, during each revolution of the main spindle. The position of each pair of slides 150 and 151 determines the processes at each single rotation of the main spindle. In accordance with the necessary combinations, each of these slides can occupy three positions. The position of the slide 150 determines whether during a revolution of the main spindle there will take place (1) an addition, or
(2) a subtraction, or
(3) an idle working of the counting gear.

The position of the slide 151 determines whether during the same revolution there will take place, either (a) a step of the carriage (to the right of Fig. 1), or
(b) a stand-still of the carriage, or
(c) a return of the carriage.

The twelve auxiliary slides 607—618 arranged in six pairs, can simultaneously adjust six pairs of magazine slides 150, 151 marked "I—VI" in Fig. 12. The number of pairs of slides simultaneously moved at each depression of a key, differs according to the key depressed. The adjustment is effected at I for the first revolution of the main spindle, and at II, III etc. for the next ones. The number of pairs of auxiliary slides to be provided, depends on the construction of "T" key-board selected, as will be explained at the end of the specification.

The calculator and the machine work independently of each other, and mostly at the same time. While the calculator shifts the slides in the drum 81 by depressing the "T" keys, the machine "feels" the slides previously moved by means of the two feeling levers 174 and $174^a$ (Figs. $2^b$ and 113) and regulates the calculating mechanism in accordance with the same. Means must be provided so that one operation does not interfere with the other.

This problem is solved by means of an epicyclic gear. The drum 81 is controlled by spring pressure acting in the direction of the arrow shown at the outer circumference thereof in Fig. 12, and by means of a mechanism 297, 298 (Fig. 113) hereinafter more fully described, a control part, which will be hereinafter described as a "porter," is constructed which is placed immediately under the pair of slides I (Fig. 12) and allows the passing only of those pairs of slides 150, 151 which have already been moved out of their position of rest, while the first pair of slides, which remained in the position of rest, is seized, and the drum stopped by means of the same.

The drum 81 is connected in the manner hereinafter described, by means of a differential gear and a set of wheels, to the two feeling levers 174 and $174^a$ so that the latter normally participate in the forward rotation of the drum, as if both were made in one piece, while they are nevertheless turned backwards in anti-clockwise direction independently of the drum, at each revolution of the main spindle a distance equal to the distance between one pair of slides 150, 151 and the next. The feeling levers 174 and $174^a$ are shown in Fig. 12 in broken lines, in their position of rest. After the setting of the figures in the drum said levers are turned, from said position, together with the latter in clockwise direction by the spring of the drum. During the calculation they are turned back at each revolution of the main spindle to the extent of one step (the distance of one pair of slides from the next) towards their position of rest, in which position they will stop the machine. The action of the differential gear is such that it brings it about that both movements, which in certain cases may compensate each other, can take place at the same time.

The manner in which the depression of a multiplier key sets the magazine slides 150, 151, does not correspond simply to the value of the key depressed. The meaning of this statement will be clear from the following:

The present machine is not constructed so that in depressing the keys 1, 2, 3, 4, 5–9, the magazine slides 150, 151, which regulate the calculating mechanism are set for the purpose of making multiplication for one, two, three, etc. to nine additions. For this setting in the present machine however, the abbreviated method disclosed in my U. S. Patent No. 1,205,481 is used, as well as the double abbreviated method. The following example will explain the difference of the three methods.

The multiplication of a multiplicand 376 by a multiplier 9872 is effected:

(a) By the simple method, by means of 31 revolutions of the main spindle as follows:—

*Calculation a.*

```
1st revolution)       (0         no addition or subtraction but one carriage move 1 it.
2nd     "             (+  376
3rd     "             (+  376
4th     "             (+  376
5th     "             (+  376
6th     "     × 9000 {+  376
7th     "             (+  376
8th     "             (+  376
9th     "             (+  376
10th    "             (+  376
11th    "             (0         idle working with carriage movement.
12th    "             (+  376
13th    "             (+  376
14th    "             (+  376
15th    "     × 800  {+  376
16th    "             (+  376
17th    "             (+  376
18th    "             (+  376
19th    "             (+  376
20th    "             (0         idle working with carriage movement.
21st    "             (+  376
22nd    "             (+  376
23rd    "             (+  376
24th    "     × 70   {+  376
25th    "             (+  376
26th    "             (+  376
27th    "             (+  376
28th    "             (0         idle working with carriage movement.
29th    "             (+  376
30th    "     × 2    {+  376
31st    "             (+         idle working with return of carriage.
                      ─────────
                      3,711,872
```

(b) By the simple abbreviated method by means of 13 revolutions of the main spindle in the following manner:

*Calculation b.*

```
1st revolution)  × 9000 {+  376      with carriage movement.
2nd    "                 {-      376
3rd    "                 {+  376      with carriage movement.
4th    "         × 800  {-      376
5th    "                 {-      376
6th    "                 {+  376      with carriage movement.
7th    "                 {-      376
8th    "         × 70   {-      376
9th    "                 {-      376
10th   "                 (0            idle working with carriage movement.
11th   "                 {+  376
12th   "         × 2    {+  376
13th   "                 (0            idle working with carriage return.
                         ─────────
                         3,711,872
```

(c) By the double abbreviated method by means of 8 revolutions of the main spindle as follows:—

*Calculation c.*

```
1st revolution)          {+   376    with carriage movement.
2nd    "                 {0           idle working with carriage movement.
3rd    "                 {-   376    with carriage movement.
4th    "                 {-       376
5th    "         ×9872   {-       376
6th    "                 {-   376    with carriage movemen
7th    "                 {+       376
8th    "                 {+   376    with carriage return.
                         ─────────
                         3,711,872
```

Another example for showing the difference of the simple and double abbreviated method would be as follows:

79% is to be deducted from 376. Set 376 in the "S" series and then depress the key "1" of the "T" series. In that way, the number 376 is multiplied once in the "X" series. Then the key mechanism of the "T" series is changed over to negative value by depressing the change-over key 602, and then the keys 299 marked "7" and "9" are consecutively set. In that way, a binomial (100—79) is set as a multiplier, so that the result in the counting gear will show the multiplicand multiplied by 100 reduced by multiplicand multiplied by 79.

This calculation is effected by the simple abbreviated method, through nine revolutions of the main spindle in the following manner:

*Calculation d.*

```
1st revolution )        ( 0      idle working with carriage movement.
2nd     "    } × 100  { + 376
3rd     "    )        ( − 376   with carriage movement.
4th     "    )        ( + 376
5th     "    } × (−70){ + 376
6th     "    )        ( + 376
7th     "    )        ( − 376   with carriage movement.
8th     "    } × (−9) { + 376
9th     "    )        ( 0       idle working with carriage return.
                        ──────
                         7896
```

5 (e) By the double abbreviated method by means of six revolutions of the main spindle, in the following manner:—

*Calculation e.*

```
1st revolution )        ( 0      idle working with carriage movement.
2nd     "    } × +100 { 0        idle working with carriage movement.
3rd     "    )        ( + 376
4th     "    )        ( + 376
5th     "    } − 79   { 0        idle working with carriage movement.
6th     "    )        ( + 376    with return of carriage.
                        ──────
                         7896
```

From the examples given, it will be seen that the simple abbreviated method consists in making multiplications with the figures 1, 2, 3, 4 by means of one, two, three or four additions, whereas the multiplications with 5, 6, 7, 8, 9, are effected by first adding the multiplicand once, and then, after the movement of the carriage, subtracting at the lower place value five, four, three, two, one times. It will be seen from the examples that a movement or step of the carriage takes place before the multiplication with figures (0—4) which effect multiplication by repeated additions only (calculation a; calculation b, 10—12th revolution, calculation d 1—2nd revolution). It must be pointed out with reference to the above, that when depressing any "T" key "0—9" a step of the carriage must of course be set, to place it to the next digit value. One could suppose, however, that on depressing the figures 1, 2, 3, 4 the carriage could be moved afterwards, that is, after one, two, three, four additions have been made. This is however impossible if the abbreviated method is used for multiplication with 5—9, as will be seen from the following example of a multiplication of 371×54, in which it is assumed that the movement of the carriage takes place afterwards, and the result of which will prove to be wrong.

*Calculation f.*

```
1st revolution )        ( + 371  with movement of the carriage.
2nd     "    )        ( − 371
3rd     "    )        ( − 371
4th     "    } × 50   { − 371
5th     "    )        ( − 371
6th     "    )        ( − 371
7th     "    )        ( + 371
8th     "    } × 4    { + 371
9th     "    )        ( + 371
10th    "    )        ( + 371    with movement of the carriage.
                        ──────
             gives 3339 as a false result.
```

On the contrary, if the movement of the carriage is effected first

*Calculation g.*

```
1st revolution )        ( + 371  with movement of the carriage.
2nd     "    )        ( − 371
3rd     "    )        ( − 371
4th     "    } × 50   { − 371
5th     "    )        ( − 371
6th     "    )        ( − 371
7th     "    )        ( 0        idle working with movement of carriage.
8th     "    )        ( + 371
9th     "    } × 4    { + 371
10th    "    )        ( + 371
11th    "    )        ( + 371
                        ──────
             20034 as the correct result.
```

This has been explained to demonstrate the necessity of the method employed.

From the examples given, it will be further seen that the double abbreviated method consists of the following process:

The last operation which was set, owing to a previous multiplier figure, is combined with the first operation given by the next following multiplier figure (compare calculation "b" 2nd and 3rd revolution with calculation "c" 2nd revolution).

This rule will now be explained in another manner by definitely referring to the mechanisms of the machine, but I will first define for this purpose two designations used for simplifying the description as follows:

The last pair of slides 150, 151 which was moved during a previous setting of the keys, will be designated hereafter, with reference to a new setting of the keys as a "mutandum pair of slides" and its position at any moment as the "mutandum position". Said slides had to be admitted by the "porter" during the rotation of the drum 81 by its spring, before the drum was stopped by the said "porter", and consequently after the drum has been locked, stood directly under the "porter" that is to say, below the new pair of slides I to be shifted again.

That position however which has to be transferred by the auxiliary slides 617, 618 in consequence of a new setting of a key to the pair of slides I (which therefore would determine the processes during the first following rotation of the main spindle) will be designated hereinafter as the "mutator position."

For the purpose of defining the rule ascertained for the abbreviated multiplication, with due consideration of the machine, it can be said that the abbreviated multiplication consists in the following process:

The mutandum position is combined with, and corrected by, the mutator position. Instead of two pairs of slides only one is set, instead of two rotations of the main spindle only one is required; For instance,—

A mutandum position: "subtraction without advance of the carriage" or "addition without advance of the carriage", and a mutator position: "idle working with advance of the carriage", are combined and set on a single pair of slides as "subtraction with advance of the carriage" or "addition with advance of the carriage", (compare for instance calculation "b", 9th and 10th rotation with the calculation "c", 7th rotation).

A mutandum position "subtraction without advance of the carriage", and a mutator position "addition with advance of the carriage" can be combined into "idle working with advance of the carriage" (compare for instance calculation "b", rotation 2 and 3, with the caluclation "c", rotation 2).

The mechanical necessity for carrying out the abbreviated methods is therefore chiefly that: the mutandum pair of slides must be shiftable once more when the next following key is being depressed. In order to enable this further resetting to be performed, there is provided a device (details of which will be hereinafter described), which in addition to the locking of the magazine by the so-called "porter" 297, 298, provides a second stopping or locking by a lever 499 (Figs. 4, 12, 45 and 115) which will be called the compensation lever. This compensation lever is rotatably mounted on a screw 499$^b$ (Fig. 12) next to the magazine, and, as will be hereinafter explained, can spring with its lower brake block 500 (Fig. 45) between the magazine slides so that it stops the magazine a little before it would be stopped by the porter. This is done in order to keep the mutandum pair of slides in engagement with the slides 617, 618 which normally transfer the mutator position and which, duringthe setting of the keys, properly set the mutandum pair of slides in a special manner hereinafter described.

It is now necessary to deduce the rules, in accordance with which this compensation and combination mechanism can work, before we give the mechanical realization of the rules which will be found in describing the details of the machine.

The following rules are clear:—

A compensation must not take place when—

(Rule I) the mutandum position is unsuitable for compensation, or (Rule II) the mutator position is unsuitable for compensation.

(Rule I$^A$) The mutandum position is unsuitable for compensation when it includes a movement of the carriage.

In order to understand this it is necessary to recall the following from the former explanation.

It is true that in this machine an addition or subtraction and an advance of the carriage take place during the same rotation of the main spindle, but the effect on the calculation is nevertheless the same as if such advance of the carriage were to follow such addition or subtraction. The movement of the carriage does not take place until after the carriage or the feed gear mounted on the carriage, has already fulfilled its necessary function of transferring to the accumulator the figure set. When therefore the mutandum position indicates an addition or a subtraction, or an idle running with advance of the carriage, it really means that the partial operation which must in reality be effected last (in accordance with the requirements of a previously depressed key), is merely this advance of the carriage to the right. As during a calculation, movement of the carriage can not occur in the reverse direction (from right to left), there is no possibility of compensation for an ordinary movement of the carriage (from left to right).

If however the mutandum position includes an "addition without advance of the carriage," or a "subtraction without advance of the carriage," this simply means that the operation to be effected last is merely an addition or subtraction, and to that addition it is of course possible to add subsequently, from the mutator position, an advance of the carriage, or the addition or subtraction of the mutandum position can be compensated by a subtraction or addition of the mutator position.

The Rule I$^A$ is therefore clear. The mechanism complies with it as shown later because of the fact that the compensation lever 499 does not at first keep back the mutandum pair of slides at all, if the position of the said pair of slides includes an advance of the carriage. This compensation lever does not therefore become operative at all in the case of the rule I$^A$; it does not spring in, and does not keep back the magazine, or the mutandum pair of slides 150, 151, respectively, back for compensation at all. No compensation can now take place, whatever key may be subsequently depressed.

According to Rule II however, the mutator position also must not be unsuitable for compensation, which it would be in the following case:

Rule II$^A$.

The mutator position is unsuitable for compensation, when it includes the same kind of calculation as the mutandum position.

If, for example, the mutandum position includes an addition, and the mutator position also an addition, two additions will be necessary at the same place value, between which a compensation is not admissible, and can not be executed during a single revolution of the main spindle. For this reason, the second addition will have to be executed during a separate revolution of the main spindle, for which purpose it is therefore necessary to set a separate pair of slides 150, 151. The same will be the case when two subtractions meet in this manner at the same place value. If it is attempted to find for this Rule II$^A$ such an expression as to enable it to be embodied in the mechanism, it will be found that the keys (0—4) which will always work under the simple method (that is to say, without abbreviation) by repeated additions, will always have to begin with an "idle running with advance of the carriage" (as appears from the calculation $b$, revolution 10).

If therefore one of these keys is depressed, the mutator position will always include "idle working with advance of the carriage," and therefore can never include an addition or subtraction, and consequently in these cases the mutator position can never include the same kind of calculation as the mutandum position. We can deduce the following rule:

Rule II$^{Aa}$.

The mutator position arising through the pressing of one of the keys 0—4, is always suitable for compensation.

The rules are different for the keys 5—9, working by the abbreviated method. As will be seen from the example of the calculation $b$ revolution 1, 3, 6, the first operation, in case of the depression of such a key, is an addition with advance of the carriage, provided multiplication is effected in the usual positive manner. If as formerly explained, the "T" key board has been changed to negative values by depressing the key 602, the first operation produced by the depression of one of the keys 5—9 will be a "subtraction with advance of the carriage." This can be deduced from the example of calculation $d$, revolution 3 and 7. During positive multiplication with the keys 5—9, the mutator position will therefore include an addition which, according to the rule II$^A$, cannot be compensated against an addition of the mutandum position.

In case of a multiplication with negative values of the keys 5—9, the mutator position will include a subtraction which cannot be compensated against a subtraction of the mutandum position.

This leads to the following two rules:—

Rules II$^{Ab}$. The mutator position, arising by pressing positive values of the keys 5—9, is not adapted for compensation when the mutandum position includes an addition.

Rule II$^{Ac}$. The mutator position arising by the pressing of negative values of the keys 5—9, is unsuitable for compensation when the mutandum position includes a subtraction.

The mathematical rules thus deduced, find their mechanical expression in a mechanism built on the following principle.

The setting or adjustment of the magazine slides takes place immediately on the depression of one of the "T" keys 0—4, independently of whether the compensation lever keeps the magazine back or not. On the depression of any one of the keys 5—9, on the contrary, the adjustment or setting may also take place, while the compensation lever keeps back the drum, but only then when the mutator position is suitable for compensation. If it is not suitable, the compensation lever is first of all disengaged, whereupon the magazine, under the action of its spring, will turn to such an extent that the unsuitable mutandum pair of slides will pass the "porter," and a pair of slides, not yet shifted at all, will be placed ready to receive the mutator position. The setting of the magazine slides will not take place until thereafter. This mechanism itself will now be generally described.

The depression of the keys "T" does not directly shift the magazine slides, but these are subsequently shifted by mechanisms operated by the rotation of a spring-controlled spindle 367 (Fig. 6). An anchor escapement 445 (Figs. 6 and 17) stops, normally, the spindle 367 by means of the ratchet wheel 346 secured to the same. This anchor escapement 445 can be disengaged by raising a lever 584, after which by the rotation of the spring controlled spindle 367 and certain intermediate mechanism described later, the drum slides are shifted in a manner depending upon the key depressed. For raising the lever 584 on one of the keys 0—4 being depressed, a slide 363 (Figs. 7, 17 and 111) is shifted to the right in the manner hereinafter described. On the depression of one of the keys 5—9, another slide 364 (Figs. 7 and 17) will be shifted in reverse direction, i. e. to the left, and in accordance with the Rules II$^{Ab}$ and II$^{Ac}$, this slide 364 will bring about the release of the anchor escapement with the compensating lever keeping back the drum, only in certain conditions. This releasing will be effected in accordance with the Rules II$^{Ab}$ and II$^{Ac}$, in dependence both on the mutandum position and on the position of the change-over keys. The mutandum position was named the position of the pair of slides 150, 151, which had been shifted during a preceding depression of the key, which pair remained in engagement with the lowest auxiliary slide 617, 618 owing to the keeping back of the drum by the compensating lever, in order to enable the said pair to be shifted again during a new setting of the slides.

The position of the mutandum slide 150 which indicates whether the mutandum position includes an addition or a subtraction, is "felt," as described later, by a slide 600 (Figs. 4, 17 and 113) and transmitted by a lever 593 to a bell-crank lever 538 (Figs. 17 and 19) which is placed either to the left, or to the right, or in the centre, according to whether the mutandum includes an addition or a subtraction, or neither addition nor subtraction. The positive or negative position of the change-over keys 602 or 602$^a$, brings about a setting upwards or downwards of the bell-crank lever 545 (Fig. 19) in a manner hereinafter described.

These four slides and levers 363, 364, 538 and 545 are initial members of a link connection, which actuates the compensation lever 499, and the lever 584 releasing the anchor-escapement according to the rules developed. This link connection is illustrated in Figures 7, 12, 17, and 19, and diagrammatically in its various positions in Figures 55–108. The compensation lever itself is not included, but only the lever 577 (Fig. 17) which raises it upward, whose high position, shown, for instance, in Fig. 71, brings about the lifted out position of the compensation lever, in which position the latter does not hold back the drum 81 for compensation while it will do so if the lever 577 is in the low position illustrated, for example, in Fig. 72. The other mentioned members of the combination 363, 364, 538, 545, 584 are shown in the diagrammatic illustrations. In order to formulate the necessary functions of the link according to the rules found out, let the following assumptions be briefly repeated.

If no compensation is to take place, then by the pressing of a "T" key, the compensation lever is first to be lifted out. Then, the compensation lever will no longer hold back the mutandum slide-pair, and the magazine spring presses it behind the porter, until the porter now holds back a slide-pair that has remained undisplaced. Consequently in the machine is now set: "neither addition nor subtraction" as a new changed mutandum position, which is always suitable for compensation. And not until this has been done ought to be caused the transmission to the magazine of the number of the "T" key depressed, which transmission will be caused by the release of the anchor-escapement.

If, on the other hand, a compensation is to take place, then the anchor-escapement is to be immediately released by pressing a "T" key, whereby the readjustment of the mutandum slide-pair now remaining retained by the compensation lever takes place, so that compensation follows, by combining the mutandum with the mutator position into one pair of slides.

The pressing of a key 0—4 displaces the slide 363 from its left position of rest, Fig. 67, to the right (Fig. 68).

The pressure of a key 5—9 displaces the slide 364 from its right position of rest (Fig. 67) to the left (Fig. 72).

In positive multiplication the lever 545 stands upward (Fig. 74). In negative multiplication, downward (Fig. 95).

If the mutand includes an addition, then the right arm of the lever 538 stands downward (Fig. 71). If it includes a subtraction, upward (Fig. 73). If it includes neither of the two, to the middle (Fig. 72).

In consideration thereof, the requirements for the link connection could be expressed as follows:

According to Rule II$^{Aa}$:

("The mutator position arising through the pressing of one of the keys 0—4 is always adapted for compensation").

Requirement II$^{Aa}$:

The displacement to the right of the slide 363 may always lift the slide 584 (Fig. 68).

According to Rule II$^{Ab}$:

("The mutator position arising by pressing positive values of the keys 5—9 is not adapted for compensation, if the mutandum position includes an addition").

Requirement II$^{Ab}$:

The displacement of the slide 364 to the left with the high placing of the lever 545 and low placing of the slide 552 must not lift out the escapement slide 584, but the compensation lever, or the lever 577 respectively (Fig. 74).

And, corresponding to Rule II$^{Ac}$; i. e.:

("The mutator position arising by the pressing of negative values is not adapted for compensation, if the mutandum position includes a subtraction".)

Requirement II$^{Ac}$:

The left displacement of the slide 364 with low placing of the lever 545 and highest placing of the slide 552 must not lift out the escapement slide 584, but the compensation lever, or the lever 577 respectively (Fig. 97).

In all link adjustments not mentioned in requirements II$^{Ab}$ and II$^{Ac}$, the left displacement of the slide 364 must lift out the escapement slide 584 (for example, Figs. 72, 73, 95, 96).

For the movement of the escapement slide 584 there may therefore be deduced as requirement III:

The escapement slide 584 will be lifted out, either by pushing to the right the slide 363, Fig. 68, or by pushing to the left the slide 364 (Figs. 72, 73, 95, 96). The pushing of the slide 364 to the left remains, however, ineffective, in the cases mentioned in the requirements II$^{Ab}$ and II$^{Ac}$ (Figs. 71, 97).

For the movements of the compensation lever or the lever 577 respectively the following requirement could be deduced:

"The compensation lever must then be raised if the slide 364 is pushed to the left and yet the escapement slide 584 is not lifted out (Figs. 71, 97).

For, if the slide 364, in consequence of pressing a key 5—9 is pushed to the left, and as yet the escapement slide 584 remains lowered, then must have occured just one of the cases described in Rules II$^{Ab}$ and II$^{Ac}$, in which no compensation is to take place, and, consequently, the compensation lever is first to be lifted out before the escapement slide is lifted.

But the position of the compensation lever must also be influenced by two other initial members of the link combination, which up to now were not mentioned, since their engagement with the link combination is not caused by mathematical functions, but by mechanical considerations. They are the finish slide 589 and the clearing lever 595 (Fig. 19) which are shown as such in the diagrammatic illustrations and have the following functions:

The finish slide 589 assumes an active right hand position shown in Figs. 66, 68, 71, 72, etc., only so long as there are still unreckoned members in the magazine of the machine. As soon as the feeling levers 174, 174$^a$ adjust themselves according to the last operation adjusted in the magazine, the finish slide 589 is pushed to the left (Fig. 75). As soon as this has taken place, the machine can be designated as "at rest". In other cases, as: "working". For the two expressions "machine working" and "machine at rest" are inserted the words "working" and "at rest" in Figs. 55–108, and, corresponding to these expressions the finish slide 589 is either in a position displaced to the right (as soon as the diagram illustrates a link adjustment of a working machine) or in a position pushed to the left (in a link adjustment of a machine at rest). This finish slide 589 is for this reason brought into the combination, because I preferred to construct the machine so, that it will also work out the last, i. e., the mutandum position, if the operator is as slow in inserting figures, that the machine has nothing else left to do. But of course such position which then has already been calculated, can not afterward be used for compensation, wherefore the left position of the finish slide should lift the compensation lever. Still, this lifting out of the compensation lever must not take place in the one case, when the machine is just adjusting new slides with the anchor-escapement raised. Therefore it can be said that the compensation lever must then be raised out if the finish slide 589 stands to the left and the escapement slide 584 downward (not lifted out).

The further mentioned clearing lever 595, must, at the beginning of any magazine setting, be lowered from the position shown in Fig. 75 to the position shown in Fig. 55 for keeping the compensation lever always lifted out during such magazine setting, in order that the compensation lever may not hinder the displacement of the mutandum slide-pair.

Taking into consideration these newly added members of the link combination, there follows for the movement of the lever 577 the requirement IV.

The lever 577 is raised, if either the slide 364 stands to the left and the escapement slide 584 downward (not lifted out), or the finished slide 589 stands to the left and the escapement slide 584 downward, or the clearing lever 595 stands downward.

In Figs. 55 to 108 there is diagrammatically illustrated the link combination corresponding to all these requirements. For a quicker understanding, the positions of the initial members are designated as follows:

"Mr. (0—4)" (Fig. 55) means: one of the keys 0—4 is pressed and thereby the slide 363 pushed to the right.

"Mr. (5—9)" (Fig. 58) means: one of the keys 5—9 is pressed and thereby the slide 364 pushed to the left.

"Md. (+)" means; the mutand includes an addition and the lever 538 stands downward.

"Md. (—)" means: the mutand includes a subtraction and the lever 538 stands upward.

"F+" (Fig. 55) means the value of the key pressed was positive and the lever 545 stands upward.

"F—" (Fig. 83) means: the value of the key pressed was negative and the lever 545 stands downward.

"Md. (0)" means: the mutand includes neither an addition nor a subtraction and the lever 538 stands in the middle.

"Working" means: the machine has not yet commenced the last set calculation and the finish slide 589 is in its position to the right.

"At rest" means: the machine has commenced the last set calculation, and the finish slide 589 is in its left position.

Having thus, from the theoretical principles of the multiplication-mechanism of the machine deduced the mechanical requirements for the link connection, we can describe the constructive embodiment of the machine. In advance it must be remembered, as stated, that the theoretical basis for the division mechanism of the machine is the same as was given in the prior U. S. Patent No. 809,075, that is, the machine subtracts the divisor set in the "S" series from the dividend set in the "X" series, always, once too many times, until in this series the warning disk 77 (Fig. 1) already made known in my prior applications, instead of "correct", shows the warning "false".

The machine then adds the divisor subtracted once too often and the carriage at the same time passes to the next position value.

When adapted to the calculating mechanisms at present employed, the machine as long as the warning disk indicates "correct", carries out "subtraction without carriage advance", in dividing, and as soon as it indicates "false", it carries out "addition with carriage advance".

In this respect the division mechanism of the new machine is practicable and novel in itself.

Since in division the regulation of the machine follows from the warning disk and not through the magazine and feeding lever, this entire mechanism must be brought to a standstill and switched out by a depression of the dividing key, as will be described later on.

The theory of the machine now being set forth we can fully describe now its constructive embodiment.

*The "T" keys and their action.*

We know already that the "T" keys fall into two groups: those keys by the depression of which the slide 363 is drawn towards the right, and those keys on pressing of which the slide 364 is pushed to the left. To this end each of the keys of the "T" series has a pin $299^s$ (Fig. 112) which extends through both slides, through the slide 363 and also through the slide 364. From the shape of the slots in the slide, in which such a pin slides, depends whether the slide 363 or 364 is moved. If the slot in the respective slide is perpendicular, like the one marked "$363^a$" in Fig. 111, then the slide 363 belonging thereto, on the downward movement of the respective key, will not be displaced. If, on the other hand, the slot is shaped like the one marked $364^a$, in Fig. 111, then the slide 364 belonging thereto, on pressing down the key, will be pushed to the left.

We further know that the slide 363 or 364 moved must act upon the escapement slide and the compensation lever in accordance with the requirements set forth. For this purpose the left end of the slide 363 has a slot $363^s$ (Fig. 19) in which slides a pin $543^a$ of the angle-lever 543. This angle-lever is journaled rotatably at $515^d$, and by pushing the slide 363 to the right, is constantly so rotated about its fulcrum $515^d$ that it will raise (Fig. 17), on the pin 574, the escapement slide 584 which is fastened to this pin. The escapement slide, as seen in Fig. 6, is linked to the anchor-escapement 445 so that the pushing to the left of the slide 363, always lifts the anchor-escapement.

The other slide, the slide 364, in its displacement to the left acts upon the anchor escapement as follows; it has a slot $364^s$ (Fig. 19) in which a pin $552^s$ can slide and in its position in the slot from time to time it is controlled by the temporary position of the angle-lever 538, which we know to be mutandum-controlled. To this lever 538 is linked the arm 552 into which is riveted the pin $552^s$. To the thus mutandum-controlled pin $552^s$ is rotatably fastened an arm 517 whose other end position $517^s$ is determined through the mutator-controlled angle-lever 545, by means of the arm 519. This angle-lever 545 is, on its part, by means of the tooth $545^z$ and a notch $366^a$, in the slide 366, variously adjusted by the different position of this slide 366, which slide is shown in its left position in Fig. 19, whereby the angle-lever 545, or the linked arm 519 appears raised. The slide 366 is, as is clear from Fig. 111, in positive multiplication, when key 602$^a$ is depressed or negative multiplication when key 602 is depressed, pushed to the left or right, and thereby the position of the linked arm 519, and the left end of the arm 517 will be mutator-controlled, while its right end is mutandum-controlled. To this lever 517, at 517$^s$, Figs. 19 and 116, there is linked a lever 516, which has linked to it, at 516$^s$, the two levers 513 and 514. The lever 513 is linked to the fixed point 513$^s$, while the lever 514, on its part, is again linked at 515$^d$ to the lever 515. The lever 515 has its fixed fulcrum on the screw 515$^s$. The front end of the lever 515 has, at 515$^d$, the lever 543 linked to it, from which we know, that the anchor-escapement is released by its lifting out. If, therefore, the lever 515 should be turned upward, the anchor-escapement would also be released, since the fulcrum 515$^d$ would then move upward, whereby the angle-lever 543 will be pushed upward parallel to itself, since this angle lever has a parallel guide by means of the pin 543$^s$ and the slot 363$^s$. By pushing the slide 364 to the left, by means of the two levers 517 and 516, the link connection 513 and 514 will be pressed in from time to time, as is shown, for example, in the diagrammatic illustration (Fig. 73), whereby the fulcrum 515$^d$ and therewith the angle-lever 543 will be raised and the raising of the slide 584 effected. By properly determining the measurements of the levers in question, this link combination will work according to the requirements II$^{Ab}$ and II$^{Ac}$.

Figure 116:
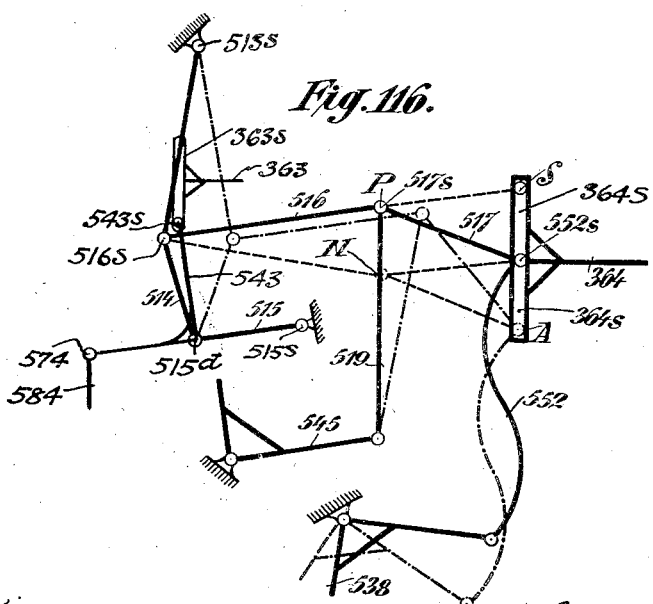

This will be clearest from Fig. 116. The angle-lever 538, which on its part is controlled by the mutandum adjustment, can assume three different positions, and therefore set the fulcrum 552$^s$ either as shown in Fig. 19 in the middle of the slot 364$^s$, or upward (Fig. 76), or downward (Fig. 74). The uppr position is assumed, if the mutandum includes a subtraction, as is shown in Fig. 116 by S. The lower position is assumed, if the mutandum includes an addition as is shown in Fig. 116 by A.

The lever 545 stands upward (Figs. 74–76) and pushes the fulcrum 517$^s$ upward in positive multiplication when the mutator produced by the keys 5—9 includes an addition, (in Fig. 116 there is shown by P the corresponding mutator-controlled position of the point 517$^s$). In negative multiplication when such mutator includes subtraction this mutator-controlled fulcrum 517$^s$ is drawn downward (Figs. 98–100) to the point which is designated by N in Fig. 116. Now the distance between the mutator-controlled points P and N must be made half the distance of the mutandum-controlled points S and A from each other, and points P and N must lie in the middle between points A and S. Thereby the horizontal distance from the mutator point P in positive multiplication to the slot 364 is not changed, as long as the mutandum-controlled pin 552$^s$, stands either in its middle position (Fig. 66) or in the position S (Fig. 67), while for negative multiplication, and the mutator point S respectively, the same is true of the middle position of pin 552$^s$ (Fig. 99), and its position at A (Fig. 98). If, however, in positive multiplication, when the mutator includes an addition, the pin 552$^s$ is also drawn into the position A (Fig. 74), indicating also addition in the mutandum, then the fulcrum 517$^s$ will thereby be drawn onto the slot 364$^s$, whereby also by means of the lever 516, the fulcrum 516$^s$ and therewith the two levers 513 and 514 will be drawn towards the left. Such a position of the lever connection is shown in dotted lines in Fig. 116. A similar positioning will occur in negative multiplication and in the positioning of the pin 552$^s$ at S (Fig. 100). The result of such a shortening of the distance between the slot 364$^s$ and the fulcrum 516$^s$ will then be, that the two levers 514 and 513, on pushing the slide 364 to the left, will not be sufficiently pressed in (Figs. 71 and 97) in order, through raising the lever 515, to effect the release of the anchor-escapement, which is otherwise the case (Figs. 72, 73, 95, 96). The two levers 513 and 514 in the first case will rather swing about their axes of symmetry and thereby effect only a negligible movement of the lever 515. The connection between the slide 364 and the lever 584 corresponds, therefore, with the requirements II$^{Ab}$ and II$^{Ac}$.

The movements of the angle-lever 577 (Fig. 17), whose upward movement releases the compensation lever, are effected in accordance with requirement IV through the following mechanisms.

An angle lever 544 is rotatably journaled at 515$^s$ (Fig. 19) and encircles with its left arm the pin 574, which is fastened to the escapement slide 584, so that through the raised or lowered position of said slide the angle-lever is moved and thereby also the slide 520 linked to it is moved to the right or left of Fig. 19. The slide 520 at its right end is guided slidably movable in a slot by means of a screw 520$^s$. With lowered position of the escapement slide, therefore, the slide 520 will be pushed to the right, otherwise, to the left. At 493$^s$ there is linked to this slide a lever 493$^a$, which at 498$^s$ is link-connected with a lever 498, which, on its part, by means of a screw 498$^t$ is linked to the slide 364. If, now, in consequence of setting low the escapement slide, the slide 520 is pushed to the right, while at the same time the slide 364 is drawn to the left, then the link connection 493ª, 498, would thereby be separated as is seen in Fig. 71, for example, whereby the fulcrum 498ˢ would be drawn upward. To this fulcrum is linked an arm 578, (Figs. 19 and 117) which at 578ˢ is linked to an angle-lever 497, which angle-lever has its fulcrum at 497ˢ and at 579ˢ a linked arm, which, as is seen in Fig. 17, is linked to the angle-lever 577, which can lift out the compensation lever.

By a separation of the link combination 498, 493ª, the arm 578 will be raised in consequence thereof, and it turns the angle-lever 497 so that the arm 579 is moved to the left, so that thereby are furnished one of the necessary three means, by which the angle-lever 577 and the compensation lever may be lifted out.

According to requirement IV, the compensation lever should furthermore be lifted out, if the escapement slide appears pushed downward and the finish slide 589 (Fig. 19) to the left. To provide for this the finish slide 589 has a bent up eye, to which a lever 581, and to this a second lever 493ᵇ is linked, and this lever at 493ᶜ is rotatably fastened to the escapement-controlled slide 520. The two levers 493ᵇ and 581, on pushing to the left the finish slide 589 and pushing to the right said slide 520, are separated, whereby the fulcrum 581ˢ is pushed downward. At this point there is linked an arm 576, which at 576ˢ is linked to an angle-lever 580 (Figs. 19 and 117), which has its fulcrum at 580ˢ and whose other end at 497ˢ has the angle-lever 497 linked to it, and this, as we know, by means of the lever 579 actuates the angle-lever 577. As is seen, for example, in Fig. 74, the separation of the links 493ᵇ, 581 effects the lowering of the arm 576 and thereby the turning of the angle-lever 580 in such a manner that the fulcrum 497ˢ is pushed to the left. To this fulcrum is linked the angle-lever 497, which will swing parallel to itself to the left, since the linking of the arm 578 at 578ˢ will act as a parallel guide. Thereby also the point 579ˢ is pushed to the left and the lever 577 and the compensation lever may be raised in this second manner as required in requirement IV.

But, the pin 580ª is also not rigid in the machine, but attached to the angle-lever 595, which angle-lever, at 595ª has a fixed fulcrum, furthermore, on its right side it has a cylindrical segment 595ᵐ bent into it. Into this segment is fashioned a cam slot, and a pin 540ª of a lever arm 540 (Figs. 19 and 17) engages this groove.

The arm 540 is keyed onto the shaft 604 (Fig. 17). This shaft, as will be explained later, at each setting of numbers will swing back and forth onto the magazine once, whereupon the pin 540ª will slide in the slot 595ᵐ and produce a turning of the angle-lever 595 in a clockwise direction, whereby the fulcrum 580ˢ (Fig. 19) is pushed to the left. In this fulcrum there is linked the angle-lever chain 580, 497, which is guided parallel by the two levers 678 and 576, so that the entire angle-lever chain swings parallel to itself and the movement to the left, by means of the arm 579, is transmitted to the angle-lever 577. Thus the third part of the requirement IV is accordingly satisfied and the lever 577 is raised in all the cases therein required. The link connection described will, therefore, as soon as one of the multiplier "T" keys is pressed, actuate both the compensation lever and the anchor-escapement in accordance with the mathematical rules discovered.

*The construction of the details of the machine.*

*The setting of the magazine.*

The depression of a key "T" results in the bar 362 (Figs. 17, 17ª, 7), which is connected to the key in question, being moved downwards from the raised position shown in the Fig. 7. To each of the keys 335 is preferably connected a single bar 362, while the keys 299 which can be changed over according to the position of the change-over keys 602 or 602ª, (Figs. 1, 17ª, 111, 112), are coupled either to a bar 362 on the right or on the left. In Fig. 17ª, the key 602ª is shown depressed, whereby the segment 440 has been swung or turned in the manner illustrated. The said segment engages by means of a pin 440ª with a recess of the slide 366, so that the said slide appears moved to the left, as shown in Fig. 17ª. Fig. 111 shows the key 602 depressed, by which key the slide 366 is moved to the right. For each change-over key "T," the slide 366 is provided with slots 366ª Fig. 111 with which engage pins of bars 300, one of which is hinged at 299ˢ to each key 299 and is therefore moved downwards on the depression of the latter. Each bar 300 is provided on the right and on the left with a pin 300ʳ and 300ˡ (Figs. 17, 17ª or 111, 112), and in the position illustrated in said Figs. 17 and 17ª, the pin 300ˡ will engage with one of the bars 362ˡ, so that on the key being depressed, the left bar 362ˡ will be moved downwards. If instead of the key 602ª, the key 602 is depressed, as shown in Fig. 111, the right bar 362ʳ, instead of the left bar, will be moved down on the key being depressed. The slide 366 is provided with small bent edges or flanges 366ᵇ which can spring into the recess 362ᵇ of the bar 362 (Figs. 7, 111, 112), and the position of these flanges is such that those bars which are not connected to their keys are retained in raised position by the introduction of the said flanges. As known, on the depression of any of the keys "Stop" "0" "00" "000" "0000"

Figure 2:
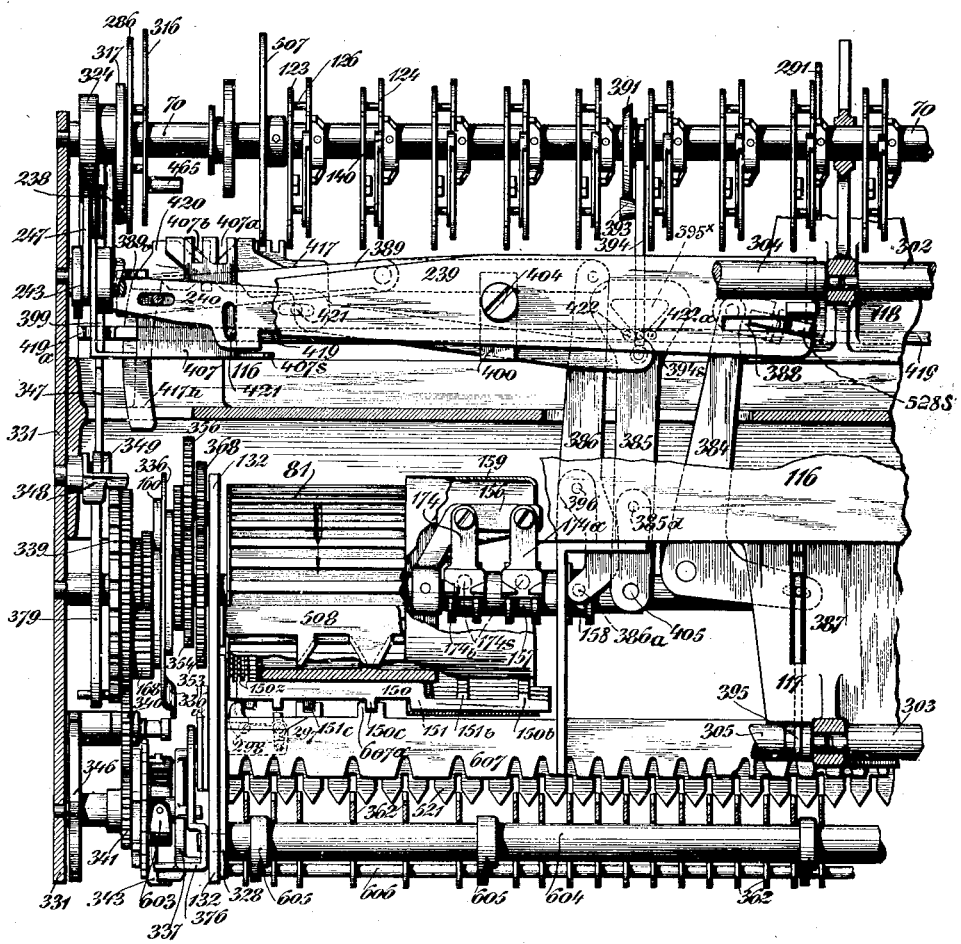
Figure 2A:
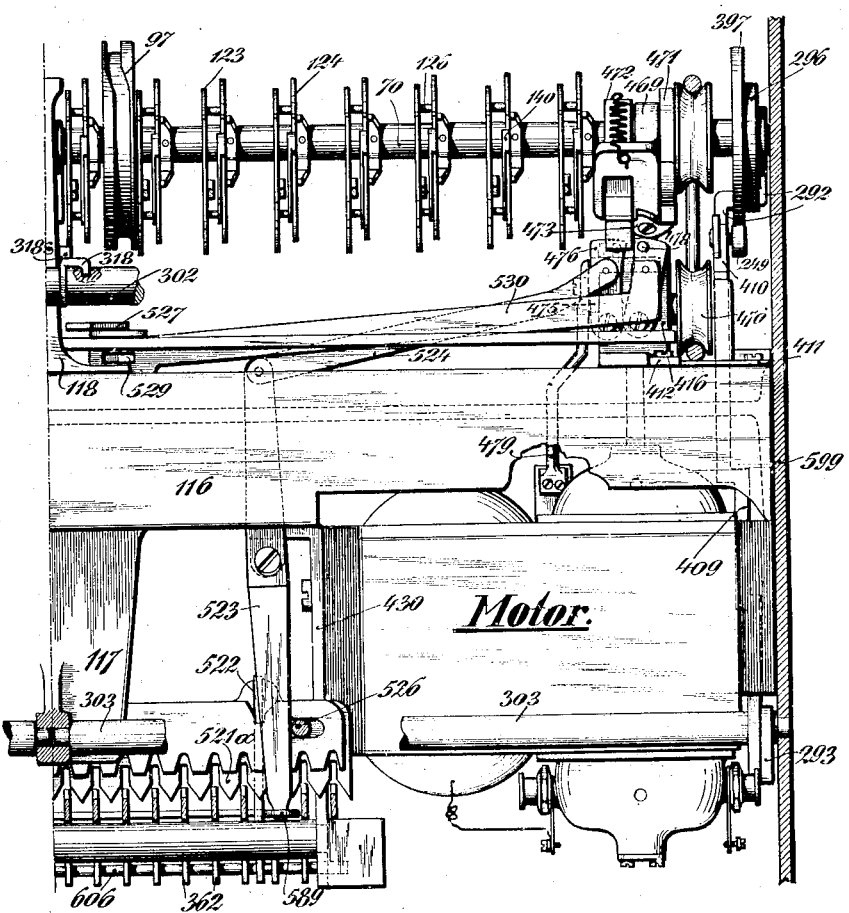

"00000" "1" "2" "3" "4", the slide 363 (Figs. 17, 17ª, 19, 111, 112) will also be moved, and on the depression of one of the keys "5" "6" "7" "8" "Add" "+1", the slide 364 will be moved. This, by means of the link system described, brings about a release of the anchor escapement 445, 446 (Figs. 6, 17) co-operating with a wheel 346, so that at each release of the escapement 445, the ratchet wheel 346 will be free to move to the extent of one tooth, that is to say, in the construction shown in the drawing, to the extent of one-sixth of its circumference before the anchor escapement stops the wheel. The ratchet wheel 346 is secured to the spindle 367 (Figs. 6 and 4) driven by a spring 603 (Fig. 4) which is always held wound up in a manner hereinafter described. To the said spindle is keyed a wheel 337 (Figs. 11, 12 and 4) provided with six milled-on pins. During the rotation, one of the said pins of the pin-wheel slides through the recess 376ª (Fig. 48) of a suitably-bent plate 376 secured to the spindle 604 (Figs. 4 and 2 and 115). During the sliding of the pins through the recess 376ª, the part 376, and consequently the spindle 604, is given an oscillation forward and backwards. To the spindle 604 are secured arms 605 (Figs. 7 and 2ᵉ), through the end of which is placed a spindle 606, so that the said spindle will oscillate according to Fig. 7 to the left, and then back into the position illustrated. All the bars 362 which are in the position of rest shown in Fig. 7, are not affected by the forward oscillation of the spindle 606, as the said spindle can freely slide in the slots 362ᶻ provided for that purpose in the bars. Any bar moved downwards, will however be shifted by the spindle 606 to the left in Fig. 7, as owing to the downward movement of the bar the spindle 606 will pass through the upper end of the slot 362ᶻ. Fig. 115 shows a bar in a swung out position. Only that particular bar 362 which has been selected by the depression of a key, will be moved to the left in Fig. 7. The front side of the said bar will then be forced into recesses of the auxiliary slides 607—618 (Figs. 7 and 17). These auxiliary slides are guided in slots of the bearings 117 and 430 (Fig. 2ᵇ) and are provided at their right hand end with a slot (Fig. 2ᵇ) through which extends a round pin 526 (Fig. 2ᵇ) secured to the bearing 430, so that all these slides can slide together to the right and left of Fig. 2ᵇ and at the same time make a small oscillation about the pin 526. The left hand end, of these slides project into the recess 328ʳ of an adjustable plate 328 (Figs. 12 and 47). The said plate is slidably mounted by means of screws and slots on the plate 132 (Figs. 2, 4, 12, 17, 19, 113), that is, on the right hand side of the plate 132 in Fig. 2 and Fig. 4. To the said slide 328 is screwed a plate 310 (Figs. 47, 113, 115 and 12). The said plate projects on the left hand side of the plate 132 and is provided with a recess 310ª, through which, as well as through the recess 376ª (Fig. 48), slides one of the pins of the pin wheel 337 as soon as the escapement is released. The shape of the said recess 310ª is calculated in such a manner that a shifting or movement of the plate 310, or of the plate 328, to the left in Fig. 12 or to the rear in Fig. 2, and then back again to the position of rest corresponds to one-sixth of a full revolution of the above-mentioned pin-wheel. In that way, as soon as the bar 362 is advanced, there will also take place simultaneously a movement of the auxiliary slides 607—618, but the movement of the said slides is very small, while the movement of the bar 362 is much greater, so that, in spite of the yielding back of the auxiliary slides 607—618, there takes place a forcing of the bars 362 into the slots of the same. The advance of the auxiliary slides has for its object the bringing of the same into engagement with the magazine slides 150 or 151 (Fig. 2) which happen to be opposite them at the time. The auxiliary slides 607—616 and 618 are provided for this purpose with small arms 607ª—616ª and 618ª, with corresponding recesses, by means of which they seize the opposite pins 150ᶜ, 151ᶜ (Fig. 2ᵇ) of the drum slides. The slide 617 intended for transferring the mutator position, does not engage directly with the pin 150 arranged opposite it, but is provided with teeth 617ª which are undercut at its back, and by means of which it engages with teeth 600ª of a compensation slide 600 (Figures 17, 12, 113) which is adjusted to the right, middle or left according to the mutandum position by the opposite pin 150ᶜ of the mutandum slide, as the pins 150ᶜ slide when the drum rotates, between the two oblique guide surfaces 600ᵇ and 600ᶜ of the compensation slide 600, and brings it into such positions as correspond to such position of a pin 150ᶜ situated just opposite it.

On the position of the mutandum slide 600 depends which of the teeth 600ª will engage with any of the tooth-gaps 617ª of the slide 617 transmitting the mutator position.

As will be hereinafter explained, the left hand position of a slide 150 means subtraction, the central position neither addition nor subtraction, and the right hand position addition. The consequence of this arrangement will be that when the mutandum slide 150, and consequently also the slide 600, is for instance in the outermost left hand position (that is to say, in accordance with the subtraction), and the mutator slide 617 is to transfer an addition, that is to say, to shift the slide 150 to the right, the mutandum slide 150 will be moved from its position on the left hand side, one step to the right, that is into its central position, that is to say, a position neither addition nor subtraction. In that way, the mutandum subtraction will be compensated against the mutator addition. If the mutandum slide were on the right hand side, on addition, and if the mutator slide were to move to the left in order to set a subtraction, this will give the same result. If, however, the mutator slide 617 were to transmit neither addition nor subtraction, it will not shift the slide 600, and the slide 150 will not be moved.

As a coincidence of two additions or two subtractions is already stated, rendered impossible by the function of the link system before explained, this arrangement will correctly compensate the mutator and mutandum positions.

The slides 607—618 are always in a position of rest, as long as no keybar is depressed and the spindle 606 consequently withdrawn. On the spindle 606 there is to that end mounted a part 522 (Figs. 2^b and 7) which is forced into recesses provided on the backs of the slides 607—618 as soon as the spindle 606 is in the position of rest, whereby, therefore, the slides 607—618 are always locked in a definite position of rest. The slides 150 and 151 are also locked at the moment of engagement with the slides 607—618 in position of rest. As described, the magazine 81 moves in the direction of the arrow shown in Figure 12. Above the magazine there is secured to the bearing a plate 508 (Figure 2), projecting downwards and provided with suitable cam guide surfaces, along which the slides 150—151 are slid in brought by means of their pins 150^c 151^c into position of rest, so that the pins 150^c and 151^c, which at the same time are opposite the slides 607—618, must always be in that position of rest. The slides 150 and 151 are provided inside with small teeth 150^z and 151^z (Figures 2, 50, 51 and 113), and during the greatest portion of their revolution the drum are locked in their different positions by an immovable disc 149 (Figures 4, 12 and 115) extending inside the magazine 81. The disc is provided with a recess opposite the slides 607—618 and also at the point at which the cam surfaces of the guide or introduction 508 are acting, so that the slides 150, 151 are not locked at these places by the disc 149, but can be brought back to their position of rest, or moved by the slides 607—618. In order to lock the slides 150, 151, in so far as they are opposite the slides 607—618, the slide 328 (Figures 4, 12, 47, 113, 115) is provided at its front end with a disc segment 328^a, whch forms a supplement to the locking disc 149 when the slide 328 is in the position of rest. If, however, the slide 328 swings forward (Fig. 115) together with the slides 607—618, the edge of the disc segment 328^a will at the same time come out from the slots 150^z and 151^z. The slides 150, 151 which at the same time are coupled to the slides 607—618 corresponding to them, when the said slides swing forward, will thus be released, in order to be pushed, as required, from their position of rest into another position determined by the slides 607—618. The movement of the slides depends on the shape of the recesses situated opposite the bars 362.

The slides 150, 151, are guided in the magazine 81 (Figures 49 and 113) which is provided with any desired number of grooves. One slide 150 and one slide 151 slides in each of the said grooves. As already stated, the magazine 81 is controlled by a spring 619 (Figure 7) and always has the tendency to move in the direction of the arrow shown in Figure 12. The movement of the said magazine can be prevented in two ways. One is the stopping of a pair of slides 150, 151 by the "porter" 297, 298 (Figures 2^b, 4, 23, 22, 113). The slides 150, 151 are each provided with a pin 150^a and 151^a. When one of the slides 151 which regulate the movement of the carriage is situated opposite the "porter" 298, 297, and is in its outermost left hand position (Figure 22), that is to say, in its position of rest, which means "without advance of the carriage," the oscillating part 298 will be turned to such an extent that the pivoted arm 297 (Figure 22) will be able to engage in front of the pin 151^a and thus eventually stop the magazine. This takes place, however, only when the slide 150 just opposite the porter is also in its position of rest, that is to say, in its central position. If the slide 150 were on the right or the left, the pin 150^a would pass on the right or on the left of the pivoted pin 297. The result of this arrangement is that the "porter" 297, 298, will allow the magazine slides 150, 151, to pass until a pair of slides 150, 151, which is in the position of rest comes opposite to it.

Further the compensation lever is provided as a stop. The said lever is rotatably mounted at 499^b (Figure 12) on the bearing plate 132 and can be pushed to bring its lower end against the drum 81, between the pins 150^a and 151^a. Said lever is provided with suitably shaped plates 500, 502 (Figures 45, 4) so that it can only be pushed against the drum 81 itself and pass between the pins 150^a and 151^a, when the slides 150, 151, situated opposite it, are in a given position. The slide 151, or the pin 151^a, must then be in the position of rest shown in Figure 22, in which it does not include any advance of the carriage (Rule I^A).

The slide 150 of the pair of slides II (Figure 12) situated opposite the plate 500, must also be in the position of rest. The plate 500 does not however reach down to the position of the pair of mutandum slides I, so that the slide 150 situated opposite the "porter," can be in any desired position, and yet the compensation lever will still spring in. The effect is that the drum will in any case be stopped by the "porter" at the first pair of slides which is in the position of rest. It can however be stopped by the compensation lever one step before, as soon as the slide 151 of the mutandum pair of slides is in the position of rest, and the slide 150 in any desired position, as required by the Rule I$^A$.

On a key "T" being depressed, the following will therefor happen: First of all, the slide 328 will swing forward and couple the auxiliary slides 607—618 to the slides 150 and 151 which are opposite them at opposite time, and during further rotation of the wheel 337, the bar 362 lowered at the time, will be forced into the recesses of the slides 607 to 618, whereby the said slides, and the slides 150, 151, coupled to them, will be moved, whereupon the slides 607—618 will be released by the withdrawal of the part 328 from the slide 150, 151.

The position of the slides 150, 151 at the time will at once be always fixed by the introduction of the disc segment 328$^a$ into the recesses 150$^z$, 151$^z$, whereupon the bars 362 or the spindle 606 will return to the position of rest the auxiliary slides being also brought back again to the position of rest by the withdrawal of the part 522. After such one-sixth of the revolution of the pin wheel is completed, the slides 150, 151 which where formerly locked in the position of rest, will therefore now be locked in certain operative positions corresponding to the depressed key. The slide 328 carries a bent plate 328$^b$, (Figures 113, 12) which, in the advanced position, that is to say, during the shifting of the slides 150, 151, stands between the pins 150$^a$, 151$^a$, and prevents the drum 81 from rotating, but as soon as the plate 328$^a$ has been returned after the shifting of the slides, the drum will be able to obey the action of its spring, until it is stopped by the compensation lever or by the "porter".

*The connections between the main spindle, the magazine, and the feeling levers.*

The connection between the main spindle 70, the feeling levers 174 and the drum 81 by means of the differential gear already referred to is as follows:—

On the main spindle 70 (Figure 6) is an eccentric 324, whereby the connecting rod 325 is given an oscillating movement, the said rod being in its turn pivoted to the grooved segment 378 and giving it an oscillating movement. With the groove 378$^n$ of the grooved segment engages the pin 350$^s$ of a lever 350 which is rotatably mounted on the spindle 620 and will be swung by the segment forward and backwards. The front arm of the said lever is provided with a slot 350$^p$ (Figures 6, 10, 9) in which can slide a pin 379$^s$ secured to a lever 379, so that the effect is that the sliding pin of the lever 379 will be oscillated up and down as seen from Figure 9. On the main spindle 70 is further mounted a cam 317 (Figure 6) cooperating with two rollers 290, 290$^a$ secured to a lever 238 and imparting to it an oscillating movement. This movement is transmitted by the levers 347, 349, to the lever 379 (Figure 6) which is pushed during the descent of the slot 350$^a$, or of the pin 379$^s$, to the right in Figure 10, out of reach of the slots of a wheel 339, so that the pin cannot drive the wheel, which, on the other hand, is locked in its position at that moment by the pin 349$^s$. During the upward movement of the pin 379$^s$, the mechanism will occupy the position shown in dotted lines in Figure 10, whereby the locking pin 349$^s$ will be removed from the slots of the wheel 339, and the driving pin will be introduced into the slots and will bring about the movement of the wheel 339 in the direction of the arrow in Figure 10. The movement of the wheel 339 is transmitted, by means of the wheel 164 secured to the same (Figures 4 and 11) to the wheels 168, 167, 167$^a$ of a differential gear mounted on a suitably shaped bearing spider 160 which in its turn is secured to the spindle 620. From the wheel 167 the second connection of the differential gear leads over the wheel 165 and the wheel 354, Fig. 12, connected to the same, by means of the transmission wheels 356, 368, to the wheel 353 firmly secured to the drum 81. The transmission wheels are calculated in such manner that the part 160, which is secured to the spindle of the feeling levers, uniformly participates in the motion of the drum 81, that is to say, during one revolution of the drum 81, the part 160 moves once. This can be effected, for instance, by making all the wheels of the differential gear of the same size, which produces a ratio of transmission of 1:2, and by giving a ratio of transmission of 2:1 to the transmission wheels 165, 168 or 353, 354. But the ratio of transmission between the driving wheel 339 and the part 160 keyed to the spindle of the feeling levers, will nevertheless be 1:2. Therefore, when for instance 34 pairs of slides 150, 151 are inserted into the magazine 81, it will be necessary to move the driving wheel 339 through twice 1/34, i.e. through 1/17 of its circumference at each revolution of the main spindle, in order to ensure the necessary 1/34 revolution of the feeling lever spindle 620 relatively to the drum 81. Then the gear wheel 164 secured to the driving wheel 339 drives through the gear wheel 168 (Figures 11 and 4), the gear wheel 167 through 1/17 of its circumference.

On the same spindle 620 is mounted the wheel 167ª which travels, in the well known manner of differential gearing, upon the wheel 165, thereby moving its own spindle half the amount of movement of the wheel 164, and as the latter spindle is fastened to the part 160 and the part 160 to the feeling lever spindle 620, this spindle will be moved half the amount of movement of wheel 164, that is 1/34 of a full revolution. The feeling lever spindle projects through the drum and has keyed to it the body 156 on which are rotatably mounted, by means of screws, the feeling levers 174 and 174ª which therefore will be rotated with the drum 81 as required in clockwise direction (Figures 12 and 113) when the drum is moved, and, at each revolution of the main spindle, will be turned back again relatively to the drum 1/34, that is to the extent of one step or to the distance of one pair of slides to the other. The spring 619 acts on the feeling lever spindle 620 and always keeps the feeling lever spindle and the feeling levers under pressure in the direction of rotation of the drum, that is to say, in the direction opposite to that in which the main spindle has a tendency to turn the feeling levers. The spring will therefore always keep the drum under pressure in the direction shown in Figure 2, and it will be again wound up on the feeding levers being brought back.

*Regulating means connected to the feeling levers.*

Both feeling levers 174 and 174ª are provided at their upper end with cam faces 174ᵇ which can "feel" the pins 150ᵇ or 151ᵇ (Figures 50, 51, 113), that is the feeling lever 174 will be shifted, according to the position of the pin 151ᵇ situated opposite its cam faces, while the feeling lever 174ª can be shifted in accordance with the position of the pin 150ᵇ. The feeling lever 174 has at the bottom a pin 174ˢ, by means of which it engages with the grooved ring of a tube 157 passing through the tube 158 (Figures 2 and 113), and provided at the end with a perforation with which can engage a pin 405 of a lever 385 pivoted at 385ᵈ. The feeling lever 174ª is provided in a similar manner with a pin engaging with the left grooved ring of the tube 158, with the right grooved ring of which engages a pin 386ª of a lever 386 pivoted at 396. According, therefore, to the positions of the feeling lever 174 and feeling lever 174ª, the levers 385 and 386 will be shifted. To the lever 386 is pivoted a lever 389 (Figures 2 and 54), the front end 389ᵛ of which is formed into a fork (Figure 20), by means of which it seizes a pin 241 of a slide mounted in the spindle 304. The slide 241 is provided with a projection 241ⁿ (Figures 20 and 6) which can engage with suitable grooves of the levers 243 or 242 and then couple either the lever 243 or the lever 242 to the spindle 304. In the central position of the slide 241, the coupling projection 241ⁿ is partly slid into the bearing 407 (Figure 6), so that the spindle 304 is then kept locked. In the other case, the spindle will participate in the movements of the levers 243 or 242. At each revolution of the main spindle the latter levers will be oscillated forwards and backwards by means of the link rod 247 or 399, by the already described lever 238 (Figures 9, and 10, 6), which is oscillated by the disc 317. It will be clear from the arrangement of the levers that when the spindle 304 is coupled to the lever 243, it will be moved from its position of rest, shown in Figure 6, into the position shown in Figure 10, whereas, when it has been coupled to the lever 242, it will be moved in the opposite direction. The movement of the spindle 304 is transmitted each time to the grooved segment 53 (Figure 20), which will therefore be oscillated from its position of rest in one or the other direction. With the groove of the said segment engages the pin of a lever 111 which will swing the spindle 148 to the right or to the left. If the spindle slides to the right, in Figure 20, a toothed wheel 23 mounted on the said spindle, will engage with the bottom tooth rack 16 (Figure 7), while in case of sliding to the left, the toothed wheel will engage with the upper tooth rack 15. These tooth racks and wheels are elements, described in my U. S. A. Patent No. 1,189,288, of a setting mechanism and effect, by means of a wheel gear 25, 102, the transfer of the number set by the keys 21 to the counting gear, either in accordance with addition or subtraction, depending upon whether the toothed wheel 23 engage with the bottom or upper tooth racks. If the spindle 304 remains at a standstill when the slide 241 is in the central position, the spindle 148 will not be moved at all, and no engagement of the toothed wheels, and consequently no transfer of the number set on the keys, will take place.

Figure 9:
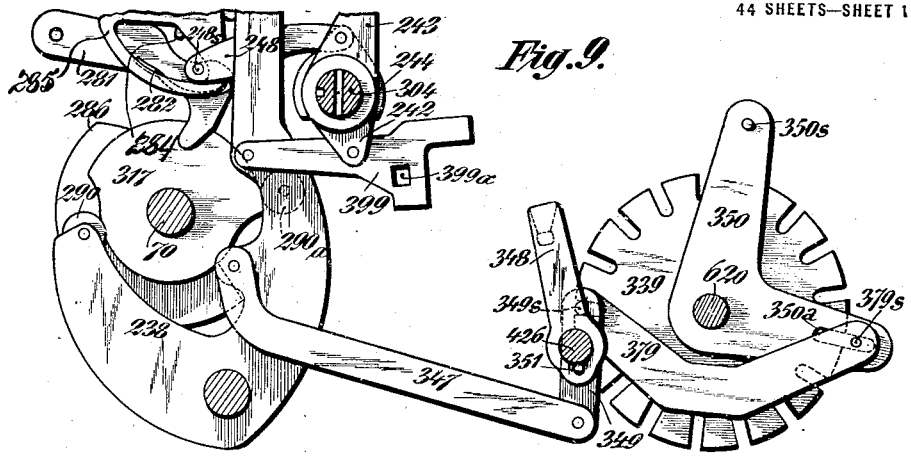

The setting for the tens transfer in accordance with addition or subtraction, also takes place in accordance with the direction of rotation of the spindle 304. To this end, a lever 248 (Figs. 6, 9, 10) is pivoted to the part 244 keyed to the spindle, and said lever, by means of a pin 248ˢ, project through a triangular recess of a swinging part 285, and can be forced by the plate 282 of a lever 281 into the upper corner of the triangular recess. If the spindle 304 is pushed to the right or to the left in accordance with addition or subtraction, the swinging part 285 will be accordingly moved from its position shown in Figure 6, to the right or to the left. When the swinging forward of the spindle 304 is taking place, the pin 248ˢ is forced by means of the plate 282 into the corner or point of the swinging part, as at that moment the lever 281 will be pressed in by the disc segment 286 (Figures 6, 9, 10) rotating with the main spindle. Before, however, the spindle 304 is brought back into the position of rest, the lever 281, and consequently the plate 282, will be allowed to drop, as a recess of the disc 286 comes at that moment opposite the lever 281, as shown in Figure 9. If the spindle 304 is then brought back to the position of rest, the pin 248ˢ will freely slide into the recess of the swinging part 285, and will not bring the swinging part back to the position of rest until the lever 281 is again pressed upwards. As long as no rotation of the swinging part 285 is to take place, it is prevented by a lever 380 which is being forced by means of a disc 316, rotating with the main spindle, into the toothed wheel 284 (Figure 18) connected to said swinging part. The reason of the lagging in the movement of the swinging part 285 relatively to the return of the spindle 304 is that, as will be fully explained later on, the return movement of the toothed wheel 284 is required at a different moment from that in which the movement of the spindle 304 must take place. the toothed wheel of a spindle 262 for the tens transfer engages with the toothed wheel 284 connected to the rotary part 285, and follows the rotation of the spindle 304 with a lag (Figures 6, 13, 14). Said spindle for the tens transfer then transmits to the counting gear a different rotation in case of addition and subtraction, for the purpose of effecting the proper tens transfer in the accumulator in a manner described later on, in connection with said accumulator or counting gear.

It has been previously described that the step by step or gradual movement of the feeling lever spindle, and consequently the shifting of the slide 241, takes place in the second half of the revolution of the main spindle. The feed gear, however, transmits its movement to the counting gear during the first half of the revolution of the main spindle. During the said half the spindle 304 will therefore be turned in accordance with addition or subtraction, while during the second half it will be always in the position of rest. In that position, all of the three grooves (Figure 6), through which the projection 241ⁿ of the slide 241 has to slide during the movement of the latter, always coincide, so that the change from addition to subtraction, etc. takes place practically without any consumption of power.

The different lateral position of the feeling lever 174 is transmitted, as described, to the lever 385, this being intended to regulate the movement of the carriage. After the setting mechanism mounted on the carriage has acted during the first half of the revolution of the main spindle, there takes place eventually, during the second half of the revolution of the main spindle, the shifting of the carriage with the feed gear, while at the same time the tens transfer is effected independently in the accumulator, as will be hereinafter described.

As, therefore, on the one hand, during the second half of the revolution of the main spindle, the movements of the carriage always take place, and as the corresponding controlling mechanisms must not be touched during that time, and as, on the other hand, the movement of the feeling lever spindle also takes place during the second half of the revolution of the main spindle, a device must be provided which will transfer a new position given to the lever 385 to the mechanisms for regulating the carriage movement with a lag; not at once as the feeling levers move but a little later. To that end, instead of connecting a bar 419, Figures 2, 6, 20, which will be shown to regulate the movement of the carriage, directly to the lever 385, the said lever is provided with a triangular recess 385ˣ with which engages a pin 394ˢ secured to a slide 394 which at the proper moment is forced, by means of a roller 393 on which acts an eccentric disc 391 of the main spindle, into the corner of the triangular recess of the lever 385 (Figure 2). The slide 394 is guided between the pins 422 and 422ᵃ of the bar 419, so that a lateral shifting of the slide 394 is transmitted to the bar 419. During the second half of the revolution of the main spindle, the slide 394 is not forced into the corner of the triangular recess, so that the bar 419 is not moved direct. The latter is at that moment still locked, namely by a projection of the link lever 399 which is introduced into the recess 419ᵃ (Figures 20, 3, 2). During the first half of a following revolution of the main spindle, owing to the forcing of the slide 394 into the corner or point of the triangular recess 385ˣ of the lever 385, there takes place the lagging of the movement of the bar 419, in accordance with the position of this time of the lever 385. The different position of the bar 419 brings about the different movements of the carriage. To that end, the bar 419 is provided in front with a pin 421 which drives a sliding part 240 (Figures 20 and 53), provided in front (Figures 3 and 53) with a projection 240ᵛ which can engage with the recess 399ᵃ of the link lever 399. When the bar is in its outermost right hand position, shown in Figure 2, the projection 240ᵛ is not in engagement with the link part 399, and as a stop 240ᵃ (Figure 3) then engages in front of a pin 407ˢ of the bearing 407 (Figures 2 and 3), a lateral movement to the front of Figure 3, of the sliding part 240, and consequently also of the lever 239 to which it is pivoted, is rendered impossible. If, on the contrary, the bar is in the central or left hand position, the lever 239 will be able to oscillate about its screw 404. The front end of the said lever 239 is slotted, and through the said slot projects upwards a pin $528^s$ which is pivoted by means of a universal joint 388 to a bell-crank lever 384 (Figures 2, 20, 24, 25). The lever 384 is connected, by means of a sliding lever 387 (Figures $2^b$ and 7) and a crank shaft 395, to the spindle 305 to which is keyed the grooved segment 378 (Figure 6) which, as already stated, receives an oscillating motion by means of the connecting rod 325. This oscillating motion will be transmitted by means of the above mentioned lever system, at each revolution of the main spindle, to the lever 384 and finally to the part 528 with its pin $528^s$ which, at each movement of the main spindle, will therefore be first withdrawn from the position shown in Figure 20, and then again advanced. The pin $528^s$ can engage with a recess of a bar 37 which forms a portion of the frame of the adjustable carriage mounted in a slidable manner on the four spindles 304, 305, 303, 302. When the lever 239 is locked in the position shown in Figure 2 or in Figure 3, the pin $528^s$ will be brought out laterally from the recess of the bar 37 and idly pushed to and fro, without moving the bar 37 and consequently the carriage. As soon, however, as the lever 239 is coupled to the link lever 399 and participates in its oscillation, the pin $528^s$ will be introduced, during the second half of the movement of the main spindle into the recesses of the bar 37, and during its advance movement, until it reaches the position shown in Figure 20, it will move the carriage to the extent of one step to the right in Figure 1 or to the left in Figure 20. It must be pointed out that, when the lever 239 is in the position of rest, a pin $239^a$ secured to the said lever (Figures 7 and 53), will engage with the recesses of the bar 37, so that the latter, or the carriage, will be prevented from making any movement. The position in which the pin $528^s$ engages with the recesses of the bar 37 is shown in Figure 7. From that position, the pin will be pushed to the right as in Figure 7, in the position of rest of the lever 239, while the pin $239^a$ will then be at once pushed in. This is therefore a compulsory movement. In the outermost left hand position of the bar 419, shown in Figure 2, which is the outermost right hand position in Figures 20, 24, 25, the carriage must, as already mentioned, return to the left as in Figure 1, into the position of rest. In this outermost left hand position, the movements of the lever 239 and of the lever 384 remain without modification. The pin $528^s$ will, however, be moved downwards out of engagement with the recesses of the bar 37, as shown in Figure 25. To that end, the part 528 is secured, by means of a universal joint, to the lever 384 and is provided with a pin $528^a$ which can slide in a groove $419^n$ provided on the bar 419 (Figures 24 and 25), this sliding taking place only when the pin $528^a$ is turned out of engagement with the bar 37 towards the bar 419, in order to return idly from the position shown in Figure 20. When the bar 419 is in the central position, the pin $528^a$, as shown by the shape of the groove $419^n$, at the moment when the movement of the lever 239 takes place and consequently the pin $528^s$ is introduced into the recess of the bar 37, will be in the raised position, so that the engagement of the head of the pin $528^s$ with the bar 37 will in fact take place. If, however, the bar 419 is in the outermost left hand position according to Figure 2, which shows as the right hand position in Figure 25, the pin $528^s$ will be in the lowered position at the moment of engagement with the bar 37, and will remain lowered, as it can fall freely, so that neither the fixed pin $239^a$ nor the adjustable pin $528^s$ will then co-operate with the bar 37, and consequently the carriage becomes free to follow the backward tension of a spring 621 secured to the frame and capable of pulling the carriage back into the position of rest, shown in Figure 1, by means of a band 622 Fig. 7.

In order to thereafter prevent the machine from beginning a new work, until the carriage, following the pull of the spring, arrives in the position of rest, the bottom end $528^u$ (Figure 20) of the part 528, as soon as it is in the lowered position for the purpose of return of the carriage, strikes the front end $527^n$ of a rotary part 527 to which is pivoted a lever 530 intended to disengage the motor in a manner described later. The rotary part 527 will be forced back into its position of rest by means of a cam 529 after the carriage has returned to its initial original position, a pin 623 striking the said cam and thus moving the lever 530 back to the left in Figure 20, and consequently moving the end $527^n$ upwards.

The outermost left hand position of the bar 419, shown in Figure 2, brings about, in addition to the return of the carriage, the setting of the automatic devices for releasing the keys 21 (Figure 7), or the automatic setting of a new number on the setting mechanism, which number had been set by the depression of the keys 21 during the working of the machine. As will be seen from Figure 25, the outermost left hand position in Figure 2, or in Figure 25 the outermost right hand position of the bar 419, brings about the coupling of the slide 409 to the rod 410, because to the end of the bar is pivoted the oscillating part 412 (Figure 2ª) which, by means of its front end 412ᵛ engages with a slot of the slide 409 and raises the latter for engagement with the rod 410. The rod 410 is pivoted to the lever 292 (Figure 8) on which are mounted two rollers 294 and 294ª which, by means of two cams 296, 297, bring about a positive oscillation of the lever 410, which oscillation is then transmitted by the lever 409 and the connecting rod 293 to the spindle 303. By the oscillation of the said spindle 303 releasing devices described later can be operated.

*Motor coupling.*

As soon as the feeling levers arrive in their position of rest, the machine is stopped by the following mechanism:

To the spindle of the feeling levers, or to the part 160, is screwed an inclined bent plate 336 (Figures 2, 4, 11) which slides in the slotted end of a lever 565 (Figures 19, 12 and 109) rotatably mounted on a bearing 447, the said lever end being moved to the right in Figure 2 as soon as the front end 336ᵛ (Figures 4 and 11) of the said plate advances into the fork of the lever 565 (Figure 12). The lever 565 is bent upwards at its other end and said end carries a pin 565ˢ (Figures 19 and 109), the right or left hand position of which determines the position of the slide 588 (Figures 19, 109 and 110) and therefore of the slide 589 to which it is linked at 589ᵗ (Fig. 19). The plate 336 is secured to the spindle of the feeling levers in such manner that it brings about the movement of the lever 565, and consequently of the slide 589, as soon as the feeling levers arrive in the position of rest.

The slide 589 is provided at its right end with a downwardly extending fork 589ᵍ (Figure 17ª) which seizes a lever 523 (Figure 2ª) pivoted by a lever 524 (Figure 2ª) to a sliding part 476. During the movement of the lever 589 to the left (in Figures 17ª and 19), the sliding part 476 will be shifted to the right (in Figure 2ª), and in that way brought in front of the stop 472 pivoted on the main spindle, whereby the latter will be stopped. In order to at the same time disconnect the motor from the main spindle, the following arrangement is made: the motor acts by means of a worm gear 624, 625 on the spindle 468 carrying a pulley 470 (Figures 2ª and 8), the rotation of which is transmitted to a pulley secured to the driving spider 471 (Figures 2ª, 8 and 8ª). The driving spider 471 strikes an oscillating part 473 (Figure 18ª) screwed to the part 469 secured to the main spindle. Next to the part 469 is situated the stop 472, which is pressed by a strong spring against the left hand cam 473¹ of the oscillating part, whereby the right hand part of the oscillating part 473ʳ is held in the path of the driver disc 471. As long, therefore, as the part 472 is controlled by the pressure of its spring, the driving of the part 573, and consequently of the part 469, and of the main spindle, by the driver disc 471, will take place. When, however, the driver 472 strikes an obstacle, for instance the pushed in part 476 (Figure 2ª), it will be forced back in opposition to the action of its spring, whereby the oscillating part 473 will be turned by the driver 471 out of the path of the said driver 471, so that the coupling will be disconnected. The shape of the driver 473 is calculated in such a manner that a much greater pressure than the pressure of the spring on the oscillating part 473 is necessary, in order to bring about the uncoupling, as long as the driver 473 is controlled by the pressure of its spring, while by inserting or pushing in a part into the path of the driver, the uncoupling will be effected comparatively easily, and the counter-pressure of the spring will merely be used for reducing the shock of stopping the main spindle. It is clear that the main spindle is coupled to the motor only up to a certain pressure, and that the pushing in of a part into the path of the stop 473 will bring about the release of the coupling. Such a stop could also be pushed in from the right hand side of Figure 2ª, namely by means of the known lever 530 pivoted to the stop 477, and the uncoupling could also be effected by the pushing in of the said lever, independently of the previously described uncoupling device. Both stops 476 and 477 are each provided with an adjustable or sliding pin 478 which, in a given case, is depressed by the stop 472, and then presses on an oscillating part 475 (Fig. 8) which, by means of a rod 479, operates a break-contact on the motor, so that at each uncoupling of the main spindle, the motor is also stopped.

*Winding of the spring motor 603.*

Figure 11:
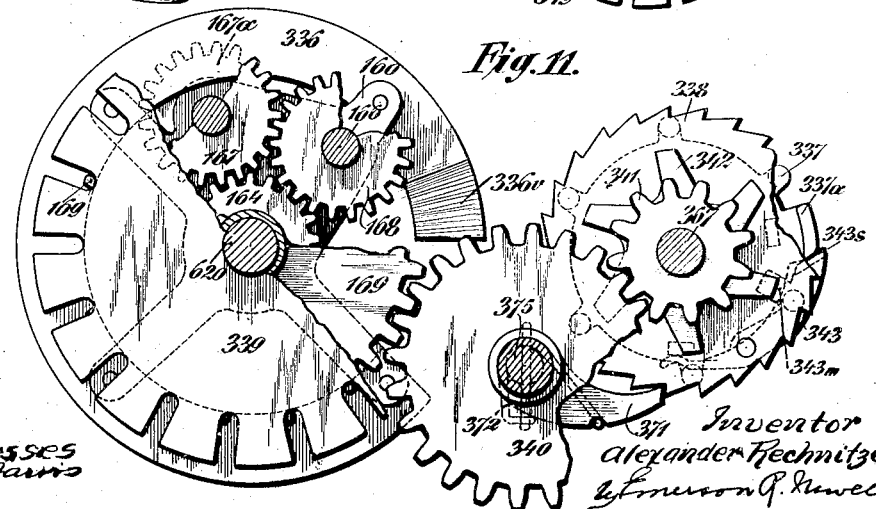

The manner in which the spring 603 is always kept wound up has not yet been described. As is understood, the wheel 339 is given, at each revolution of the main spindle, a certain movement which is transmitted by the wheel 340 (Figure 4) to the wheel 341. The latter wheel is riveted to a driver wheel 342 (Figure 11) rotatably mounted on the spindle 367. The arms of this wheel 342 can catch the pin 343ᵐ. This pin is bent to the spring-pressed oscillating part 343 which is fulcrumed to the ratchet wheel 338 (Figures 4 and 11) and thereby wheel 342 will drive the latter ratchet wheel in the anti-clockwise direction (Figure 11).

To the ratchet wheel is secured the second end of the spiral spring 603, the inner end of which exercises, as is understood, a pressure on the spindle 367, so that the spring 603 is wound by the rotation of the ratchet wheel 338 which is secured by the pawl 371 and the spring 372. The winding takes place however only until the cam face $343^s$ strikes the stop $337^a$ of the pin wheel 337 (Figures 4 and 11), as then the driver $343^m$, as shown in Figure 11, will come out from the path of the driver teeth of the wheel 342.

Division.

Figure 28:
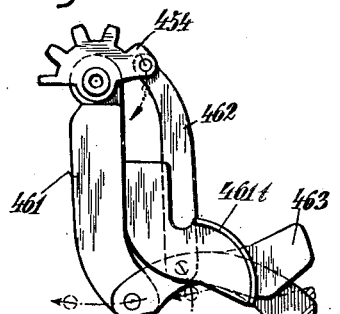
Figures 29, 30:
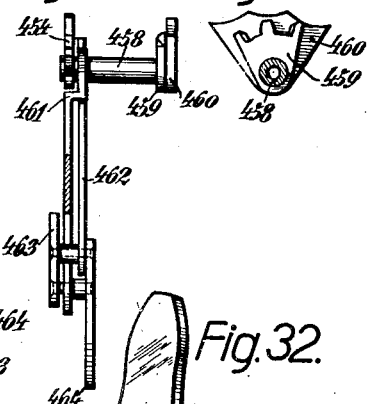
Figure 31:
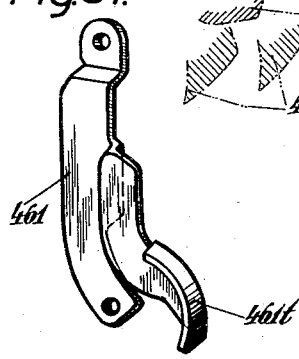

As already stated, the regulation of the machine during division is effected by the position of the foremost figure wheel. To the said figure wheel (Figure 18) is connected a projection 456 engaging with a toothed wheel segment 459 (Figures 18, 29 and 30) which is on the one hand secured by a tube 458 to a toothed wheel segment 454 (Figures 28 and 29), which can engage with the well known warning shield 77 (Figures 1 and 18). To the toothed wheel segment 454 is riveted a lever 462 (Figures 28 and 29) which moves two disc segments 463, 464, according as the warning shield indicates "right" or "wrong." These disc segments are pivotally suspended on a lever 461, and their different positions are shown in Figure 28. As will be clear from Figure 31, the lever 461 is provided with a tray segment $461^t$ which at a suitable moment is forced forward by a pin 465 (Figures 18 and 27) rotating with the main spindle, and thus effects the pressing forward of the disc segments 463 and 464. To the two levers 385, 386, which effect the regulation of the machine, is pivoted on the one hand the lever 417, and on the other hand, the lever 420 (Figures 2, 52 and 54). These levers are situated with their cam recesses, shown in Figures 2, 52 and 54, opposite the above mentioned disc segments 463, 464 and, according as the said segments are turned upwards or downwards, either the left hand segment 463 (Figure 18) or the right hand segment 464 (Figure 18) will be forced into the guide slots $407^a$ or $407^b$ of a screwed-on bearing 407, and in that way the above levers 420 or 389 and 417 will be moved, the cam faces being constructed in such manner that, as soon as the segment 454 is in the position shown in Figure 28, that is to say the warning shield indicates "correct," the corresponding movements of the slides 417 and 420 or 389 take place in such manner that subtractions without advance of the carriage are set. If on the contrary, the warning shield indicates "wrong," then addition with advance of the carriage is set.

Figure 10:
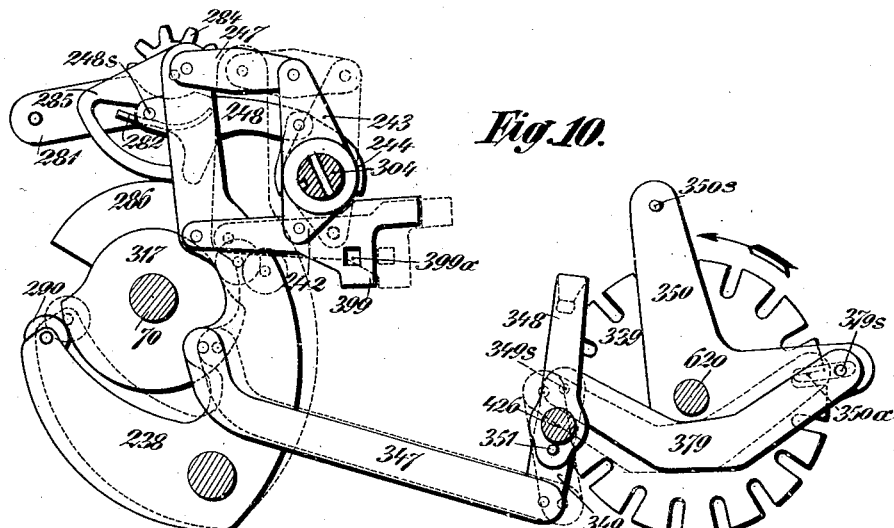

It is quite clear however that these mechanisms must be switched out during multiplication, and that on the other hand the spindles of the feeling levers and the whole regulating device for multiplication must be switched out, as soon as the division key is depressed. That is effected by the depression of the division key. When the division key 568 (Figures 1, 109 and 110) is depressed (Figure 109 shows the depressed position), the sliding part 509 (Figure 6) is first pushed to the left in Figure 6 by means of a pin 511 sliding, on the division key being depressed, in a groove $509^n$ of the sliding part 509. The rear end $509^r$ of the said sliding part engages around a pin secured to the lever 348 (Figures 6, 9 and 10). This lever 348 is rotatably mounted in its bearing 426, and to its pin 351 is pivoted the lever 349 which has been already described. The pushing of the lever 348 to the left will shift the pivot point of the lever 349 in the manner shown in Figure 9, so that, in spite of the oscillation of the lever 238 or 347, the locking pin $349^s$ is not moved out of the slots of the wheel 339, while on the other hand the driving pin $379^s$ does not engage with the slots. In that way, any movement of the spindle of the feeling levers is prevented during division, in spite of the movement of the main spindle. The fork $509^v$ also strikes the rear end $417^h$ of the lever 417 (Figures 6 and 52) and presses the latter forward, and as the pin $417^s$ of the said lever also presses forward the lever 420, the two levers will be forced forward during the division, and can therefore be operated by forcing in the disc segments 463 and 464, while during multiplication they remain inoperative. It has already been stated that, as long as the spindle of the feeling levers is on "0", the uncoupling device of the motor is operated by the slide 589 (Figures 17 and 19). On the division key being depressed, this motor uncoupling device must however be released, for which purpose a perforated sheet 519 is riveted to the division key (Figures 19, 109 and 110), with which engages an arm of the lever 588 pivoted to the slide 589. The position of the lever 588 on the right, or on the left, is determined by the position of the pin $565^s$. On the slide 588 being depressed, the pin $565^s$ will slide in a groove of the part 588, formed in such a manner that, in spite of the position of the pin $565^s$ on the left, the slide 589 will be pushed to the right, as is clear in Figures 17 and 19 or to the left as in Figure 109, and in that way the necessary coupling of the motor to the main spindle is effected. The division key is further provided with a pin $568^s$ (Figures 17, 19 and 109) which slides in a groove of the oscillating lever 626 and causes the latter to swing from the position shown in Figure 17 into the position shown in Figure 19.

The right hand end $626^r$ of the said oscillating lever 626 then presses on the first key, which is the so-called "stop" key, the operation of which otherwise effects at the end of a multiplication the return of the carriage into the position of rest and the release of the locking device and of the feed gear keys. By pressure on the said key, the slide 363 is operated and in that way as already stated the anchor escapement 445 is released; but the lower end 626ᵘ (Figure 17) of the lever then locks the pin wheel 346 and thus allows the pin wheel 337 to move only to a certain extent, namely until, owing to the oscillation forward of the slide 328, the locking device for the slides 150, 151 has been released, so that a movement of the levers 386 and 385 during the division can then take place, in which case a movement of the feeling levers, and, as they are in the position of rest, of the first slides 150, 151, is unavoidable. As soon as the division key has been brought back to the position of rest, the lever arm 626ᵘ is disengaged from the ratchet wheel 346, and in that way, in accordance with the depressed key, "stop," there will in fact take place the setting for the movement back of the carriage and the setting to "0" of the keys 21, whereupon the machine will come to a standstill. The division key is brought back automatically by a slide 537 (Figures 17 and 109) which projects with its end 537ᵒ beyond the plate of the machine, so that a stop 636 (Figure 1) which can be arranged on the carriage in any desired manner, brings about the movement of the slide 537 to the right as in Figures 1, 17 and 19. The slide 537 in its turn rotates the bell-crank lever 533 (Figure 109), to which is suspended a hook 532 projecting into the plate 519 riveted to the division key, whereby the division key is raised, on the slide 539 being moved to the right.

Minor or known details.

It must be pointed out that the carriage always comes back to the original position from its outermost right hand position, even if during the multiplication the calculator has by mistake set on the "T" keyboard a factor of a greater number of digits than that for which the machine is built, in which case the carriage would be liable to be finally forced to the right out of the machine frame. In order to avoid this, the bar 37 is provided at its right hand end (Figure 20) with a cam face 37ʳ, instead of the last recess, and when the carriage has moved so far to the left in Figure 20, or to the right in Figure 1, that the pin 528ˢ comes behind the cam face 37ʳ, then, instead of a movement of the carriage, the pin 528ˢ will slide downwards on the cam face, and the same will happen as if the position shown in Figure 25 were set on the bar 419, that is, the carriage will slide into the position of rest.

It must further be pointed out that a movement of the spindle 302 (Figures 2 and 8) in the foregoing construction will be obtained when, by shifting the lever 239, a movement of the carriage is to take place. The wheels 209 of the feed gear must then be withdrawn from the accumulator. To that end, there slides on the spindle 302 a part 212 (Figure 8) which engages round a pin 213 secured to a sliding part 139. By pushing the sliding part shown in Figure 8 to the right, the spindles of the toothed wheels 209 will be pushed back in a manner described in my U. S. A. Patent No. 1,189,288. The swinging of the spindle 302 is effected, owing to a swinging part 318 (Figures 7 and 46) being secured to the same and normally held in the forced back position shown in Figure 7, by the pin 318ˢ (Figure 2ᵃ) rotating together with the main spindle. As soon, however, as the lever 239 is moved to the left in Figure 7, it will also, as shown in Figure 7, move to the left a lever 435, which slides by means of a pin 435ˢ in a recess 239ⁿ of the lever 239. The lever 435 is pivoted to the sliding part 239 which at a suitable moment is depressed by the disc segment 291 from the position shown in Figure 7, and, during that movement, pulls down the pin 435ˢ. As the pin 435ˢ slides in a triangular recess of the oscillating part 318, the pin will come, on the depression of the lever 436, into the corner or point of the said recess, so that the oscillating part 318 must follow to the left in the position of the lever 239, and in that way the spindle 303 will be rotated.

It remains now to explain the setting mechanism itself and the tens transfer of the accumulator. The principle of the tens transfer is described in the former U. S. A. Patent 809,075. The preliminary noting (selection) of the tens to be carried is effected by a movement of the sliding part 80 to the left (according to Figures 5 and 14), the sliding part embracing with a recess a cam shaped edge of the bent plate 92 (Figure 32) provided with a projection, and turned as soon as a figure wheel goes from "9" to "0" or from "0" to "9", the projection 6 belonging to the figure wheel, then effecting the oscillation or turning of the part 92. By the turning of the sliding part 80, the toothed wheel 58 is pushed to the left in Figure 14, and in that way comes opposite the wheel of the tens transfer spindle 262. This spindle is normally turned back, as shown in Figure 13, out of engagement with any of the wheels 58. It is mounted so as to be capable of swinging in sliding parts 480 provided at their lower end with teeth with which engage toothed-wheel segments 482 secured in a suitable manner to the ribs of the tens transfer bar, all capable of being simultaneously oscillated by one and the same square rod 501, and in that way effecting a uniform swinging of the swinging parts 480 to the right, as soon as the square rod 501 is pulled to the left, see Figure 21.

Figure 32:
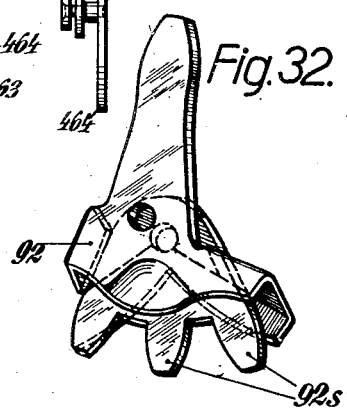
Figure 113:
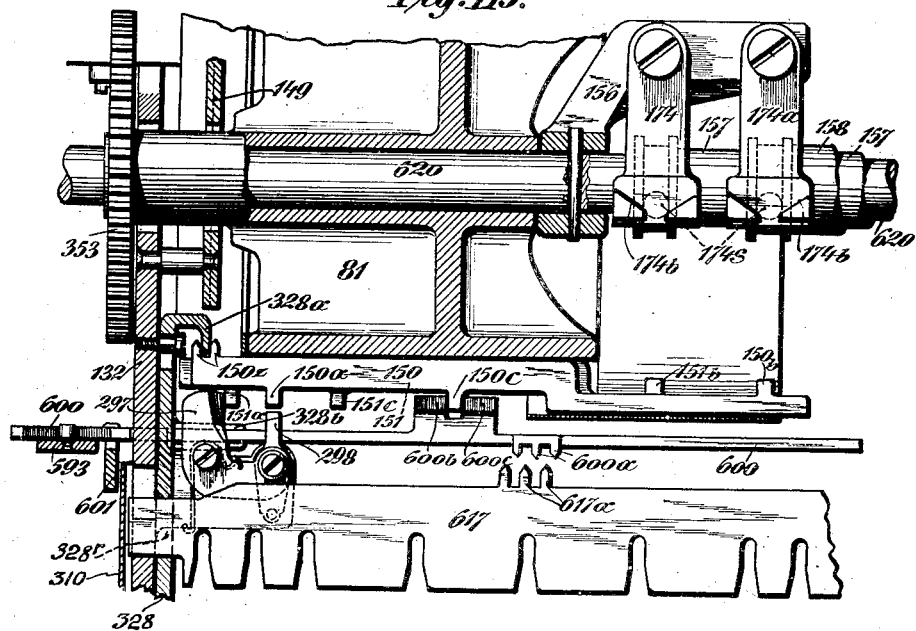

This is effected by a lever 133 (Figure 21) to which is pivoted a lever 508 engaging by means of a pin 508$^s$ with a grooved part 503 pivoted to the square rod 501, so that, on the lever 133 being moved to the left, the spindle 262 of the tens transfer mechanism is swung forward. The swinging of the lever 133 is effected by means of a grooved disc 97 rotating with the main spindle. The upper end of the lever 133 shifts the slide 115 in the known manner, whereby the projections 6 come into engagement, in the known manner, with the toothed wheels 58 that have not been swung, so that the tens transfer in progress takes place in spite of the simultaneous transfer at all the place values. The movement of the lever 133, and therefore the setting of the counting gear for effecting the transfer, takes place during the second half of the revolution of the main spindle. Owing to the swinging forward of the transfer spindle, a toothed wheel 265 (Fig. 6) secured to the same will come into engagement with the toothed wheel 284, connected in the known manner to the oscillating part 285 which, as already stated, will be moved to the right or to the left, according as an addition or a subtraction has been effected. During the return of the swinging part 285 from the turned positions shown in Figure 9, to the normal position shown in Figure 6, the transfer spindle is in engagement with the wheel 284, which therefore effects the shifting of the spindle to the extent of one tooth, which rotation of the spindle produces a rotation of all the figure-wheels, the corresponding toothed wheel 58 of which has been thrown out of gear during the main rotation. The movements of the counting gear, instead of being secured as before by locking disks and star wheels, are effected positively, in the present construction, by the levers 180 which press against the circumference of the projections 6, and are normally in the position on the left of Figure 5, in which they press by means of the oscillating part 179 on the lever 67, the lower end of which engages with the underlying toothed wheel segment 92$^s$ of the oscillating part 92 (Figure 32). The projection 6 is provided with a recess which makes possible the movement of the lever 180, and therefore of the lever 67, but only at the point corresponding to the movement of the figure-wheel from "9" to "0." If the slide 115 is pushed to the left from the position shown in Figure 5, the oscillating part 179, instead of engaging with the lever 67, will engage with the lever 68, which will result in the lever 68 being locked by the projection 6 during the transfer so that the toothed wheel 58 with which the lever 68 engages is positively moved or stopped by the projection 6 during the transfer. The transfer spindle is also used for returning all the figure wheels to "0." This is effected by pushing the hand lever 590 backwards from the position shown in Figure 1. This lever is provided with a groove 590$^n$ (Figure 15), in which slides the pin 492$^s$ of an oscillating part 492 rotatable about the spindle 627, so that, when the lever 590 is pushed back, the oscillating part 492 is moved downwards in Figure 15. To the oscillating part is pivoted the bar 483 engaging by means of a pin 483$^s$ with the lever 508 and pressing the latter down. In that way, the pin 508$^s$ slides down in the groove of the part 503 (Figures 15, 16 and 21) riveted to the square rod 501, which is thereby moved to the left, see Figure 21, and in that way the swinging forward of the transfer spindle into engagement is produced in the known manner. The depression of the oscillating part 492 brings about at the same time a turning of the oscillating part 491 rotatably mounted on the back wall of the support for the transfer mechanism, and projecting with its lower arm 491$^n$ between the two toothed wheels 265 and 265$^a$ which, as is known, are keyed to the spindle 262. In that way, simultaneously with the swinging forward to the spindle, the latter will be pushed to the left from the position shown in Figure 16, by the rotation of the oscillating part 491, so that the wheel 265$^a$ will then come into engagement with the wheel 284$^a$. The latter wheel is rotatably mounted on the spindle 627 and carries a pinion 628. During further pressing back of the lever 590, it will strike with its lower side a stop 278$^a$ of the toothed wheel segment 278 engaging with the above mentioned pinion 628, and in that way will impart a rotation to the wheel 284$^a$ and also to the wheel 265$^a$ which is in engagement with it, and to the transfer spindle. Owing to the movement of the transfer spindle to the left the wheels 120 riveted to the same, will then be in engagement with the wheels 56 (Figure 14) in which at a suitable place one tooth is omitted, so that when the transfer spindle is rotated, they are caused to participate in the rotation up to that point and then left free, so that during the forcing back of the lever, all the figure wheels are set again.

The setting mechanism is almost exactly like that described in my United States Patent No. 1,189,288. The pressing of a key 21 (Fig. 7) causes a rotation of the grooved cylinder 86 to a different extent, and in that way a different position of the double lever 18, whereby the link, consisting of the three levers 19, 18 and 20, is shifted so that the sliding part 22 transmits a movement of a different extent to the toothed wheels 23 (Figures 7 and 20) by means of one of the toothed racks 15 or 16 dependent upon the adjustment of the machine for addition or subtraction as described. The necessary rocking movement of the bar 45 is brought about by the grooved oscillating spindle 305 which turns the bar by means of the crank shaft 54 (Figure 6), and the connecting rod 256 by means of the crank shaft 76. This movement is at the same time utilized for swinging the lever 258 forward from the position shown in Figure 6, so that it can engage with one of the wheels 271, on the circumference of which are to be arranged the numbers 0 to 9, whereupon, on the grooved segment 205 (Figure 6) being oscillated once to the right or left, in each addition or subtraction respectively, this other movement can be used to turn the number wheels 271 accordingly one step from 0 to 1, 2, 3, 4, etc. for counting the number of additions and backwards in registering subtractions and thus, to register the quotient or multiplier. For this purpose, the lever 258 is linked to a double lever 256, having its fulcrum at 256$^s$ and engaging with its left arm (Fig. 6) a pin 205$^a$ on the grooved segment 205.

It has formerly been described how upon a carriage return the spindle 303 is also oscillated, whereby a resetting of the keys of the "S" series should be performed. For this purpose slides on the spindle 303 a grooved segment 197 (Fig. 8) which seizes the pin of a bell-crank lever 200, to which is pivoted a bar 119 (Figure 7) with oscillating parts 62 for turning the spindles 50 in order to bring about the advance of the locking slide 17 in the manner known by my patent 1,189,288. When the machine is at rest, the grooved segment 197 is in the position shown in Figure 8. At the beginning of a multiplication or of a division, the grooved segment is first turned a little downwards in anti-clockwise direction as shown in Figure 8, which results in the locking device being operated by the lever 200. At the end of a multiplication, division, addition or subtraction, the spindle 303 is first pushed back from the said locked position in clock-wise direction to the extent of about 40°, by the already described cam connection, and is then again advanced into the position shown in Figure 8. The movement of the said segment 197 brings about the automatic zero setting of the keys 21$^a$, provided that the lever 228 is in the position shown in Figure 1. In that position, its two driver pins 228$^m$ force an oscillating part 198 by means of its pin 228$^s$ into a driving pin 197$^m$ of the grooved segment 197, so that the oscillating part 198, and consequently the oscillating part 203 pivoted to the same, will participate in the oscillation of the grooved segment 197. The oscillating part 203 is provided at its right hand end with an extension 203$^m$, Fig. 8, which presses the bar 245, Fig. 7, back by means of a cam face on the latter, so that the pins 245$^s$ of the said bar turn back a toothed wheel segment 30 rotatably mounted on a bar 61 and co-operating with the pinion 46 secured to the spindle 49, so that the latter is given a rotation and brings the grooved segments 86 back to the position of rest, whereby the feed gear is set to zero.

The toothed wheel segment 30 is controlled by a spring, and, as soon as a key 21 is pressed, and in that way the locking slide 29 pulled to the left in Figure 7 (during which movement the front locking tooth of the said slide comes out from the ratchet wheel 31 and releases the spindle 49) brings about a rotation of the spindle 49, whereby the double lever 18 is moved by means of the worm 86.

According to the new construction, the keys 21 are not brought directly back to their position of rest, but the pins 26$^s$ strike vertical stops 21$^a$ of the keys 21, arranged above the spindle 26, so that the latter is stopped directly by the stop 21$^a$ of the depressed key. The return of the depressed key takes place only after the beginning of the calculation, as soon as the grooved segment 197 has been turned a little from the position shown in Figure 8, in anti-clockwise direction. To the said segment 197 is riveted a spring 629, with a pin 629$^s$ co-operating with a cam face 630 of a plate secured to the spindle 635. The spindle 635$^a$ is in that way rotated a little in clockwise direction, the parts 633 placed on the grooved spindle 635, striking pins provided on the slide 29, so that the said slides are positively pulled to the right, Figure 7, whereby the depressed key is forced upwards by the groove of the slide. The cam face of the part 630 is so short that the pin 629$^s$ leaves it before the completion of the downward movement of the segment 197, so that the spindle 635 is at once released again, and other keys can be at once depressed again as soon as a calculation has been begun. It must be further pointed out that during the automatic setting to zero, the pins 26$^s$ are prevented from fouling any key 21 that may have been depressed in the meantime, owing to the spindle 26 being moved, that is, the slide 73 is moved, in the present construction, by the projections 632. The projections 632 are placed on the spindle 634, and the said spindle is given the necessary rocking movement during the up and down movement of the grooved segment 197, by an anchor-shaped plate 631, with the left hand cam face 631$^e$ of which co-operates the pin 197$^t$, and at the beginning of the calculation pulls to the right, in Figure 8, the slide 73 and the spindles 26, while after the completion of the zero setting, the pin 197ˢ strikes the other face 631ʳ of the part 631, and thus brings the spindle 634 and the spindles 26 back to the position of rest.

*Working example.*

An example may make the operation clear: The problem may be:
How much is 33×98 minus 44×52.
Calculated without machine one would write:

$$33 \times +98 = +3234$$
$$44 \times -52 = -2288$$

This gives $+946$ as the desired result.

On my machine the operator pushes first two adjoining keys of the "S" series marked 3, whereupon the figure "33" will have appeared in the corresponding windows 12ˢ above the keys pushed. He then proceeds to push the first multiplier 98 on the T keys like on a typewriter by pushing first the key 9, then the key 8 and then to indicate that the first multiplier is closed, the key marked "stop." On the pushing of the first T key digit "9" the machine has immediately started its work by locking the multiplicand 33 in the windows and disconnecting from it the S keys, pushed before by the operator, so that he can set the "S" keys for another multiplicand, while the machine multiplies the multiplicand 33 locked in the windows 12S with the first multiplier set on the T keys. Consequently the operator is not prevented from immediately setting his next multiplicand 44 by pushing the two adjoining keys of the same two rows of the S series; this time the keys marked "4" to produce the next multiplicand 44. And then he also sets up the next multiplier —52 on the T keys by striking first the minus key 602 and then the keys "5" and "2" of the T series, and again, to indicate that this second multiplier is also completed, the key marked "stop." He can read the result 946 in the windows of the "X" series.

While thus the operator has very easy and simple work, that of the machine necessary to produce the desired result is very difficult. As soon as the operator has pushed a T key the machine would immediately complete the multiplication as far as indicated. Nevertheless, if the operator pushes in time a next multiplier T key and there is yet a short cut possible between the first setting and the second setting the machine will find out and select it independent of the operator. He just pushes his keys of one or more multiplications. The machine stores the settings away, keeps them apart, selects the shortest method and gives the result. Naturally, the working of this machine cannot be followed without study. The following directions for the machine in working out the example given above may serve as a help:

The operator has pushed the first multiplicand 33. Patent No. 1,189,288, page 2, line 1 and following, will make clear the consequences of such key pushing.

He then turns to the T key. The machine is completely empty, the link system therefore in such position as must be indicated in the diagrams by "at rest" further by "Mr (0)" (which means no mutator), "Md (0)" (which means no mutand), raised position of clearing lever 595, (which means "no transfer to magazine just happening"), and as we supposed, that the machine was set in the beginning for positive multiplication, we must further look in the diagram for the sign F(+) (which means factor positive). We find this position indicated in Fig. 75, showing the raised compensation lever 577 of the emptied machine. Then the operator pushes the key "9", changing "Mr (0)" to "Mr (5—9)". Therefore the next link adjustment is: "at rest", "Mr 5—9", "Md (0)", "F (+)", 595 yet raised. This is found in Fig. 81, indicating a superfluous, but not damageable, momentary lowering of lever 577 and therefore oscillating of the compensation lever against the drum. The main thing is that now the escapement slide 584 appears raised. About the consequences thereof read page 14, line 5. The next movement in the link system will be a lowering of the clearing lever. The ensuing position is to be found in Fig. 63, showing the compensation lever again lifted out. Now follows after the setting of the drum its rotation, which brings the finish slide 589 to the right into position "working" (Fig. 58) until the compensation lever can snap in and retain the drum, when the clearing lever can also raise and the link system would change to position 72 if the mutand had remained (0). But as T key "9" was depressed, the last slides "subtraction without carriage movement" are fit for compensation and retained. Therefore the position is now for a moment: F(+), Mr (5—9 Md(—), clearing lever 596 raised, finish slide 589 in "working" position, consequently according to diagram (Fig. 73).

Now the next movement of the link system will be the drawing downward of the escapement slide 584, by the automatic action of the escapement whereby the pushed key "9" will compulsarily be raised by pushing back to the right slide 364, which leaves the position: F(+), Mr(0), Md(—), "working", 595 raised, = Fig. 67.

If then the operator succeeds to push according to the next multiplier digit "8" the T key "8" before one rotation of the main spindle is completed, then the next position will be: F(+), Md(—), Mr(5—9) "working" clearing lever 595 raised (found in Fig. 73), which adjustment does not raise the compensation lever but the escapement slide directly so that now the mutator addition brings the mutandum subtraction back to zero in the ensuing setting of the drum. If the operator is slow, the machine will first come to a position: "at rest" F(+), Mr(0), Md (—) 595 raised=Fig. 76, raising the compensation lever, whereupon the drum is rotated one further step, which gives again a position "working" F(+) Mr(0) and—as now an undisplaced slide pair is in mutandum position—Md(0)=Fig. 66. If the operator then pushes his next key "8" the next position is: F(+), Mr(5—9), Md(0), "working," 595 raised=Fig. 72. If the machine first completes its second and last main spindle rotation, there follows: F(+), Mr(0), Md(0) 595 raised, and "at rest", which was the initial position.

It is thought this example and the diagram will help to follow all further possibilities of adjustments of the drum by the different actions of the operator and the main spindle. Therefor we turn now to the working of the machine during and after such setting.

Upon the first T key "9" being depressed, the drum rotates, displacing thereby the feeling levers backwards from their position of rest. This starts anew the motor and rotates the main spindle. Next the "S" keys on the carriage are locked by a slight oscillation to the right of the lever 292 (Fig. 8) which must be transferred by the rods 410, 409 to the spindle 303 and the locking segment 197, after each carriage return, as the two rods 409, 410 will not be disengaged according to the new adjustment for a carriage "step" until slide 394 (Fig. 2) has been pressed into the triangular recess 395×. But after such setting, the rod 409 will then remain lowered and therefore the S keys locked until the next carriage return movement takes place.

Upon the further rotation of the main spindle, next the gears 23 with the spindle 148 (Fig. 7) will be slid to engage with the racks 16 and the multiplicand "33" will be transferred by way of the gears 25, 102 to the accumulator in consequence of the anticlockwise raising of the rod 45 with the levers 19 (Patent 1,189,288, page 2, line 97). Then the spindle 148 is first axially slid back to its middle position of rest, and thereafter, during the following carriage step together with the spindle 102 positioned to the right of Fig. 7, out of engagement with the accumulator. Page 63, line 11. During the further rotation of the main spindle, the carriage with the S keys moves one step to the next lower digit of the accumulator, while the accumulator independently and simultaneously performs its carrying functions, (Patent 809,075, page 2, line 120) and the feeling levers are rotated and adjust the machine for the next turning of the main spindle. Page 39, line 2 from bottom.

This next step will be, if compensation has been made "neither addition nor subtraction" with "carriage step". Consequently the bar 45 of the feed gear will swing both racks 15, 16 emptily, without engagement with the pinions 148, during the ensuing first half of the main spindle rotation, and the accumulator will also run emptily during the second half, but the carriage and the feeling levers will be moved as before, leaving the adjustment of the next main spindle rotation as "subtraction" without carriage movement. Consequently from the first inserted "33" in the accumulator will now be deducted "33" on a place value two digits lower, which will leave in the accumulator "3267". The next spindle movement will perform another subtraction on the same place value (whereupon the accumulator will indicate 3234 as the first product), and furthermore also a carriage return, provided the operator has pushed the "stop" key in time for a compensation. If not the main spindle rotation will perform only a "subtraction" without "carriage movement" and a separate next rotation will perform "neither addition nor subtraction" with "carriage return". During the carriage return the spindle 303 will be operated to cancel the first multiplicand "33" and to insert the next "44" and the machine will proceed to calculate without interruption, the next calculation, until the carriage again returns, cancelling also the second multiplicand 44, whereafter the accumulator will show the result=946.

To follow a division of the machine reference is made to Patent 809,075, page 9, line 49.

It must ultimately be pointed out that in the present construction the slides 607—618 correspond to the multiplication key-board selected, no fractions being used in the keyboard but a tabulator, and it has been preferred not to make the keys of the tabulator capable of being changed over, while all the other keys can be changed over. For that reason, only six pairs of slides 607—618 are required. It is however clear that the keyboard can be arranged in any desired way, so that none, or all of the keys can be made capable of being changed over at will, and that the number of slides 607—618 can be increased to any desired extent, and in that way to make it possible to set simultaneously, and with one key, several consecutive figures of a number which together may require more than six revolutions of the main spindle for its execution. For instance if a key π were selected, it would be possible to set, by one depression of this key, one advance of the carriage, three additions with one advance of the carriage at the end, and finally one addition with one advance of the carriage and four further additions, which would then cause the machine to execute a multiplication by the number 3.14, that is the value of π to three significant figures. In the same way vulgar fractions, for instance ¼, could be included directly into the key-board, by setting the decimal equivalent of ¼ i. e. 0.25 with the key marked ¼, into the drum; and it is not intended to limit the invention in that respect.

The described calculating machine can of course be provided directly with printing apparatus and summing apparatus, as well as with other mechanism such as described in connection with my prior application No. 545,193 of February 21st, 1910. Space has been provided with such purpose everywhere; for instance, the step-wheels 4 and 2 in the counting gear, which run in the opposite direction, are provided for the purpose of adding the printing apparatus, and everywhere else there is left the necessary space for arranging the above-mentioned apparatus.

What I claim as new is:

1. In a multiplying machine, the combination with a controlling member for the adjustments of the machine, of means for setting up a multiplicand, of means for setting up a digit of a multiplier upon said controlling member, means under control of said member to perform the operation of multiplication with the multiplier digit set up, and means for setting one or more further digits of the multiplier upon said controlling member, during such performance of multiplication with a prior set multiplier digit.

2. In a multiplying machine, the combination with means for setting up a digit of a multiplier of two or more digits, of means for setting up the following digit of said multiplier, and means for changing the setting performed by setting up the first multiplier digit, by the setting up of the following multiplier digit.

3. In a calculating machine, the combination with means for setting a calculating operation upon a member controlling the adjustments of the machine, of means for setting a second calculating operation upon said controlling member, and means to change thereby the setting of the first calculating operation so that the resulting operation of the machine is modified in accordance with the two settings.

4. In a calculating machine, the combination with registering devices, of operating devices, one movable bodily on a carriage with regard to the other, a control member, a key board, each key setting up a sequence of operations, either additions, subtractions, or carriage movements upon said control member, and means to combine operations caused by pushing different keys so as to modify the resulting sequence of operations.

5. In a calculating machine, the combination with means for setting up a multiplicand, of means for setting up a multiplier of two or more digits by pushing once a single key, and means for performing the operation of multiplication.

6. In a calculating machine, in combination, a controlling member for effecting different calculating operations, means for adjusting said controlling member to produce a sequence of calculating operations, calculating devices controlled by said adjustable member, and means to introduce a second set or sequence of calculating operations by adjustment of said controlling member during the operation of the calculation including an epicyclic gearing.

7. In a calculating machine, the combination with registering devices, of operating devices, the ones movable bodily with regard to the others to different digits, an automatic control member to control these movements, and means for inserting upon said control member a sequence of operations including digit movements in either direction, to lower and higher digits.

8. In a calculating machine, the combination with means for setting up two multipliers, of means for setting up a multiplicand, means adapted when put into operation automatically to perform the operation of multiplication of the multiplicand set up with the first multiplier set up and to register the result thereof and then to perform the operation of multiplication of the second multiplier set with the same or another multiplicand.

9. In a calculating machine, the combination with means for setting up the four items of two different calculations, of means adapted when put into operation automatically to perform the two calculations and to register the result thereof.

10. In a calculating machine, the combination with means for setting up two divisors, of means for setting up a dividend, means adapted when put into operation automatically to perform the operation of division of the dividend set up by the divisor first set up and to register the result thereof and then to perform the operation of division by the second divisor set with the same or another dividend.

11. In a calculating machine, the combination with means for setting up two sums for one of the four fundamental arithmetical operations, of means to start the machine for a selected operation, and means for setting up thereupon two other sums and effecting a change of the first selected operation during the first operation.

12. In a calculating machine, the combination with a controlling member adjustable by the operator and effecting in turn the operations of the machine, of means to additionally adjust said controlling member by the operator during the operation of the machine under control of said controlling member.

13. In a calculating machine, the combination with a controlling member for its adjustments, of auxiliary slides for adjusting the controlling member, of a key board for setting up operations of the machine, a bar positioned by the depression of such key, to be pushed into said auxiliary slides to move them in accordance with the key depressed, and means to transfer the position of the auxiliary slide onto said controlling member, substantially as described.

14. In a calculating machine, the combination with a main shaft driven by any motor power, of a controlling member for the adjustments of the machine, a key board for selecting adjustments for said controlling member, an auxiliary shaft rotated by a spring motor to perform the adjustments selected, and means driven by the main shaft to adjust the spring motor to follow up the rotation of the shaft also driven by it.

ALEXANDER RECHNITZER.

Witnesses:
AUGUST FUZZER,
ADELAIDE FUNK.